US011635601B2

(12) United States Patent
Tomioka

(10) Patent No.: US 11,635,601 B2
(45) Date of Patent: Apr. 25, 2023

(54) ZOOM LENS AND IMAGING APPARATUS

(71) Applicant: FUJIFILM Corporation, Tokyo (JP)

(72) Inventor: Ryoko Tomioka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 301 days.

(21) Appl. No.: 16/884,884

(22) Filed: May 27, 2020

(65) Prior Publication Data

US 2020/0379223 A1 Dec. 3, 2020

(30) Foreign Application Priority Data

May 29, 2019 (JP) .............................. JP2019-100680

(51) Int. Cl.
*G02B 15/14* (2006.01)
*H04N 5/225* (2006.01)
*G02B 15/15* (2006.01)
*G02B 27/64* (2006.01)
*H04N 5/232* (2006.01)

(52) U.S. Cl.
CPC ...... *G02B 15/144113* (2019.08); *G02B 15/15* (2013.01); *G02B 27/646* (2013.01); *H04N 5/2254* (2013.01); *H04N 5/23287* (2013.01)

(58) Field of Classification Search
CPC .......... G02B 15/144113; G02B 27/646; G02B 15/15; G02B 15/14; H04N 5/23287; H04N 5/225; H04N 5/232
USPC ..... 359/676, 686, 705, 715, 747, 745, 7, 71, 359/772, 774
See application file for complete search history.

(56) References Cited

U.S. PATENT DOCUMENTS

2005/0083584 A1* 4/2005 Ito .................. G02B 15/144113
　　　　　　　　　　　　　　　　　　　　359/687
2010/0289926 A1* 11/2010 Tanaka ................ G02B 27/646
　　　　　　　　　　　　　　　　　　　　359/687
2016/0062135 A1* 3/2016 Kawamura .... G02B 15/144113
　　　　　　　　　　　　　　　　　　　　359/557

(Continued)

FOREIGN PATENT DOCUMENTS

JP　　2011-128361 A　　6/2011
JP　　2011-170086 A　　9/2011

(Continued)

OTHER PUBLICATIONS

An Office Action mailed by the Japanese Patent Office dated Jun. 7, 2022, which corresponds to Japanese Application No. 2019-100680 with English translation.

*Primary Examiner* — Thomas K Pham
*Assistant Examiner* — Kuei-Jen L Edenfield
(74) *Attorney, Agent, or Firm* — Studebaker & Brackett PC

(57) ABSTRACT

A zoom lens includes a positive first lens group, a negative second lens group, a positive third lens group, and a positive fourth lens group in order from an object side. In a case of magnification, the first lens group, the second lens group, and the third lens group move. The third lens group consists of a third a lens group that does not move in a case of image shake correction, a third b lens group that moves in the case of the image shake correction, and a third c lens group that does not move in the case of the image shake correction in order from the object side. The third b lens group consists of a positive lens and a negative lens. A predetermined conditional expression related to the third b lens group is satisfied.

19 Claims, 39 Drawing Sheets

EXAMPLE 1

(56) References Cited

U.S. PATENT DOCUMENTS

| | | | | |
|---|---|---|---|---|
| 2016/0109692 | A1* | 4/2016 | Shibata | G02B 13/18 |
| | | | | 359/557 |
| 2018/0259752 | A1* | 9/2018 | Aoi | G08B 13/19626 |
| 2020/0142167 | A1* | 5/2020 | Kikuchi | G02B 15/144113 |
| 2020/0257095 | A1* | 8/2020 | Kimura | G02B 15/1461 |

FOREIGN PATENT DOCUMENTS

| | | |
|---|---|---|
| JP | 2013-257508 A | 12/2013 |
| JP | 2015-011192 A | 1/2015 |

* cited by examiner

FIG. 3
EXAMPLE 1
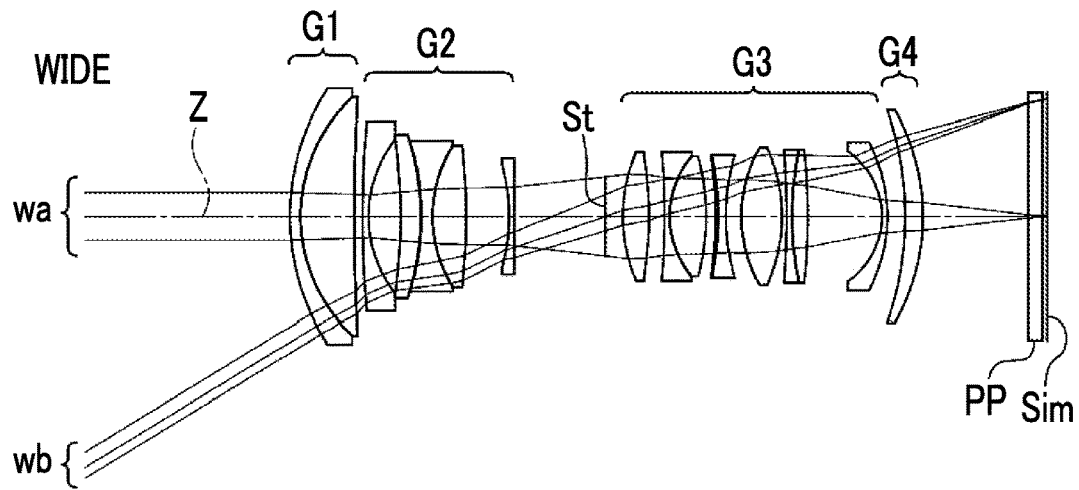
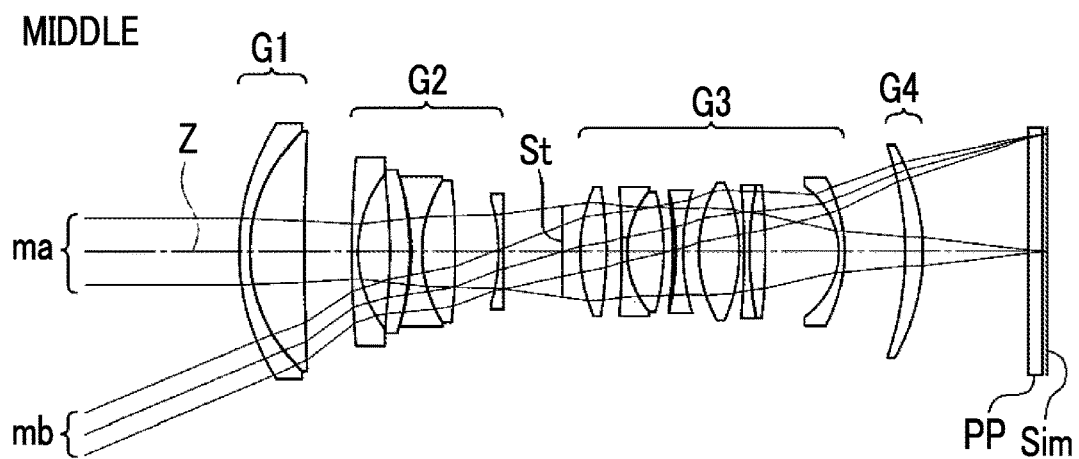
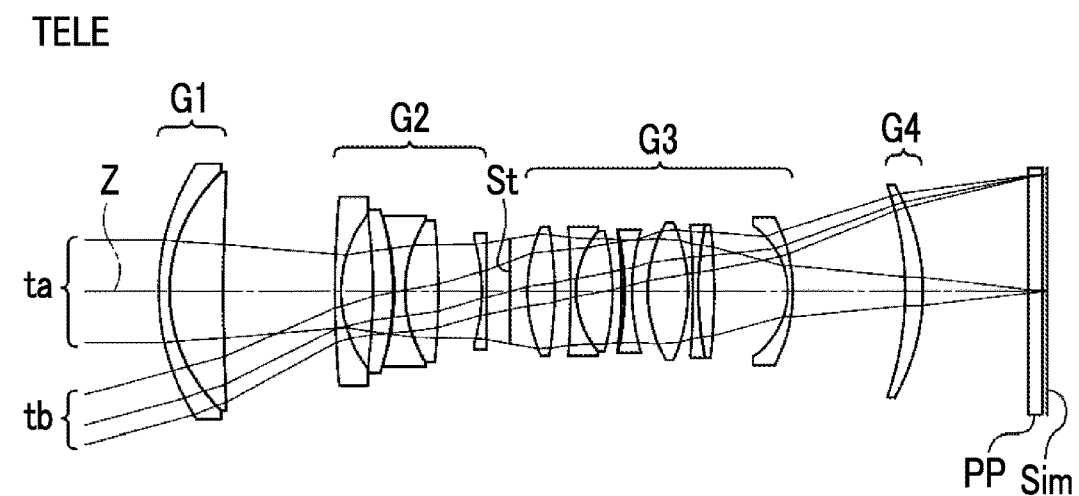

EXAMPLE 2

EXAMPLE 4

EXAMPLE 5

EXAMPLE 6

EXAMPLE 7

EXAMPLE 8

EXAMPLE 9

FIG. 12
EXAMPLE 1
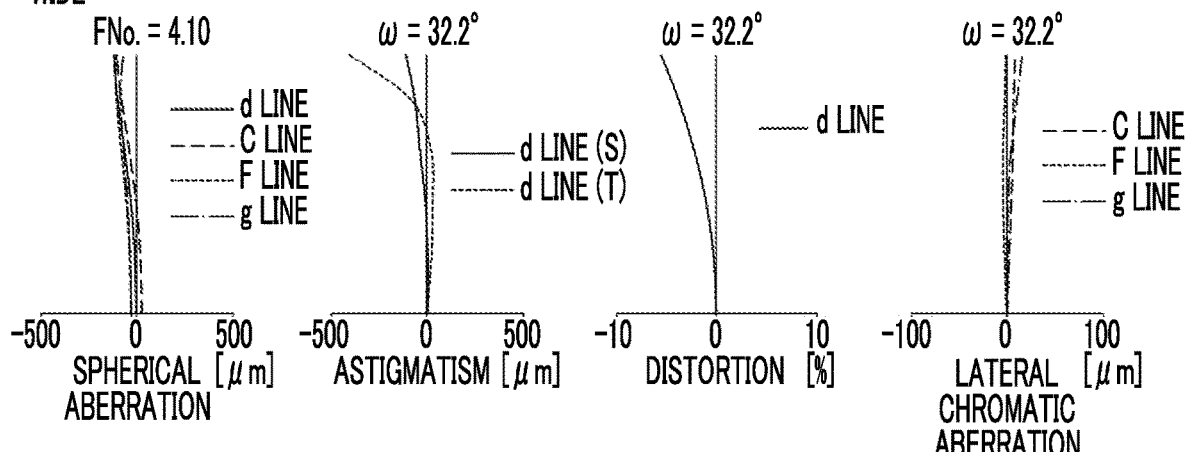
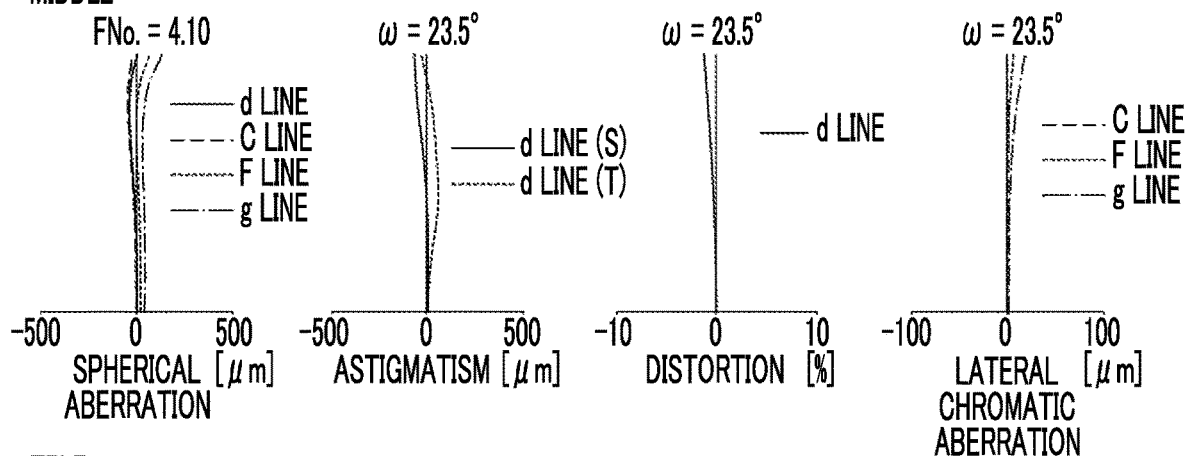
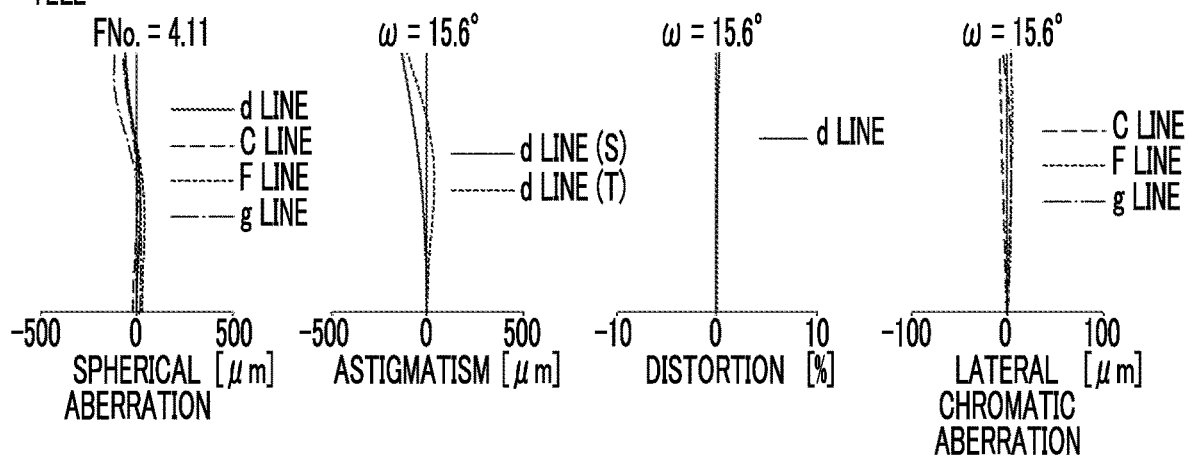

EXAMPLE 2

FIG. 14
EXAMPLE 3
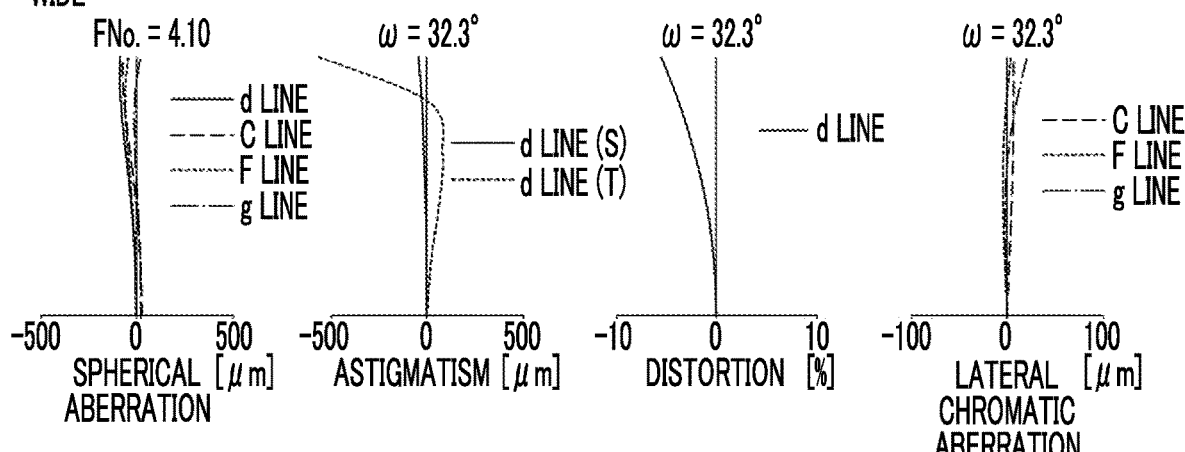
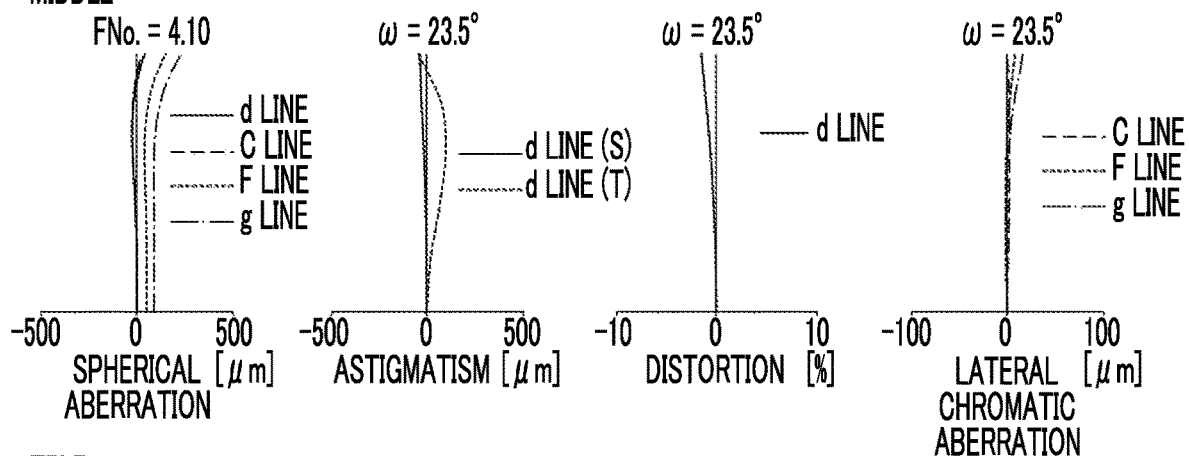
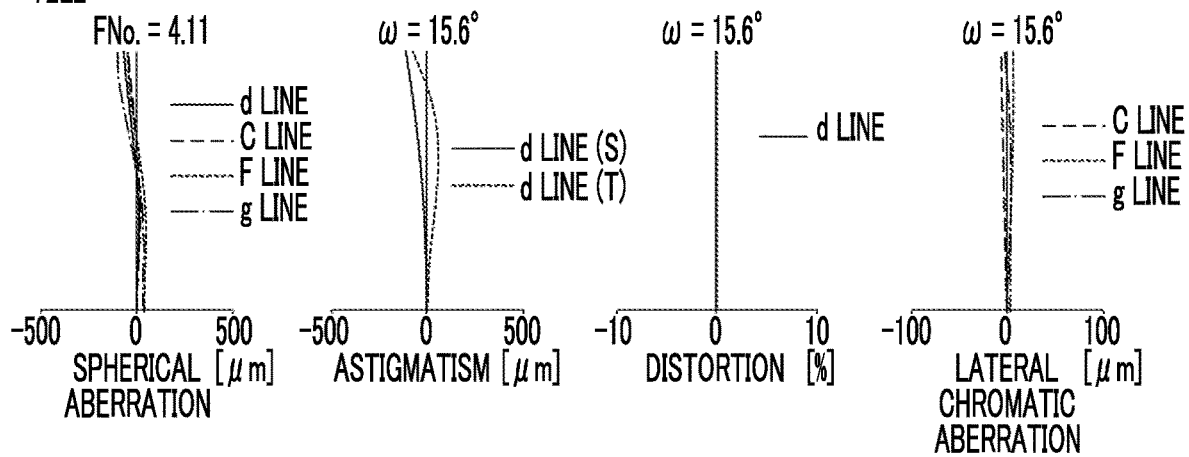

FIG. 15
EXAMPLE 4
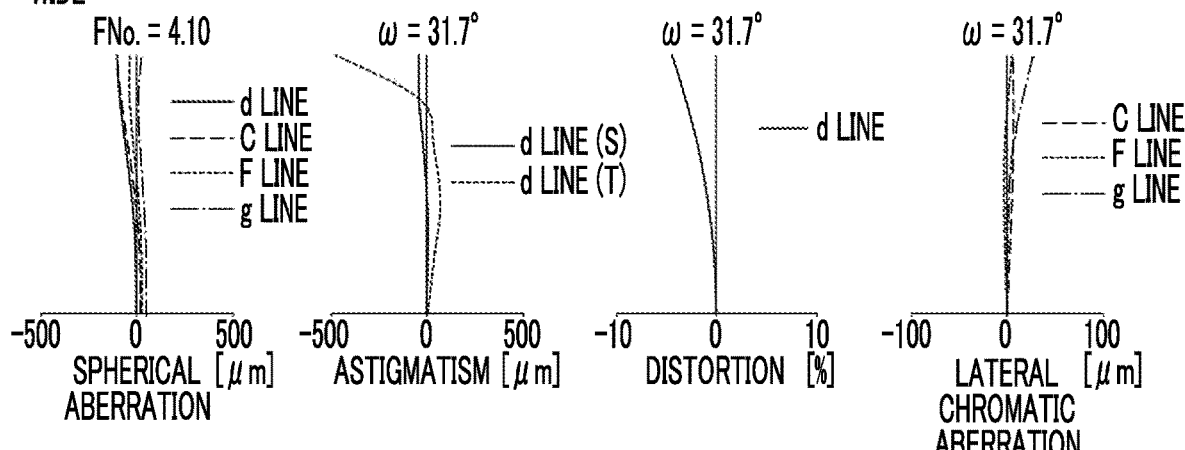
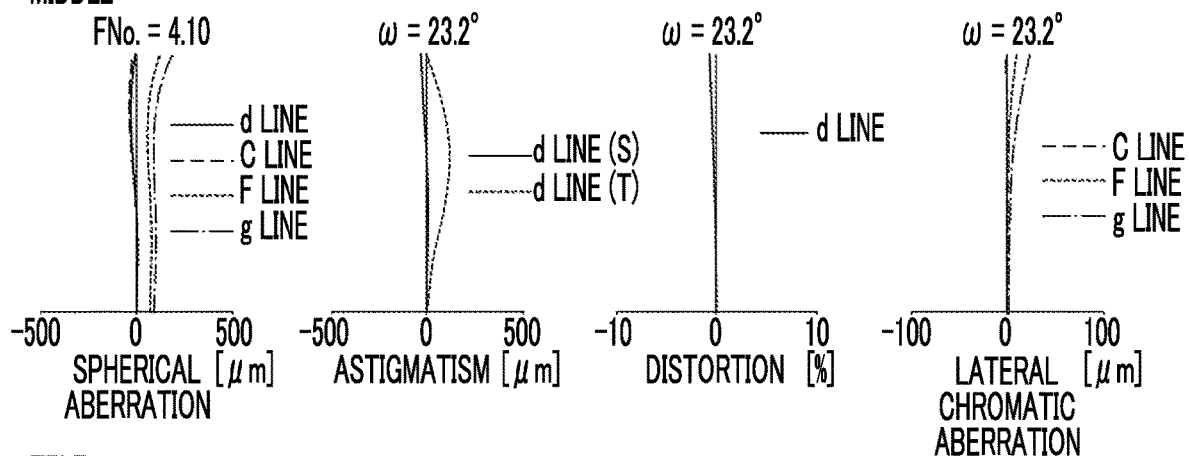
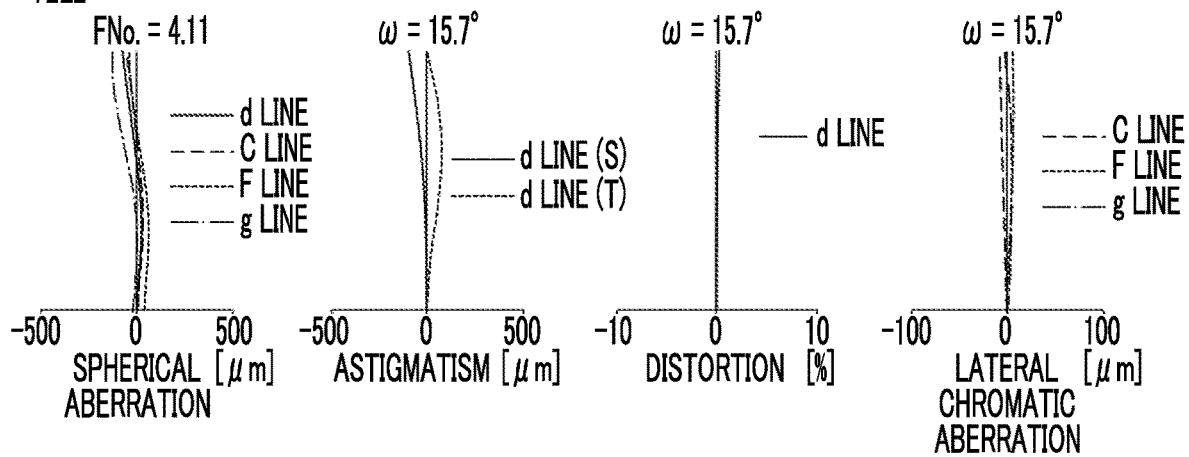

EXAMPLE 5

EXAMPLE 6

FIG. 18
EXAMPLE 7
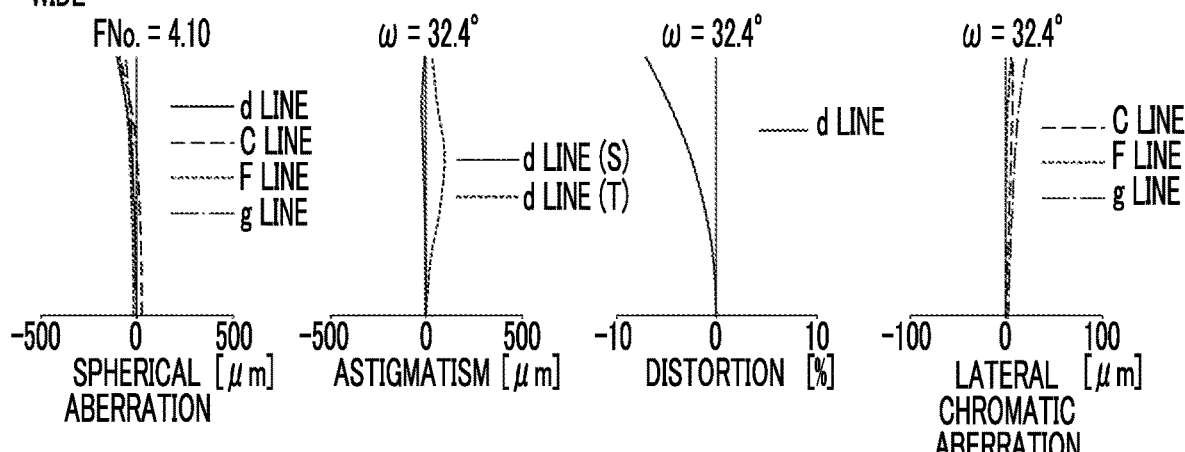
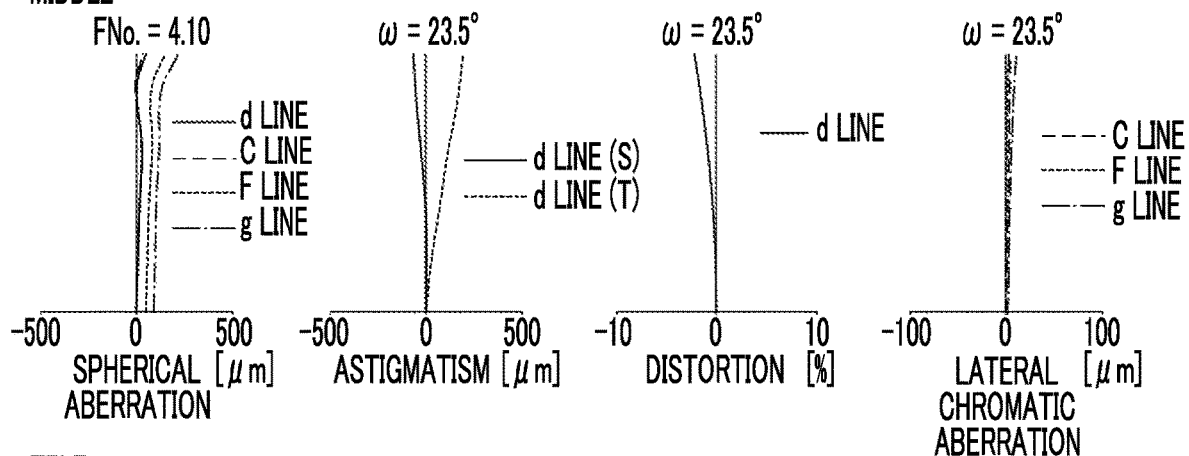
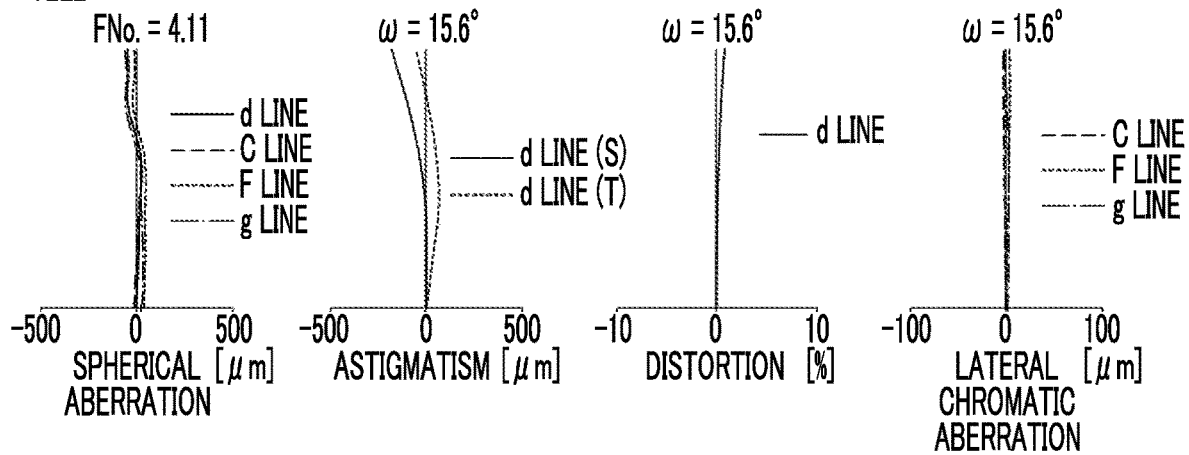

EXAMPLE 1

EXAMPLE 2

EXAMPLE 2

EXAMPLE 3

EXAMPLE 4

EXAMPLE 5

EXAMPLE 5

EXAMPLE 6

EXAMPLE 6

EXAMPLE 7

FIG. 34
EXAMPLE 7
TELE
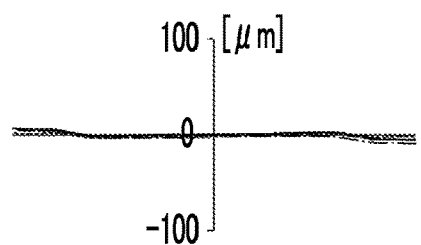
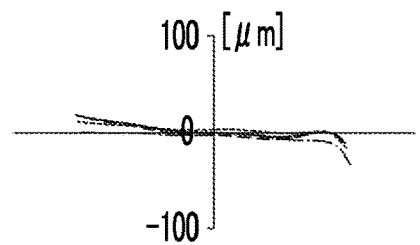
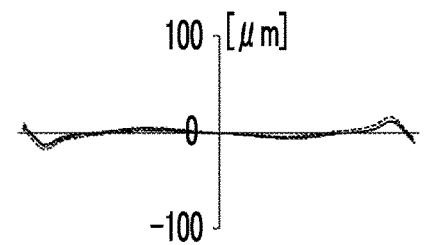
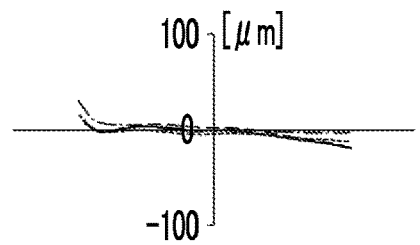
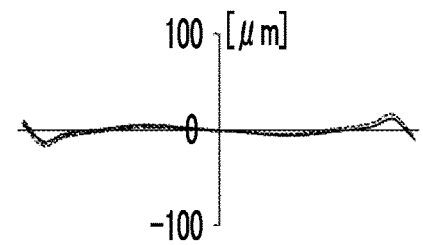
VIBRATION REDUCTION TELE
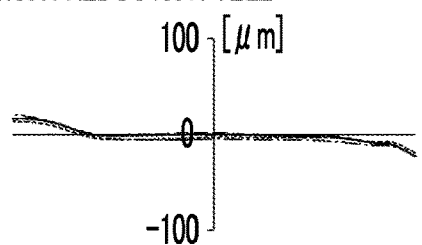
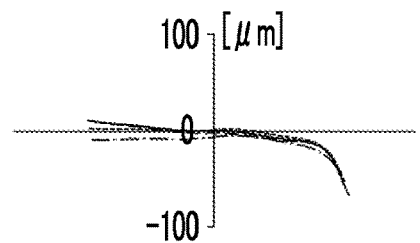
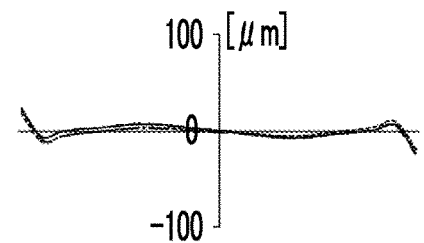
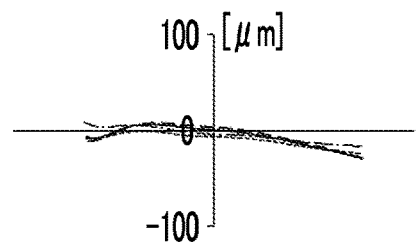
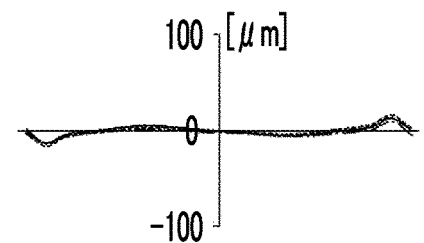

EXAMPLE 8

FIG. 36
EXAMPLE 8
TELE
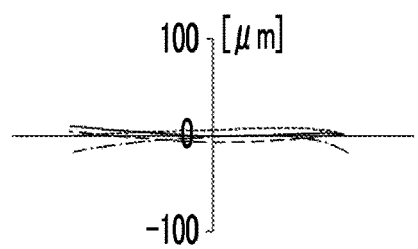
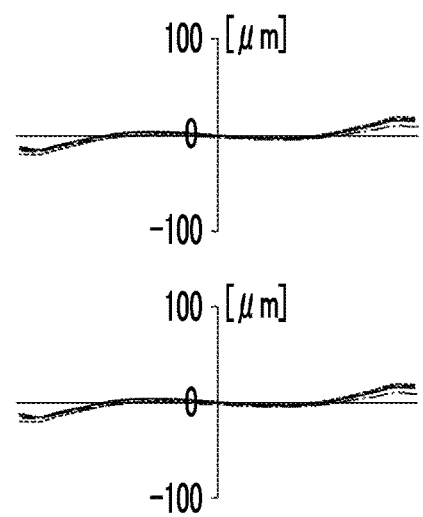
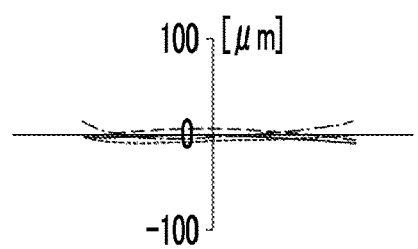
VIBRATION REDUCTION TELE
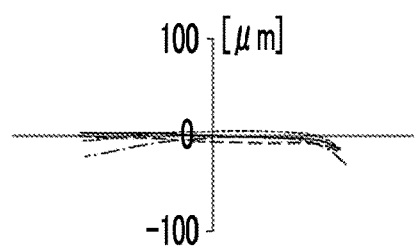
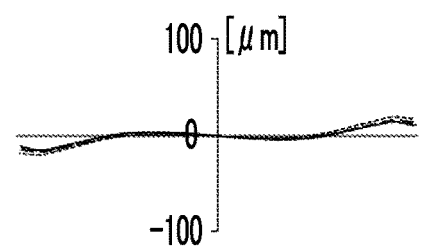
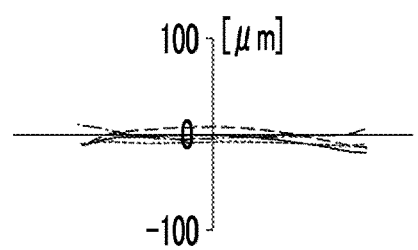
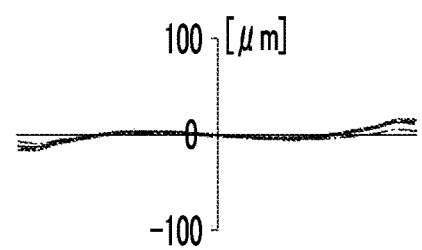

EXAMPLE 9

EXAMPLE 9

ZOOM LENS AND IMAGING APPARATUS

CROSS-REFERENCE TO RELATED APPLICATIONS

The present application claims priority under 35 U.S.C. § 119 to Japanese Patent Application No. 2019-100680, filed on May 29, 2019. The above application is hereby expressly incorporated by reference, in its entirety, into the present application.

BACKGROUND OF THE INVENTION

1. Field of the Invention

The present disclosure relates to a zoom lens and an imaging apparatus.

2. Description of the Related Art

In the related art, a zoom lens having a four-group configuration has been known as a lens system applicable to an imaging apparatus such as a digital camera. For example, JP2015-011192A discloses a zoom lens including, in order from an object side, a first lens group having a positive refractive power, a second lens group having a negative refractive power, a third lens group having a positive refractive power, and a fourth lens group having a positive refractive power.

SUMMARY OF THE INVENTION

The lens system used in the imaging apparatus such as a digital camera is required to be configured in a small size for size reduction of the imaging apparatus and to have favorable performance for acquiring an image of high image quality. Furthermore, a vibration proof function of correcting (hereinafter, referred to as image shake correction) a shake of a captured image caused by vibration such as a camera shake is required. In order to reduce a load of a drive system for vibration proofing, weight reduction of a lens group (hereinafter, referred to as a vibration proof lens group) that moves in the case of correcting the image shake is required. In addition, it is required that a change in chromatic aberration in the case of the image shake correction is reduced.

JP2015-011192A discloses that it is preferable to set at least a part of the third lens group as the vibration proof lens group. However, in the lens system of JP2015-011192A, in a case where one lens of the third lens group is set as the vibration proof lens group, it is difficult to correct chromatic aberration in the case of the image shake correction. In a case where a cemented lens of the third lens group is set as the vibration proof lens group, the weight of the vibration proof lens group is increased.

The present disclosure is conceived in view of the above matter. An aim of the present disclosure is to provide a zoom lens that can reduce a change in chromatic aberration in the case of image shake correction while achieving weight reduction of a vibration proof lens group, is configured in a small size, and has favorable optical performance, and an imaging apparatus comprising the zoom lens.

A zoom lens according to one embodiment of the present disclosure comprises only four lens groups consisting of a first lens group having a positive refractive power, a second lens group having a negative refractive power, a third lens group having a positive refractive power, and a fourth lens group having a positive refractive power in order from an object side to an image side as lens groups. In a case of magnification, at least the first lens group, the second lens group, and the third lens group move along an optical axis by changing all intervals between adjacent lens groups in an optical axis direction. The third lens group consists of a third a lens group that is fixed with respect to an image plane in a case of image shake correction, a third b lens group that moves in a direction intersecting with the optical axis in the case of the image shake correction, and a third c lens group that is fixed with respect to the image plane in the case of the image shake correction in order from the object side to the image side. A stop is arranged between a lens surface of the second lens group closest to the image side and a lens surface of the third c lens group closest to the image side. The third b lens group consists of one positive lens and one negative lens. In a case where a thickness of the positive lens of the third b lens group on the optical axis is denoted by D3bp, and a thickness of the negative lens of the third b lens group on the optical axis is denoted by D3bn, Conditional Expression (1) represented by $$0.2 < D3bp/D3bn < 2 \quad (1)$$

is satisfied.

In the zoom lens of the embodiment, it is preferable that in a case where a d line-based Abbe number of the positive lens of the third b lens group is denoted by v3bp, and a d line-based Abbe number of the negative lens of the third b lens group is denoted by v3bn, Conditional Expression (2) represented by $$v3bp < v3bn \quad (2)$$

is satisfied. In a case where the zoom lens of the embodiment satisfies Conditional Expression (2), it is preferable that each of the third a lens group and the third c lens group includes a positive lens of which a d line-based Abbe number is greater than 70.

In the zoom lens of the embodiment, it is preferable that in a case where a focal length of the positive lens of the third b lens group is denoted by f3bp, and a focal length of the negative lens of the third b lens group is denoted by f3bn, Conditional Expression (3) represented by $$2 < |f3bp/f3bn| < 10 \quad (3)$$

is satisfied.

In the zoom lens of the embodiment, it is preferable that a lens surface of the third a lens group closest to the image side is a convex surface, and a lens surface of the third c lens group closest to the object side is a convex surface.

In the zoom lens of the embodiment, it is preferable that in a case where the thickness of the positive lens of the third b lens group on the optical axis is denoted by D3bp, and a distance on the optical axis from a lens surface of the third a lens group closest to the image side to a lens surface of the third c lens group closest to the object side is denoted by Dac, Conditional Expression (4) represented by $$0.01 < D3bp/Dac < 0.45 \quad (4)$$

is satisfied.

In the zoom lens of the embodiment, it is preferable that in a case where a lateral magnification ratio of the third b lens group at a wide angle end in a state where an object at infinity is focused is denoted by β3bw, and a combined lateral magnification ratio of the third c lens group and the fourth lens group at the wide angle end in a state where the object at infinity is focused is denoted by βrw, Conditional Expression (5) represented by $$0.75 < |(1-\beta 3bw) \times \beta rw| < 1.5 \quad (5)$$

is satisfied.

In the zoom lens of the embodiment, it is preferable that in a case where a lateral magnification ratio of the third b lens group at a telephoto end in a state where an object at infinity is focused is denoted by β3bt, and a combined lateral magnification ratio of the third c lens group and the fourth lens group at the telephoto end in a state where the object at infinity is focused is denoted by βrt, Conditional Expression (6) represented by $$1<|(1-\beta 3bt)\times\beta rt|<2 \qquad (6)$$

is satisfied.

In the zoom lens of the embodiment, it is preferable that in a case where a d line-based Abbe number of the positive lens of the third b lens group is denoted by ν3bp, and a d line-based Abbe number of the negative lens of the third b lens group is denoted by ν3bn, Conditional Expression (7) represented by $$35<\nu 3bn-\nu 3bp<70 \qquad (7)$$

is satisfied.

In the zoom lens of the embodiment, it is preferable that a lens of the third c lens group closest to the image side is a meniscus lens that has a convex surface toward the image side and has a negative refractive power, and the fourth lens group consists of one positive lens.

In the zoom lens of the embodiment, it is preferable that a lens of the fourth lens group closest to the image side is a positive lens, and in a case where a d line-based Abbe number of the positive lens of the fourth lens group closest to the image side is denoted by νLast, Conditional Expression (8) represented by $$\nu Last<30 \qquad (8)$$

is satisfied.

In the zoom lens of the embodiment, it is preferable that in a case of focusing, only one lens in the second lens group or only one cemented lens in the second lens group moves along the optical axis. In this configuration, it is preferable that in a case where a focal length of the lens moving in the second lens group in the case of focusing or the cemented lens in the second lens group moving in the case of focusing is denoted by fFoc, and a focal length of the second lens group is denoted by f2, Conditional Expression (9) represented by $$1.5<fFoc/f2<3 \qquad (9)$$

is satisfied.

In the zoom lens of the embodiment, it is preferable that in a case where a focal length of the zoom lens at a wide angle end in a state where an object at infinity is focused is denoted by fw, and a focal length of the first lens group is denoted by f1, Conditional Expression (10) represented by $$0.2<fw/f1<0.45 \qquad (10)$$

is satisfied.

In the zoom lens of the embodiment, it is preferable that in a case where a focal length of the zoom lens at a wide angle end in a state where an object at infinity is focused is denoted by fw, and a focal length of the second lens group is denoted by f2, Conditional Expression (11) represented by $$1<fw/|f2|<2.5 \qquad (11)$$

is satisfied.

In the zoom lens of the embodiment, it is preferable that in a case where a focal length of the zoom lens at a wide angle end in a state where an object at infinity is focused is denoted by fw, and a focal length of the third lens group is denoted by f3, Conditional Expression (12) represented by $$0.8<fw/f3<2 \qquad (12)$$

is satisfied.

In the zoom lens of the embodiment, it is preferable that in a case where a focal length of the zoom lens at a wide angle end in a state where an object at infinity is focused is denoted by fw, and a focal length of the fourth lens group is denoted by f4, Conditional Expression (13) represented by $$0.1<fw/f4<0.4 \qquad (13)$$

is satisfied.

In the zoom lens of the embodiment, it is preferable that in a case where a focal length of the third lens group is denoted by f3, and a focal length of the fourth lens group is denoted by f4, Conditional Expression (14) represented by $$0.1<f3/f4<0.35 \qquad (14)$$

is satisfied.

In the zoom lens of the embodiment, it is preferable that in a case where a specific gravity of the positive lens of the third b lens group is denoted by W3bp, Conditional Expression (15) represented by $$0.8<W3bp<2.5 \qquad (15)$$

is satisfied.

An imaging apparatus according to another embodiment of the present disclosure comprises the zoom lens according to the embodiment of the present disclosure.

In the present specification, "consist of" or "consisting of" means that a lens that substantially does not have a refractive power, and optical elements such as a stop, a filter, and a cover glass other than a lens, mechanism parts such as a lens flange, a lens barrel, an imaging element, and a camera shake correction mechanism, and the like may be included besides illustrated constituents.

In the present specification, a "~group having a positive refractive power" means that the entire group has a positive refractive power. Similarly, a "~group having a negative refractive power" means that the entire group has a negative refractive power. A "lens having a positive refractive power" and a "positive lens" have the same meaning. A "lens having a negative refractive power" and a "negative lens" have the same meaning. A "~lens group" is not limited to a configuration consisting of a plurality of lenses and may be configured to consist of only one lens. The sign of a refractive power and a surface shape related to a lens including an aspherical surface are considered in a paraxial region unless otherwise specified.

The "focal length" used in the conditional expressions is a paraxial focal length. Unless otherwise specified, the values used in the conditional expressions are values in a case based on d line in a state where the object at infinity is focused. In the present specification, "d line", "C line", "F line", and "g line" are bright lines. The wavelength of d line is 587.56 nanometers (nm). The wavelength of C line is 656.27 nanometers (nm). The wavelength of F line is 486.13 nanometers (nm). The wavelength of g line is 435.84 nanometers (nm).

According to the present disclosure, a zoom lens that can reduce a change in chromatic aberration in the case of image shake correction while achieving weight reduction of a vibration proof lens group, is configured in a small size, and has favorable optical performance, and an imaging apparatus comprising the zoom lens can be provided.

BRIEF DESCRIPTION OF THE DRAWINGS

FIG. 3 is a cross-sectional view illustrating a configuration and luminous flux in each magnification state of the zoom lens illustrated in FIG. 1.

FIG. 12 is a spherical aberration diagram, an astigmatism diagram, a distortion diagram, and a lateral chromatic aberration diagram of the zoom lens of Example 1 of the present disclosure.

FIG. 14 is a spherical aberration diagram, an astigmatism diagram, a distortion diagram, and a lateral chromatic aberration diagram of the zoom lens of Example 3 of the present disclosure.

FIG. 15 is a spherical aberration diagram, an astigmatism diagram, a distortion diagram, and a lateral chromatic aberration diagram of the zoom lens of Example 4 of the present disclosure.

FIG. 18 is a spherical aberration diagram, an astigmatism diagram, a distortion diagram, and a lateral chromatic aberration diagram of the zoom lens of Example 7 of the present disclosure.

FIG. 34 is a lateral aberration diagram in a state where the image shake is not present and a lateral aberration diagram in a state where the image shake correction is performed at a telephoto end of the zoom lens of Example 7 of the present disclosure.

FIG. 36 is a lateral aberration diagram in a state where the image shake is not present and a lateral aberration diagram in a state where the image shake correction is performed at a telephoto end of the zoom lens of Example 8 of the present disclosure.

DESCRIPTION OF THE PREFERRED EMBODIMENTS

Figure 1:
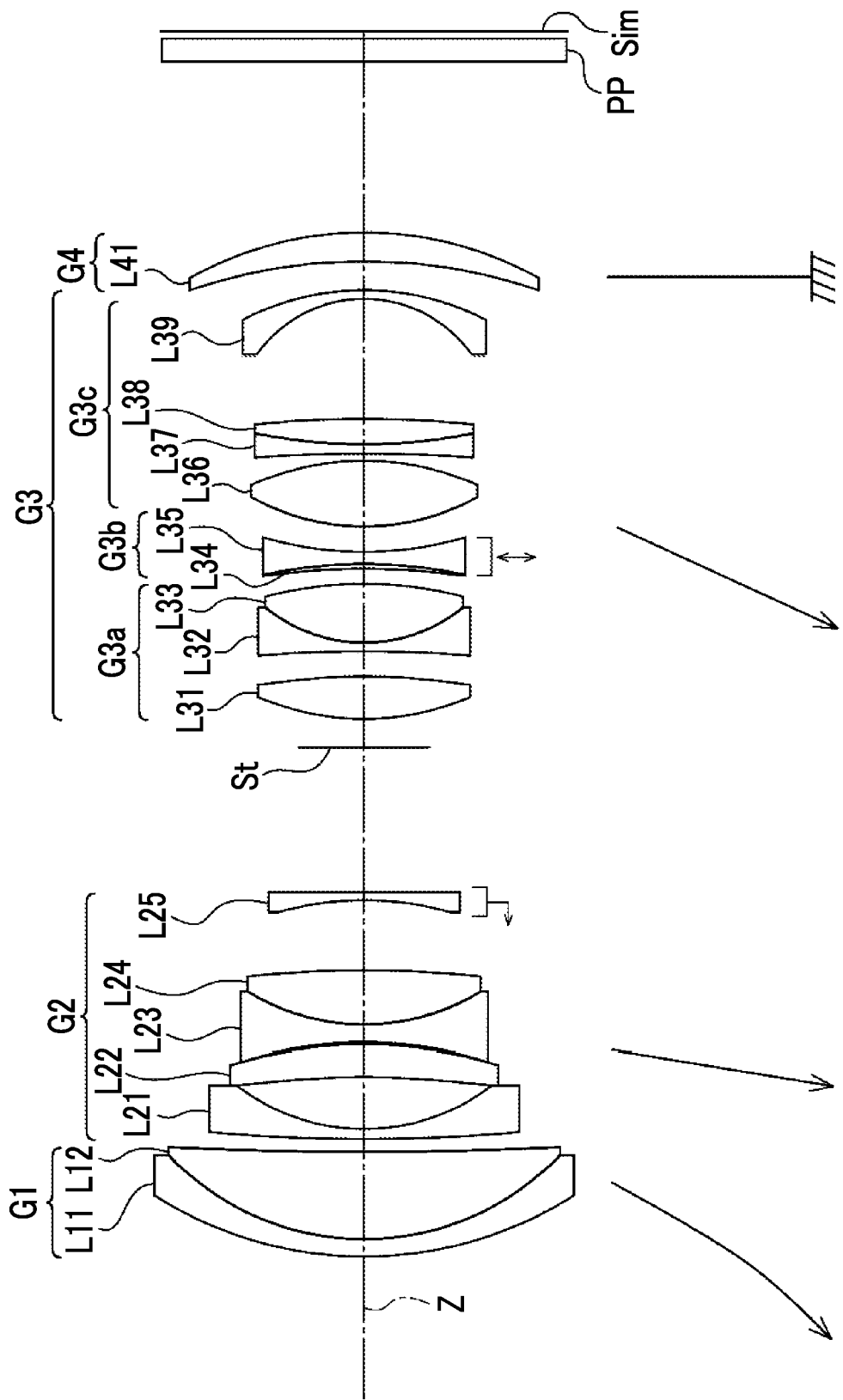
FIG. 1 is a diagram corresponding to a zoom lens of Example 1 of the present disclosure and illustrating a configuration and a movement trajectory of a zoom lens according to one embodiment of the present disclosure.
Figure 2:
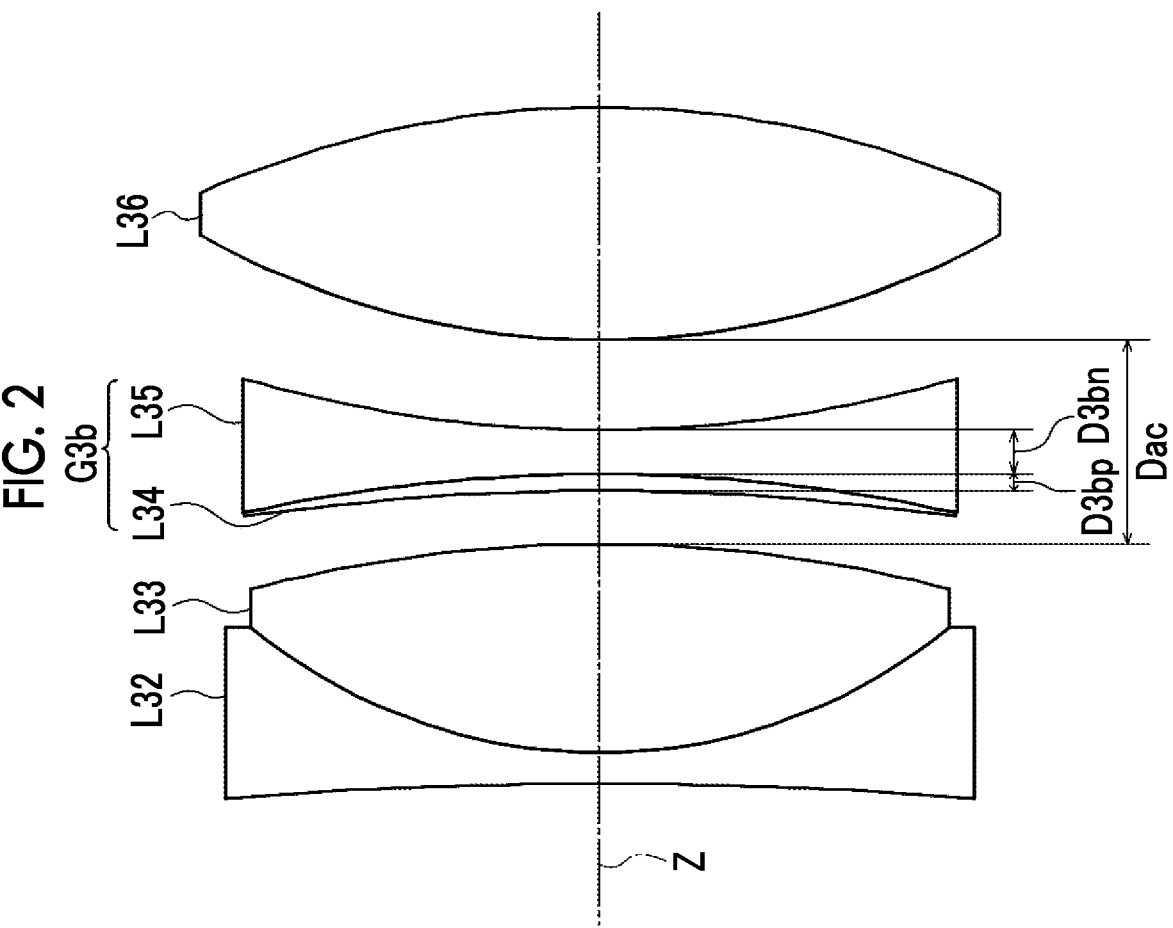
FIG. 2 is a partial enlarged view of a third b lens group and nearby lenses of the zoom lens illustrated in FIG. 1.

Hereinafter, an embodiment of the present disclosure will be described in detail with reference to the drawings. FIG. 1 illustrates a cross-sectional view of a configuration and a movement trajectory at a wide angle end of a zoom lens according to one embodiment of the present disclosure. FIG. 2 illustrates a partial enlarged view of the zoom lens. FIG. 3 illustrates a cross-sectional view of a configuration and luminous flux in each magnification state of the zoom lens. Examples illustrated in FIG. 1 to FIG. 3 correspond to a zoom lens of Example 1 described later. In FIG. 1 to FIG. 3, a state where an object at infinity is focused is illustrated. A left side is an object side, and a right side is an image side. In FIG. 3, a wide angle end state is illustrated in an upper part denoted by "WIDE", a middle focal length state is illustrated in a middle part denoted by "MIDDLE", and a telephoto end state is illustrated in a lower part denoted by "TELE". In FIG. 3, axial luminous flux wa and luminous flux wb of the maximum angle of view in the wide angle end state, axial luminous flux ma and luminous flux mb of the maximum angle of view in the middle focal length state, and axial luminous flux to and luminous flux tb of the maximum angle of view in the telephoto end state are illustrated as luminous flux.

In FIG. 1 and FIG. 3, an example in which an optical member PP having a parallel plate shape is arranged on the image side of the zoom lens is illustrated by assuming application of the zoom lens to an imaging apparatus. The optical member PP is a member that is assumed to correspond to various filters and/or a cover glass or the like. For example, the various filters include a low-pass filter, an infrared cut filter, and a filter cutting a specific wavelength range. The optical member PP is a member not having a refractive power, and the optical member PP can be configured not to be included.

The zoom lens according to the embodiment of the present disclosure comprises only four lens groups consisting of a first lens group G1 having a positive refractive power, a second lens group G2 having a negative refractive power, a third lens group G3 having a positive refractive power, and a fourth lens group G4 having a positive refractive power as lens groups in order from the object side to the image side along an optical axis Z. By setting the first lens group G1 that is closest to the object side as a lens group having a positive refractive power, the total length of a lens system can be reduced. Thus, an advantage of size reduction is achieved.

In the zoom lens, in the case of magnification, at least the first lens group G1, the second lens group G2, and the third lens group G3 move along the optical axis Z by changing all intervals between adjacent lens groups in an optical axis direction. In the case of magnification, by changing all intervals between the adjacent lens groups in the optical axis direction, various types of aberration can be favorably corrected.

In the example illustrated in FIG. 1, in the case of magnification, the fourth lens group G4 is fixed with respect to an image plane Sim. In the case of magnification, by having a configuration in which the lens group that is closest to the image side is fixed, an advantage of a dust protection property is achieved. In the example illustrated in FIG. 1, in the case of magnification from the wide angle end to a telephoto end, the first lens group G1, the second lens group G2, and the third lens group G3 move to the object side along different movement trajectories. In FIG. 1, the movement trajectories of the lens groups in the case of magnification from the wide angle end to the telephoto end is schematically illustrated by an arrow below the first lens group G1, the second lens group G2, and the third lens group G3, respectively. A ground symbol is shown below the fourth lens group G4.

For example, in the zoom lens illustrated in FIG. 1, the first lens group G1 consists of two lenses of lenses L11 and L12 in order from the object side to the image side. The second lens group G2 consists of five lenses of lenses L21 to L25 in order from the object side to the image side. The third lens group G3 consists of nine lenses of lenses L31 to L39 in order from the object side to the image side. The fourth lens group G4 consists of one lens of a lens L41.

In the zoom lens according to the embodiment of the present disclosure, a part of the third lens group G3 constitutes a vibration proof lens group and has a significant feature in the configuration of the zoom lens. Thus, the third lens group G3 will be described first. The third lens group G3 of the zoom lens according to the embodiment of the present disclosure consists of, in order from the object side to the image side, a third a lens group G3a that is fixed with respect to the image plane Sim in the case of image shake correction, a third b lens group G3b that moves in a direction intersecting with the optical axis Z in the case of the image shake correction, and a third c lens group G3c that is fixed with respect to the image plane Sim in the case of the image shake correction. That is, the third b lens group G3b is the vibration proof lens group, and the image shake correction is performed by moving the third b lens group G3b in a direction intersecting with the optical axis Z. A bidirectional arrow of a vertical direction shown below the third b lens group G3b in FIG. 1 indicates that the third b lens group G3b is the vibration proof lens group. Hereinafter, the third b lens group G3b will also be referred to as the vibration proof lens group.

In the zoom lens according to the embodiment of the present disclosure, an aperture stop St is arranged between a lens surface of the second lens group G2 closest to the image side and a lens surface of the third c lens group G3c closest to the image side. By arranging the vibration proof lens group in the third lens group G3 near the aperture stop St, the lens outer diameter of the vibration proof lens group can be decreased. Thus, weight reduction and size reduction of the vibration proof lens group can be achieved.

In the example illustrated in FIG. 1, the third a lens group G3a consists of three lenses of the lenses L31 to L33 in order from the object side to the image side. The third b lens group G3b consists of two lenses of the lenses L34 and L35 in order from the object side to the image side. The third c lens group G3c consists of four lenses of the lenses L36 to L39 in order from the object side to the image side. In addition, in the example illustrated in FIG. 1, the aperture stop St is arranged between the second lens group G2 and the third a lens group G3a. The aperture stop St illustrated in FIG. 1 does not indicate a shape and indicates a position on the optical axis.

As illustrated in FIG. 1, the third b lens group G3b is configured to consist of one positive lens and one negative lens. By including both of the positive lens and the negative lens in the vibration proof lens group, a change in chromatic aberration in the case of the image shake correction can be reduced. In addition, by setting the number of lenses of the vibration proof lens group to two, weight reduction of the vibration proof lens group can be achieved. In a case where the weight of the vibration proof lens group is reduced, a load of a drive system for vibration proofing is increased, and the size of the drive system is increased. Thus, a problem of an increase in size of the apparatus arises.

In a case where the thickness of the positive lens of the third b lens group G3b on the optical axis is denoted by D3bp and the thickness of the negative lens of the third b lens group G3b on the optical axis is denoted by D3bn, the zoom lens according to the embodiment of the present disclosure satisfies Conditional Expression (1) below. For example, D3bp and D3bn are shown in FIG. 2. By securing the thickness of the positive lens of the third b lens group G3b such that a corresponding value of Conditional Expression (1) is not set to be below a lower limit, the thickness of a periphery portion of the positive lens is not excessively decreased. Thus, an advantage in terms of workability is achieved. By thinning the negative lens of the third b lens group G3b such that the corresponding value of Conditional Expression (1) is not set to be below the lower limit, the thickness at the center of the negative lens and the thickness of a periphery portion of the negative lens are not excessively increased. Thus, an advantage of weight reduction of the vibration proof lens group is achieved. By thinning the positive lens of the third b lens group G3b such that the corresponding value of Conditional Expression (1) is not set to be above an upper limit, an advantage of weight reduction of the vibration proof lens group is achieved. By securing the thickness of the negative lens of the third b lens group G3b such that the corresponding value of Conditional Expression (1) is not set to be above the upper limit, the thickness at the center of the negative lens is not excessively decreased. Thus, an advantage in terms of workability is achieved. Furthermore, in a case where it is configured that Conditional Expression (1-1) below is satisfied, more favorable characteristics can be achieved.

$$0.2 < D3bp/D3bn < 2 \quad (1)$$

$$0.25 < D3bp/D3bn < 1.5 \quad (1\text{-}1)$$

In a case where the d line-based Abbe number of the positive lens of the third b lens group G3b is denoted by ν3bp and the d line-based Abbe number of the negative lens of the third b lens group G3b is denoted by ν3bn, it is preferable that the zoom lens according to the embodiment of the present disclosure satisfies Conditional Expression (2) below. By satisfying Conditional Expression (2), a change in chromatic aberration in the case of the image shake correction is easily reduced.

$$\nu 3bp < \nu 3bn \quad (2)$$

In a case where the zoom lens according to the embodiment of the present disclosure satisfies Conditional Expression (2), it is preferable that each of the third a lens group G3a and the third c lens group G3c includes a positive lens of which the d line-based Abbe number is greater than 70. In a case where Conditional Expression (2) is satisfied, the Abbe number of the positive lens of the third b lens group G3b is likely to be a small value. Therefore, in a case where the lens groups on the object side and the image side of the third b lens group G3b are configured to include a positive lens of which the d line-based Abbe number is greater than 70, axial chromatic aberration occurring in the positive lens of the third b lens group G3b can be corrected. However, it is preferable that the d line-based Abbe number of the positive lens of each of the third a lens group G3a and the third c lens group G3c is less than 120. In such a case, an excessive decrease in refractive index of the positive lens can be prevented.

In a case where the focal length of the positive lens of the third b lens group G3b is denoted by f3bp and the focal length of the negative lens of the third b lens group G3b is denoted by f3bn, it is preferable that the zoom lens according to the embodiment of the present disclosure satisfies Conditional Expression (3) below. Conditional Expression (3) is an expression related to the ratio of the refractive powers of the positive lens and the negative lens constituting the vibration proof lens group. By satisfying Conditional Expression (3), a change in chromatic aberration in the case of the image shake correction can be reduced. Furthermore, in a case where it is configured that Conditional Expression (3-1) below is satisfied, more favorable characteristics can be achieved.

$$2 < |f3bp/f3bn| < 10 \quad (3)$$

$$4 < |f3bp/f3bn| < 9 \quad (3\text{-}1)$$

In a case where the thickness of the positive lens of the third b lens group G3b on the optical axis is denoted by D3bp and a distance on the optical axis from a lens surface of the third a lens group G3a closest to the image side to a lens surface of the third c lens group G3c closest to the object side is denoted by Dac, it is preferable that the zoom lens according to the embodiment of the present disclosure satisfies Conditional Expression (4) below. For example, D3bp and Dac are shown in FIG. 2. By setting the corresponding value of Conditional Expression (4) not to be below the lower limit, an increase in total length of the lens system can be reduced, and an advantage of size reduction is achieved. By setting the corresponding value of Conditional Expression (4) not to be above the upper limit, the thickness at the center of the positive lens of the third b lens group G3b is not excessively increased. Thus, an advantage of weight reduction of the vibration proof lens group is achieved. Furthermore, in a case where it is configured that Conditional Expression (4-1) below is satisfied, more favorable characteristics can be achieved.

$$0.01 < D3bp/Dac < 0.45 \quad (4)$$

$$0.05 < D3bp/Dac < 0.3 \quad (4\text{-}1)$$

In a case where a lateral magnification ratio of the third b lens group G3b at the wide angle end in a state where the object at infinity is focused is denoted by β3bw and a combined lateral magnification ratio of the third c lens group G3c and the fourth lens group G4 at the wide angle end in a state where the object at infinity is focused is denoted by βrw, it is preferable that the zoom lens according to the embodiment of the present disclosure satisfies Conditional Expression (5) below. Conditional Expression (5) is an expression related to a displacement amount of the image with respect to a movement amount of the vibration proof lens group at the wide angle end, that is, sensitivity of vibration proof at the wide angle end. By setting the corresponding value of Conditional Expression (5) not to be below the lower limit, the movement amount of the vibration proof lens group in the case of the image shake correction is not excessively increased. Thus, an advantage of size reduction is achieved, and an increase in lens barrel diameter can be reduced. By setting the corresponding value of Conditional Expression (5) not to be above the upper limit, sensitivity of vibration proof is not excessively increased. Thus, a change in coma aberration and a change in chromatic aberration or the like in the case of the image shake correction can be reduced. Furthermore, in a case where it is configured that Conditional Expression (5-1) below is satisfied, more favorable characteristics can be achieved.

$$0.75 < |(1-\beta 3bw) \times \beta rw| < 1.5 \quad (5)$$

$$0.8 < |(1-\beta 3bw) \times \beta rw| < 1.3 \quad (5\text{-}1)$$

In a case where the lateral magnification ratio of the third b lens group G3b at the telephoto end in a state where the object at infinity is focused is denoted by β3bt and the combined lateral magnification ratio of the third c lens group G3c and the fourth lens group G4 at the telephoto end in a state where the object at infinity is focused is denoted by βrt, it is preferable that the zoom lens according to the embodiment of the present disclosure satisfies Conditional Expression (6) below. Conditional Expression (6) is an expression related to the displacement amount of the image with respect to the movement amount of the vibration proof lens group at the telephoto end, that is, the sensitivity of vibration proof at the telephoto end. By setting the corresponding value of Conditional Expression (6) not to be below the lower limit, the movement amount of the vibration proof lens group in the case of the image shake correction is not excessively increased. Thus, an advantage of size reduction is achieved, and an increase in lens barrel diameter can be reduced. By setting the corresponding value of Conditional Expression (6) not to be above the upper limit, the sensitivity of vibration proof is not excessively increased. Thus, a change in coma aberration and a change in chromatic aberration or the like in the case of the image shake correction can be reduced. Furthermore, in a case where it is configured that Conditional Expression (6-1) below is satisfied, more favorable characteristics can be achieved.

$$1 < |(1-\beta 3bt) \times \beta rt| < 2 \quad (6)$$

$$1.2 < |(1-\beta 3bt) \times \beta rt| < 1.8 \quad (6\text{-}1)$$

In a case where the d line-based Abbe number of the positive lens of the third b lens group G3b is denoted by ν3bp and the d line-based Abbe number of the negative lens of the third b lens group G3b is denoted by ν3bn, it is preferable that the zoom lens according to the embodiment of the present disclosure satisfies Conditional Expression (7) below. By satisfying Conditional Expression (7), a change in chromatic aberration in the case of the image shake correction can be reduced. Furthermore, in a case where it is configured that Conditional Expression (7-1) below is satisfied, more favorable characteristics can be achieved.

$$35 < \nu 3bn - \nu 3bp < 70 \quad (7)$$

$$40 < \nu 3bn - \nu 3bp < 65 \quad (7\text{-}1)$$

It is preferable that both of the lens surface of the third a lens group G3a closest to the image side and the lens surface of the third c lens group G3c closest to the object side are convex surfaces. For example, in the example in FIG. 1, the surface of the lens L33 of the third a lens group G3a on the image side and the surface of the lens L36 of the third c lens group G3c on the object side are convex surfaces. In a case where the lens surface of the third a lens group G3a closest to the image side is a convex surface, an interval between the lens of the third a lens group G3a closest to the image side and the vibration proof lens group (third b lens group G3b) is easily increased in a direction away from the optical axis Z compared to the interval in a case where the lens surface is a concave surface or a flat surface. Similarly, in a case where the lens surface of the third c lens group G3c closest to the object side is a convex surface, an interval between the lens of the third c lens group G3c closest to the object side and the vibration proof lens group (third b lens group G3b) is easily increased in a direction away from the optical axis Z compared to the interval in a case where the lens surface is a concave surface or a flat surface. In a case where the total length of the lens system is decreased for size reduction, a lens interval on the optical axis tends to be decreased. A space in which the vibration proof lens group moves without interfering with another lens in the case of the image shake correction is necessary. Therefore, by forming the lens surface adjacent to the vibration proof lens group on the object side and the lens surface adjacent to the vibration proof lens group on the image side as convex surfaces, the interval between the vibration proof lens group and the lens adjacent to the vibration proof lens group is easily increased in the periphery portion of the lens even in a case where the interval is short on the optical axis. Thus, it is possible to decrease the total length of the lens system while securing the space in which the vibration proof lens group moves in the case of the image shake correction.

It is preferable that the lens of the third c lens group G3c closest to the image side is a meniscus lens that has a convex surface toward the image side and has a negative refractive power. In addition, as illustrated in FIG. 1 and FIG. 3, it is preferable that the fourth lens group G4 consists of one positive lens. By setting the number of lenses of the fourth lens group G4 to one, an advantage of size reduction is achieved. As illustrated in FIG. 3, the ratio of the height of a principal ray from the optical axis Z in the lens of the third c lens group G3c closest to the image side and the height of the principal ray from the optical axis Z in the lens of the fourth lens group G4 varies depending on a magnification state. Thus, by configuring these two lenses in the above manner, a change in distortion and a change in lateral chromatic aberration in the case of magnification are easily reduced.

In a case where the lens of the fourth lens group G4 closest to the image side is a positive lens and the d line-based Abbe number of the positive lens of the fourth lens group G4 closest to the image side is denoted by vLast, it is preferable that the zoom lens according to the embodiment of the present disclosure satisfies Conditional Expression (8) below. By satisfying Conditional Expression (8), lateral chromatic aberration can be favorably corrected. Furthermore, in a case where it is configured that Conditional Expression (8-1) below is satisfied, more favorable characteristics can be achieved.

$$vLast<30 \tag{8}$$

$$15<vLast<26 \tag{8-1}$$

The zoom lens according to the embodiment of the present disclosure may be configured such that only one lens in the second lens group G2 or only one cemented lens in the second lens group G2 moves along the optical axis Z in the case of focusing. By having a configuration in which a lens group (hereinafter, referred to as a focus lens group) that moves in the case of focusing consists of one lens or one cemented lens, the weight of the focus lens group can be reduced. Accordingly, the speed of autofocus can be increased, and the load of the drive system can be reduced. In addition, by arranging the focus lens group near the aperture stop St, the lens outer diameter of the focus lens group can be decreased. Accordingly, the weight of the focus lens group can be reduced. Thus, the speed of autofocus can be increased, and the load of the drive system can be reduced. In the example in FIG. 1, the focus lens group consists of one lens of the lens L25. A horizontal leftward arrow shown below the lens L25 in FIG. 1 indicates that the lens L25 is the focus lens group and moves to the object side in the case of focusing on a short range object from the object at infinity.

In a configuration in which the focus lens group consists of only one lens in the second lens group G2 or only one cemented lens in the second lens group G2, in a case where the focal length of the focus lens group is denoted by fFoc and the focal length of the second lens group G2 is denoted by f2, it is preferable that the zoom lens according to the embodiment of the present disclosure satisfies Conditional Expression (9) below. By setting the corresponding value of Conditional Expression (9) not to be below the lower limit, the refractive power of the focus lens group is not excessively increased. Thus, the amount of change in field curvature with respect to the amount of change in object distance can be reduced. By setting the corresponding value of Conditional Expression (9) not to be above the upper limit, the refractive power of the focus lens group is not excessively decreased. Thus, the movement amount of the focus lens group in the case of focusing can be reduced. Accordingly, an advantage of size reduction of the lens system is achieved. Furthermore, in a case where it is configured that Conditional Expression (9-1) below is satisfied, more favorable characteristics can be achieved.

$$1.5<fFoc/f2<3 \tag{9}$$

$$1.8<fFoc/f2<2.8 \tag{9-1}$$

In a state where the object at infinity is focused, in a case where the focal length of the zoom lens at the wide angle end is denoted by fw and the focal length of the first lens group G1 is denoted by f1, it is preferable that the zoom lens according to the embodiment of the present disclosure satisfies Conditional Expression (10) below. By setting the corresponding value of Conditional Expression (10) not to be below the lower limit, the refractive power of the first lens group G1 is not excessively decreased. Thus, the movement amount of the first lens group G1 in the case of magnification can be reduced. Accordingly, an advantage of size reduction of the lens system in the optical axis direction is achieved. By setting the corresponding value of Conditional Expression (10) not to be above the upper limit, the refractive power of the first lens group G1 is not excessively increased. Thus, it is possible to prevent an excessive increase in angle between the principal ray of a large angle of view incident on the second lens group G2 from the first lens group G1 and the optical axis Z. Accordingly, in a magnification state where the distance between the first lens group G1 and the second lens group G2 is long, the height of a ray of a large angle of view passing through the first lens group G1 is not excessively increased. Consequently, an increase in diameter of the lens closest to the object side with respect to the size of the image can be reduced, and an advantage of size reduction of the lens system in a diameter direction is achieved. Furthermore, in a case where it is configured that Conditional Expression (10-1) below is satisfied, more favorable characteristics can be achieved.

$$0.2<fw/f1<0.45 \tag{10}$$

$$0.25<fw/f1<0.43 \tag{10-1}$$

In a state where the object at infinity is focused, in a case where the focal length of the zoom lens at the wide angle end is denoted by fw and the focal length of the second lens group G2 is denoted by f2, it is preferable that the zoom lens according to the embodiment of the present disclosure satisfies Conditional Expression (11) below. By setting the corresponding value of Conditional Expression (11) not to be below the lower limit, the refractive power of the second lens group G2 is not excessively decreased. Thus, the movement amount of the second lens group G2 in the case of magnification can be reduced. Accordingly, an advantage of size reduction of the lens system is achieved. By setting the corresponding value of Conditional Expression (11) not to be above the upper limit, the refractive power of the second lens group G2 is not excessively increased. Thus, a change in aberration in the case of magnification can be reduced. Furthermore, in a case where it is configured that Conditional Expression (11-1) below is satisfied, more favorable characteristics can be achieved.

$$1<fw/|f2|<2.5 \tag{11}$$

$$1.4<fw/|f2|<2 \tag{11-1}$$

In a state where the object at infinity is focused, in a case where the focal length of the zoom lens at the wide angle end is denoted by fw and the focal length of the third lens group G3 is denoted by f3, it is preferable that the zoom lens according to the embodiment of the present disclosure satisfies Conditional Expression (12) below. By setting the corresponding value of Conditional Expression (12) not to be below the lower limit, the refractive power of the third lens group G3 is not excessively decreased. Thus, the movement amount of the third lens group G3 in the case of magnification can be reduced. Accordingly, an advantage of size reduction of the lens system is achieved. By setting the corresponding value of Conditional Expression (12) not to be above the upper limit, the refractive power of the third lens group G3 is not excessively increased. Thus, a change in aberration in the case of magnification can be reduced. Furthermore, in a case where it is configured that Conditional Expression (12-1) below is satisfied, more favorable characteristics can be achieved.

$$0.8<fw/f3<2 \tag{12}$$

$$1.1<fw/f3<1.6 \tag{12-1}$$

In a state where the object at infinity is focused, in a case where the focal length of the zoom lens at the wide angle end is denoted by fw and the focal length of the fourth lens group G4 is denoted by f4, it is preferable that the zoom lens according to the embodiment of the present disclosure satisfies Conditional Expression (13) below. By setting the corresponding value of Conditional Expression (13) not to be below the lower limit, the refractive power of the fourth lens group G4 is not excessively decreased. Thus, an increase in total length of the lens system can be reduced. Accordingly, an advantage of size reduction is achieved. By setting the corresponding value of Conditional Expression (13) not to be above the upper limit, the refractive power of the fourth lens group G4 is not excessively increased. Thus, a change in field curvature in the case of magnification can be reduced. Furthermore, in a case where it is configured that Conditional Expression (13-1) below is satisfied, more favorable characteristics can be achieved.

$$0.1<fw/f4<0.4 \tag{13}$$

$$0.2<fw/f4<0.38 \tag{13-1}$$

In a case where the focal length of the third lens group G3 is denoted by f3 and the focal length of the fourth lens group G4 is denoted by f4, it is preferable that the zoom lens according to the embodiment of the present disclosure satisfies Conditional Expression (14) below. By setting the corresponding value of Conditional Expression (14) not to be below the lower limit, the refractive power of the third lens group G3 is not excessively increased. Thus, spherical aberration occurring in the third lens group G3 is easily reduced. By setting the corresponding value of Conditional Expression (14) not to be above the upper limit, the refractive power of the fourth lens group G4 is not excessively increased. Thus, the field curvature is easily reduced. Furthermore, in a case where it is configured that Conditional Expression (14-1) below is satisfied, more favorable characteristics can be achieved.

$$0.1<f3/f4<0.35 \tag{14}$$

$$0.15<f3/f4<0.3 \tag{14-1}$$

In a case where the specific gravity of the positive lens of the third b lens group G3b is denoted by W3bp, it is preferable that the zoom lens according to the embodiment of the present disclosure satisfies Conditional Expression (15) below. By setting the corresponding value of Conditional Expression (15) not to be below the lower limit, a material appropriate for the positive lens of the third b lens group G3b is easily selected. Consequently, an advantage of reduction of a change in chromatic aberration in the case of the image shake correction is achieved. By setting the corresponding value of Conditional Expression (15) not to be below the lower limit, particularly, a material satisfying Conditional Expression (2) is easily selected. By setting the corresponding value of Conditional Expression (15) not to be above the upper limit, the weight of the vibration proof lens group can be reduced. Thus, the size of the drive system of the vibration proof lens group can be reduced. Consequently, a contribution to size reduction of the entire lens barrel unit including the drive system can be made. In a case where it is configured that Conditional Expression (15-1) below is satisfied, more favorable characteristics can be achieved. In a case where it is configured that Conditional Expression (15-2) is satisfied, still more favorable characteristics can be achieved.

$$0.8<W3bp<2.5 \tag{15}$$

$$0.8<W3bp<2 \tag{15-1}$$

$$0.8<W3bp<1.5 \tag{15-2}$$

Specifically, for example, each lens group can employ the following configuration. The first lens group G1 may be configured to consist of one negative lens and one positive lens. The first lens group G1 may be configured to consist of a negative meniscus lens having a convex surface toward the object side and a positive meniscus lens having a convex surface toward the object side in order from the object side to the image side. The negative lens and the positive lens constituting the first lens group G1 may be cemented together.

The second lens group G2 may be configured to consist of three negative lenses and two positive lenses or may be configured to consist of three negative lenses and three positive lenses. The second lens group G2 may be configured to consist of a negative lens, a positive lens, a negative lens, a positive lens, and a negative lens in order from the object side to the image side, or may be configured to consist of a negative lens, a positive lens, a negative lens, a positive lens, a negative lens, and a positive lens in order from the object side to the image side. More specifically, the second lens group G2 may be configured to consist of a negative meniscus lens, a positive meniscus lens, a biconcave lens, a positive lens, and a negative lens having a concave surface toward the object side in order from the object side to the image side, or may be configured to consist of a negative meniscus lens, a positive meniscus lens, a biconcave lens, a positive lens, a negative lens having a concave surface toward the object side, and a positive lens in order from the object side to the image side.

The third a lens group G3a may be configured to consist of one negative lens and two positive lenses. The third a lens group G3a may be configured to consist of a positive lens, a negative lens, and a positive lens in order from the object side to the image side. More specifically, the third a lens group G3a may be configured to consist of a biconvex lens, a negative lens having a concave surface toward the image side, and a biconvex lens in order from the object side to the image side.

The third b lens group G3b can be configured to consist of a positive lens and a negative lens in order from the object side to the image side. More specifically, the third b lens group G3b can be configured to consist of a positive lens having a concave surface toward the object side and a biconcave lens in order from the object side to the image side. The surface of the positive lens of the third b lens group G3b on the object side may be an aspherical surface. It is preferable that the positive lens and the negative lens of the third b lens group G3b are cemented together. In this case, an advantage of size reduction is achieved.

The third c lens group G3c may be configured to consist of two negative lenses and two positive lenses or may be configured to consist of two negative lenses and one positive lens. The third c lens group G3c may be configured to consist of a positive lens, a negative lens, a positive lens, and a negative lens in order from the object side to the image side, or may be configured to consist of a positive lens, a negative lens, and a negative lens in order from the object side to the image side. More specifically, the third c lens group G3c may be configured to consist of a biconvex lens, a biconcave lens, a biconvex lens, and a negative meniscus lens having a convex surface toward the image side in order from the object side to the image side, or may be configured to consist of a biconvex lens and two negative meniscus lenses having convex surfaces toward the image side.

The fourth lens group G4 may be configured to consist of one positive lens. The fourth lens group G4 may be configured to consist of a positive meniscus lens having a convex surface toward the image side.

Regarding lens groups other than the third b lens group G3b, the number of lenses constituting each lens group can be set to a different number from the above example. In addition, the position of the aperture stop St may be arranged at a different position from the example in FIG. 1 as long as the position is between the lens surface of the second lens group G2 closest to the image side and the lens surface of the third c lens group G3c closest to the image side. While an example in which the fourth lens group G4 is fixed with respect to the image plane Sim in the case of magnification is illustrated in FIG. 1, the fourth lens group G4 may be configured to move in the case of magnification. In a case where all lens groups move in the case of magnification, an advantage of reduction of a change in aberration in the case of magnification is achieved.

The above preferred configurations and available configurations including the configurations related to the conditional expressions can be randomly combined and preferably, are appropriately selectively employed depending on required specifications. According to the present disclosure, a zoom lens that can reduce a change in chromatic aberration in the case of image shake correction while achieving weight reduction of a vibration proof lens group, is configured in a small size, and has favorable optical performance can be implemented.

Next, examples of the zoom lens according to the embodiment of the present disclosure will be described.

Example 1

A configuration and a movement trajectory of a zoom lens of Example 1 are illustrated in FIG. 1, and the method and configuration of illustration are described above. Thus, a duplicate description will be partially omitted here. The zoom lens of Example 1 consists of the first lens group G1 having a positive refractive power, the second lens group G2 having a negative refractive power, the aperture stop St, the third lens group G3 having a positive refractive power, and the fourth lens group G4 having a positive refractive power in order from the object side to the image side. In the case of magnification, the first lens group G1, the second lens group G2, and the third lens group G3 move along the optical axis Z by changing the intervals therebetween, and the fourth lens group G4 is fixed with respect to the image plane Sim. In the case of magnification, the aperture stop St moves in connection with the third lens group G3. The first lens group G1 consists of two lenses of the lenses L11 and L12 in order from the object side to the image side. The second lens group G2 consists of five lenses of the lenses L21 to L25 in order from the object side to the image side. The third lens group G3 consists of the third a lens group G3a, the third b lens group G3b, and the third c lens group G3c in order from the object side to the image side. The third a lens group G3a consists of three lenses of the lenses L31 to L33 in order from the object side to the image side. The third b lens group G3b consists of two lenses of the lenses L34 and L35 in order from the object side to the image side. The third c lens group G3c consists of four lenses of the lenses L36 to L39 in order from the object side to the image side. The fourth lens group G4 consists of one lens of the lens L41. The vibration proof lens group consists of the third b lens group G3b. The focus lens group consists of the lens 25. Above is the summary of the zoom lens of Example 1.

For the zoom lens of Example 1, fundamental lens data is shown in Table 1, specifications and variable surface intervals are shown in Table 2, and aspherical coefficients are shown in Table 3. In Table 1, the field of Sn shows a surface number in a case where the surface closest to the object side is a first surface and the number is increased by one at a time in a direction toward the image side. The field of R shows the radius of curvature of each surface. The field of D shows a surface interval on the optical axis between each surface and a surface adjacent thereto on the image side. The field of Nd shows the refractive index of each constituent with respect to d line. The field of νd shows the d line-based Abbe number of each constituent. In addition, in Table 1, G3a, G3b, and G3c, which are the reference signs of the groups, are shown on the right of fields corresponding to the third a lens group G3a, the third b lens group G3b, and the third c lens group G3c.

In Table 1, the sign of the radius of curvature of a surface having a shape of a convex surface toward the object side is positive, and the sign of the radius of curvature of a surface having a shape of a convex surface toward the image side is negative. In Table 1, the aperture stop St and the optical member PP are also shown. In Table 1, the surface number and a word (St) are written in the field of the surface number of the surface corresponding to the aperture stop St. A value in the lowermost field of D in Table 1 is an interval between the surface closest to the image side in the table and the image plane Sim. In Table 1, a symbol DD[ ] is used for the variable surface interval in the case of magnification. The variable surface interval is shown in the field of D with the surface number on the object side of the interval in [ ].

Table 2 shows a magnification ratio Zr, a focal length f, an F number FNo., a maximum total angle of view 2ω, and the value of the variable surface interval in the case of magnification. In the field of 2ω, (°) means that the unit is degree. In Table 2, values in the wide angle end state, the middle focal length state, and the telephoto end state are shown in the fields marked with WIDE, MIDDLE, and TELE, respectively. Values shown in Table 1 and Table 2 are values in a case based on d line in a state where the object at infinity is focused.

In Table 1, the surface number of an aspherical surface is marked with *, and the numerical value of the paraxial radius of curvature is written in the field of the radius of curvature of the aspherical surface. In Table 3, the field of Sn shows the surface number of the aspherical surface, and the fields of KA and Am show the numerical value of the aspherical coefficient for each aspherical surface. Here, m is an integer greater than or equal to 3 and varies depending on the surfaces. For example, m=4, 6, 8, 10, 12, 14, and 16 is set for the aspherical surface of Example 1. In the numerical value of the aspherical coefficient in Table 3, "E±n" (n: integer) means "×10$^{\pm n}$". KA and Am are aspherical coefficients in an aspherical expression represented by the following expression.

$$Zd = C \times h^2 / \{1 + (1 - KA \times C^2 \times h^2)^{1/2}\} + \Sigma Am \times h^m$$

where

Zd: aspherical depth (the length of a perpendicular line drawn from a point on an aspherical surface having a height h to a plane that is in contact with an aspherical vertex and is perpendicular to the optical axis)

h: height (a distance from the optical axis to the lens surface)

C: reciprocal of paraxial radius of curvature

KA and Am: aspherical coefficients

In the aspherical expression, $\Sigma$ means the total sum related to m.

In the data of each table, degree is used as the unit of angle, and mm (millimeter) is used as the unit of length. However, since the optical system can be used even in a case where propositional enlargement or propositional reduction is performed, other appropriate units can also be used. In addition, numerical values that are rounded to a predetermined number of digits are written in each table shown below.

TABLE 1

Example 1

| Sn | R | D | Nd | vd | |
|---|---|---|---|---|---|
| 1 | 56.6741 | 2.40 | 1.91082 | 35.25 | |
| 2 | 38.9500 | 12.12 | 1.62041 | 60.37 | |
| 3 | 583.4940 | DD[3] | | | |
| 4 | 248.6187 | 1.40 | 2.00069 | 25.46 | |
| 5 | 30.1278 | 7.17 | | | |
| *6 | −110.0929 | 4.47 | 1.58254 | 59.47 | |
| *7 | −59.8535 | 0.30 | | | |
| 8 | −57.0972 | 2.41 | 1.48749 | 70.24 | |
| 9 | 32.0520 | 7.51 | 1.84666 | 23.78 | |
| 10 | −160.8127 | 9.71 | | | |
| 11 | −45.0287 | 1.05 | 1.65160 | 58.55 | |
| 12 | ∞ | DD[12] | | | |
| 13(St) | ∞ | 3.92 | | | |
| *14 | 36.1835 | 5.90 | 1.69350 | 53.20 | G3a |
| *15 | −84.0797 | 3.48 | | | |
| 16 | −197.3116 | 1.21 | 1.64769 | 33.79 | |
| 17 | 22.4200 | 8.15 | 1.43875 | 94.66 | |
| 18 | −56.6881 | 2.10 | | | |
| *19 | −94.3420 | 0.65 | 1.62426 | 23.06 | G3b |
| 20 | −68.2903 | 1.70 | 1.48749 | 70.24 | |
| 21 | 52.5621 | 3.50 | | | |
| 22 | 33.2947 | 9.10 | 1.49700 | 81.54 | G3c |
| 23 | −39.9800 | 1.00 | | | |
| 24 | −226.4350 | 1.31 | 1.67003 | 47.23 | |
| 25 | 79.8610 | 3.53 | 1.51680 | 64.20 | |
| 26 | −150.0015 | 16.49 | | | |
| 27 | −18.8732 | 1.20 | 1.90043 | 37.37 | |
| 28 | −38.0255 | DD[28] | | | |
| 29 | −78.5658 | 4.00 | 2.00272 | 19.32 | |
| 30 | −51.6519 | 23.66 | | | |
| 31 | ∞ | 3.20 | 1.51680 | 64.20 | |
| 32 | ∞ | 1.00 | | | |

TABLE 2

Example 1

| | WIDE | MIDDLE | TELE |
|---|---|---|---|
| Zr | 1.0 | 1.4 | 2.1 |
| f | 45.95 | 63.82 | 97.97 |
| FNo. | 4.10 | 4.10 | 4.11 |
| 2ω (°) | 64.4 | 47.0 | 31.2 |
| DD[3] | 1.77 | 10.67 | 24.93 |
| DD[12] | 20.15 | 12.96 | 5.26 |
| DD[28] | 4.00 | 13.57 | 25.06 |

TABLE 3

Example 1

| | Sn | |
|---|---|---|
| | 6 | 7 |
| KA | 1.0000000E+00 | 1.0000000E+00 |
| A4 | 3.0320507E−06 | 2.0975509E−06 |
| A6 | 7.7238248E−09 | 3.6773521E−09 |
| A8 | −5.6674531E−11 | −3.9337229E−11 |
| A10 | 7.7710768E−14 | 4.7729609E−14 |
| A12 | 4.0020465E−16 | 2.3293492E−16 |
| A14 | −1.4412121E−18 | −5.2998395E−19 |
| A16 | 1.5225693E−21 | 3.1541188E−22 |

| | Sn | | |
|---|---|---|---|
| | 14 | 15 | 19 |
| KA | 1.0000000E+00 | 1.0000000E+00 | 1.0000000E+00 |
| A4 | −4.8903066E−06 | 2.6929775E−06 | 1.5879642E−06 |
| A6 | −1.7950741E−09 | −9.7459299E−10 | 1.8183323E−09 |
| A8 | 1.5202450E−11 | 5.2156920E−11 | 4.5043089E−11 |
| A10 | 8.5439410E−14 | −1.1283672E−13 | −2.3033303E−13 |
| A12 | −3.3109941E−16 | −2.9372467E−17 | −6.4311905E−16 |
| A14 | −3.1184262E−18 | −2.4518032E−18 | 8.6767356E−18 |
| A16 | 1.1161610E−20 | 9.2207161E−21 | −2.1736388E−20 |

Figure 21:
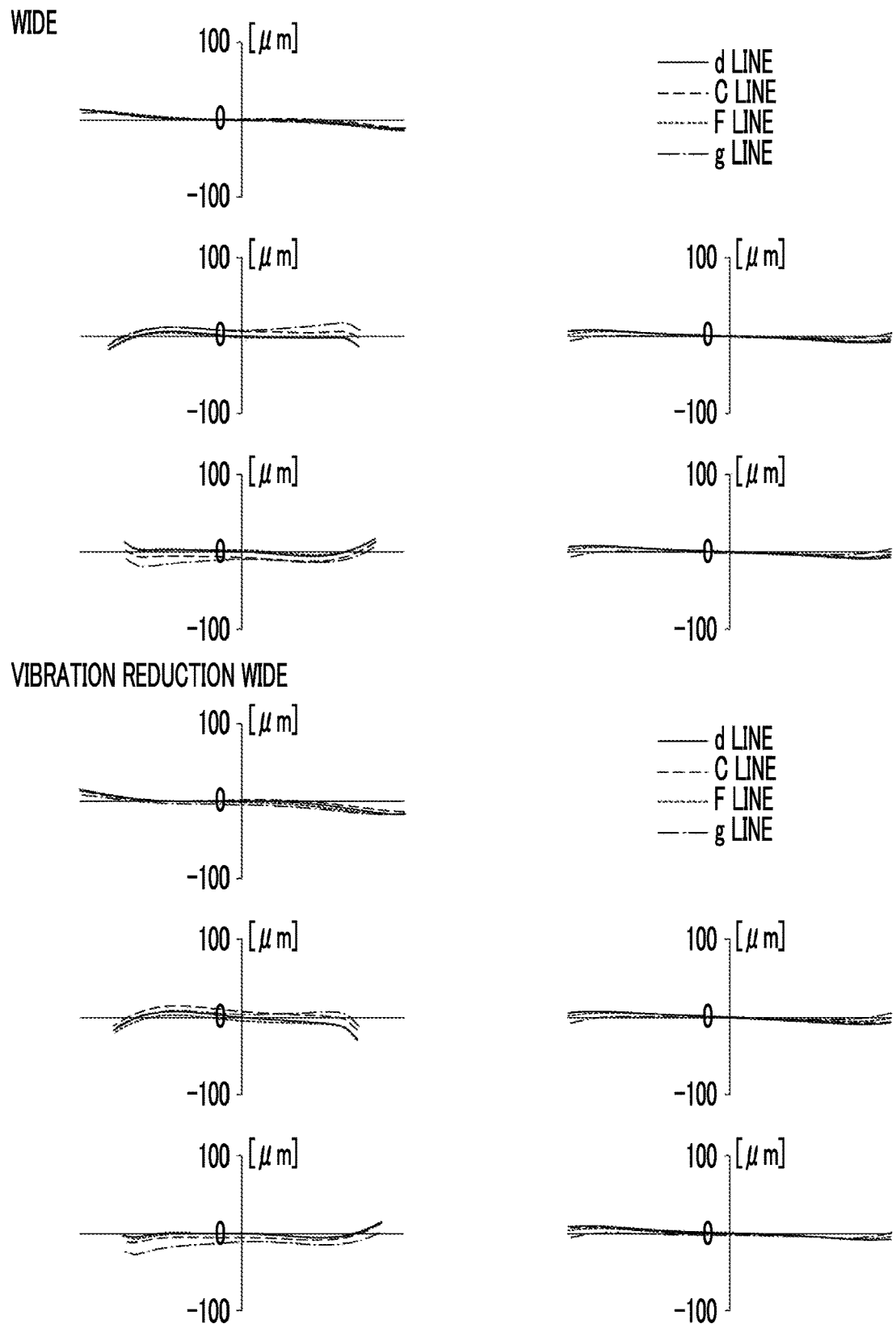
FIG. 21 is a lateral aberration diagram in a state where an image shake is not present and a lateral aberration diagram in a state where image shake correction is performed at a wide angle end of the zoom lens of Example 1 of the present disclosure.
Figure 22:
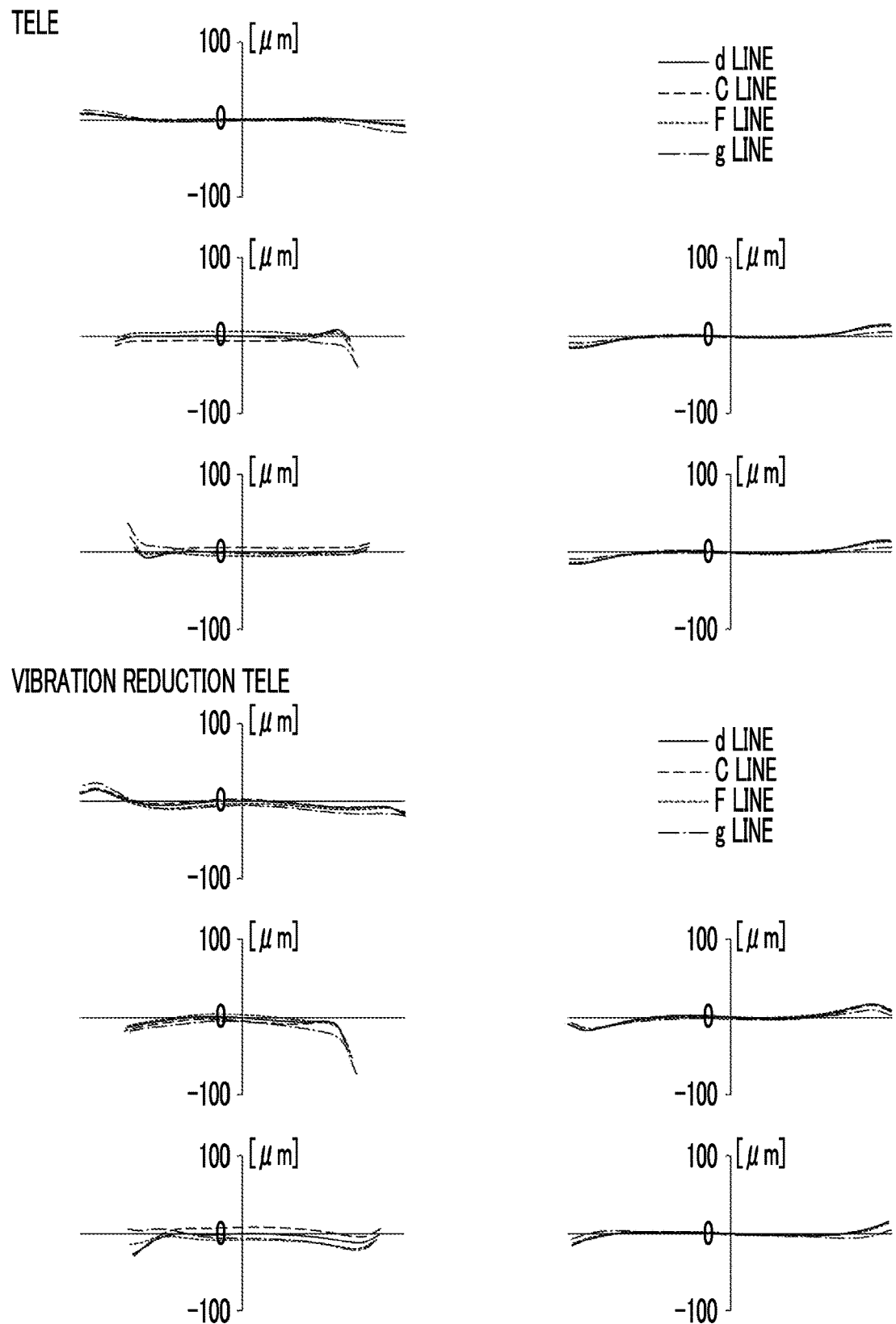
FIG. 22 is a lateral aberration diagram in a state where the image shake is not present and a lateral aberration diagram in a state where the image shake correction is performed at a telephoto end of the zoom lens of Example 1 of the present disclosure.

FIG. 12, FIG. 21, and FIG. 22 illustrate aberration diagrams in a state where the zoom lens of Example 1 is focused on the object at infinity. FIG. 12 illustrates aberration diagrams in a state where an image shake is not present. In FIG. 12, in order from the left, spherical aberration, astigmatism, distortion, and lateral chromatic aberration are illustrated. In FIG. 12, aberration in the wide angle end state is illustrated in an upper part denoted by "WIDE", aberration in the middle focal length state is illustrated in a middle part denoted by "MIDDLE", and aberration in the telephoto end state is illustrated in a lower part denoted by "TELE". In the spherical aberration diagram, a solid line, a long broken line, a short broken line, and a one-dot chain line illustrate aberration on d line, C line, F line, and g line, respectively. In the astigmatism diagram, a solid line illustrates aberration on d line in a sagittal direction, and a short broken line illustrates aberration on d line in a tangential direction. In the distortion diagram, a solid line illustrates aberration on d line. In the lateral chromatic aberration diagram, a long broken line, a short broken line, and a one-dot chain line illustrate aberration on C line, F line, and g line, respectively. In the spherical aberration diagram, FNo. means the F number. In other aberration diagrams, ω means a half angle of view.

FIG. 21 illustrates lateral aberration at the wide angle end. In FIG. 21, five aberration diagrams in a state where the image shake is not present are illustrated in an arrangement of 3 rows×2 columns in an upper part denoted by "WIDE", and five aberration diagrams in a state where the image shake caused by inclination of the optical system at 0.4° is present and the image shake correction is performed by moving the vibration proof lens group in a direction perpendicular to the optical axis Z are illustrated in an arrangement of 3 rows×2 columns in a lower part denoted by "vibration proof WIDE". Among the diagrams of three rows in the upper part of FIG. 21, the diagram in the uppermost row illustrates aberration at an angle of view of 0°, the diagram in the second row from the top illustrates aberration at 80 percent of the maximum angle of view on a positive side, and the diagram in the third row from the top illustrates aberration at 80 percent of the maximum angle of view on a negative side. The same applies to the diagrams of three rows in the lower part of FIG. 21. In the diagrams of the upper part and the diagrams of the lower part in FIG. 21, aberration in the tangential direction is illustrated in the left column, and aberration in the sagittal direction is illustrated in the right column.

In the same manner as FIG. 21, FIG. 22 illustrates lateral aberration at the telephoto end. In FIG. 22, five aberration diagrams in a state where the image shake is not present are illustrated in an upper part denoted by "TELE", and five aberration diagrams in a state where the image shake caused by inclination of the optical system at 0.4° is present and the image shake correction is performed by moving the vibration proof lens group in a direction perpendicular to the optical axis Z are illustrated in a lower part denoted by "vibration proof TELE". Among the diagrams of three rows in the upper part of FIG. 22, the diagram in the uppermost row illustrates aberration at an angle of view of 0°, the diagram in the second row from the top illustrates aberration at 80 percent of the maximum angle of view on the positive side, and the diagram in the third row from the top illustrates aberration at 80 percent of the maximum angle of view on the negative side. The same applies to the diagrams of three rows in the lower part of FIG. 22. In the diagrams of the upper part and the diagrams of the lower part in FIG. 22, aberration in the tangential direction is illustrated in the left column, and aberration in the sagittal direction is illustrated in the right column. In the lateral aberration diagram, a solid line, a long broken line, a short broken line, and a one-dot chain line illustrate aberration on d line, C line, F line, and g line, respectively.

Symbols, meanings, writing methods, and illustration methods of each data related to Example 1 are the same in the following examples unless otherwise specified. Thus, duplicate descriptions will be omitted below.

Example 2

Figure 4:
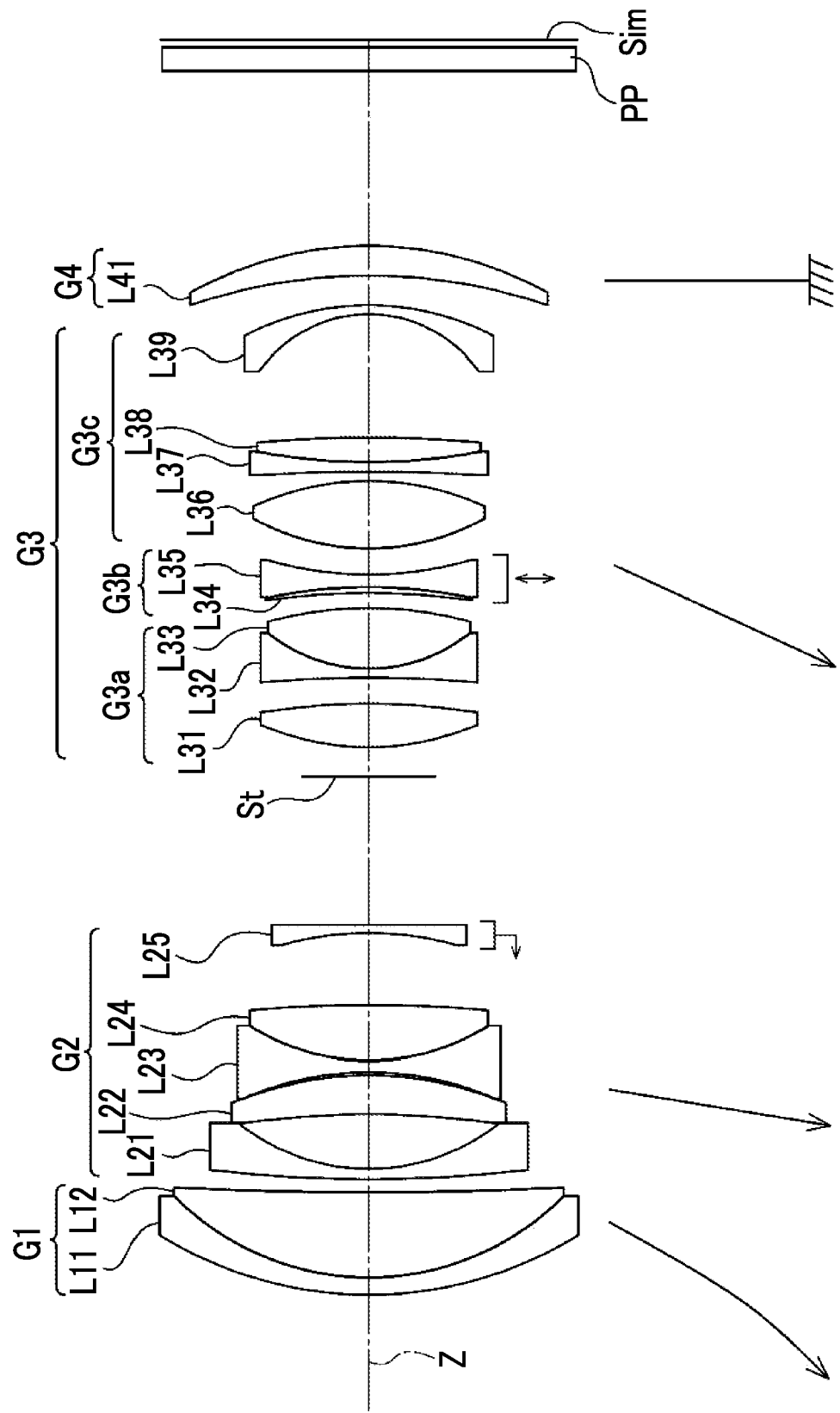
FIG. 4 is a diagram illustrating a configuration and a movement trajectory of a zoom lens of Example 2 of the present disclosure.
Figure 13:
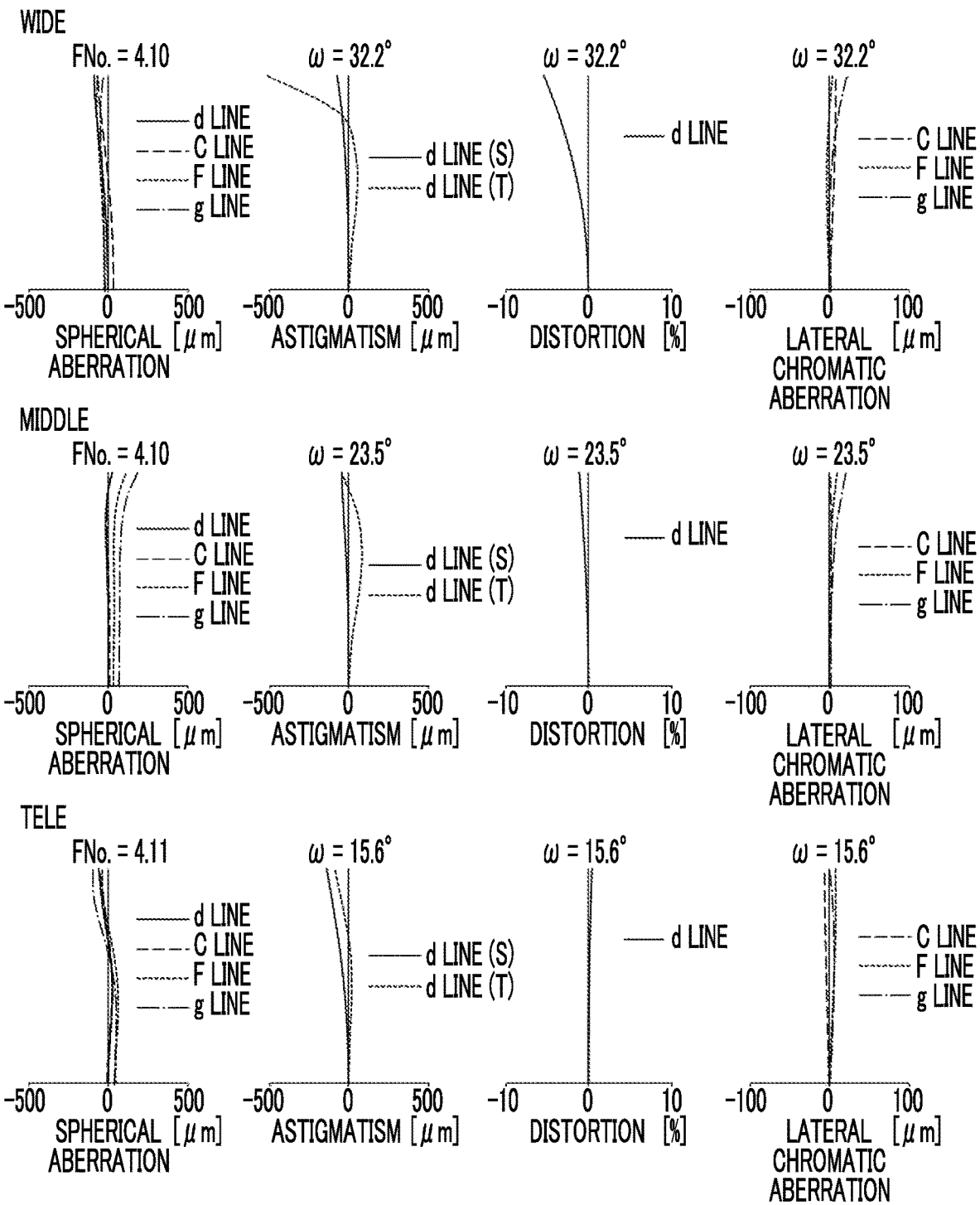
FIG. 13 is a spherical aberration diagram, an astigmatism diagram, a distortion diagram, and a lateral chromatic aberration diagram of the zoom lens of Example 2 of the present disclosure.
Figure 23:
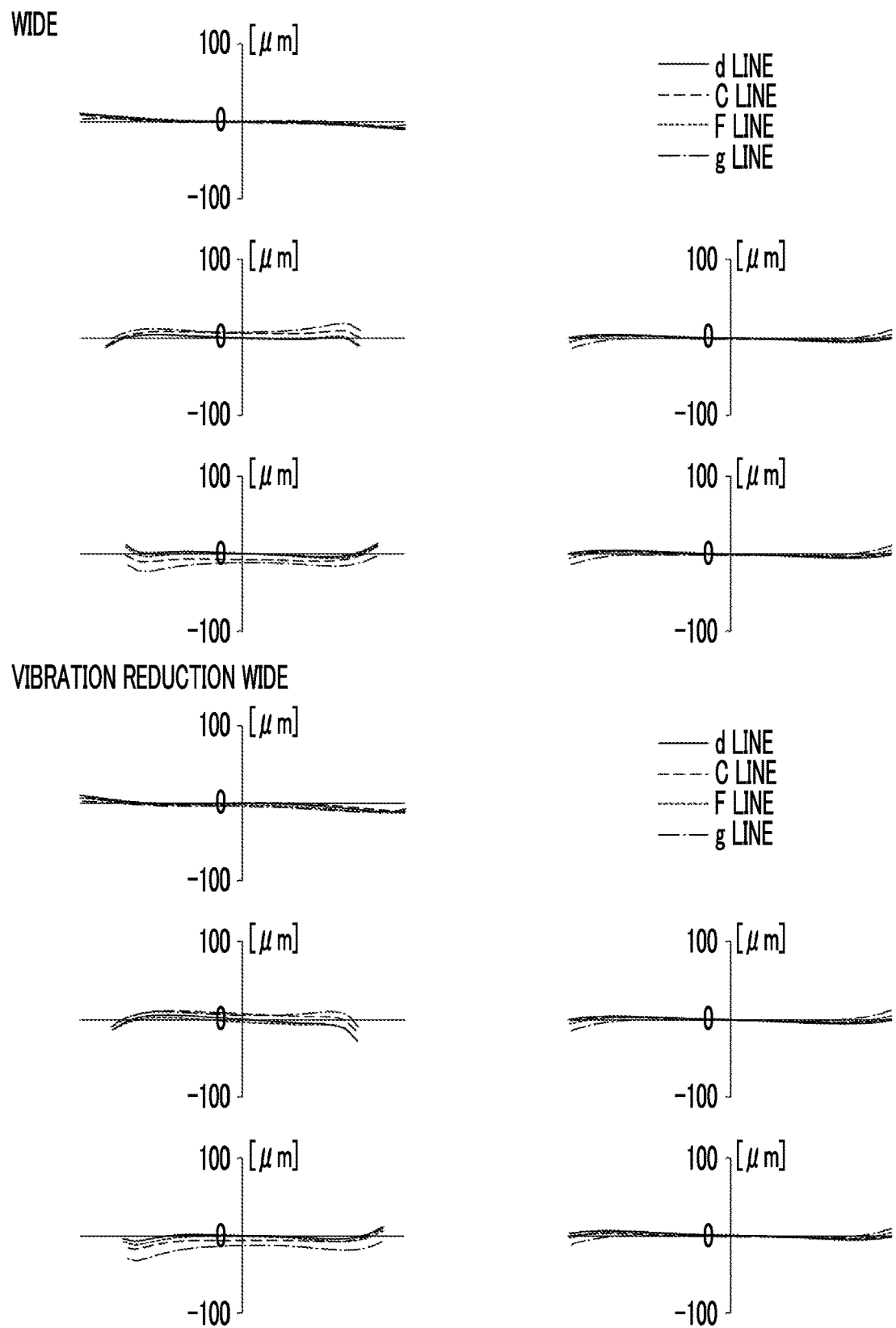
FIG. 23 is a lateral aberration diagram in a state where the image shake is not present and a lateral aberration diagram in a state where the image shake correction is performed at a wide angle end of the zoom lens of Example 2 of the present disclosure.
Figure 24:
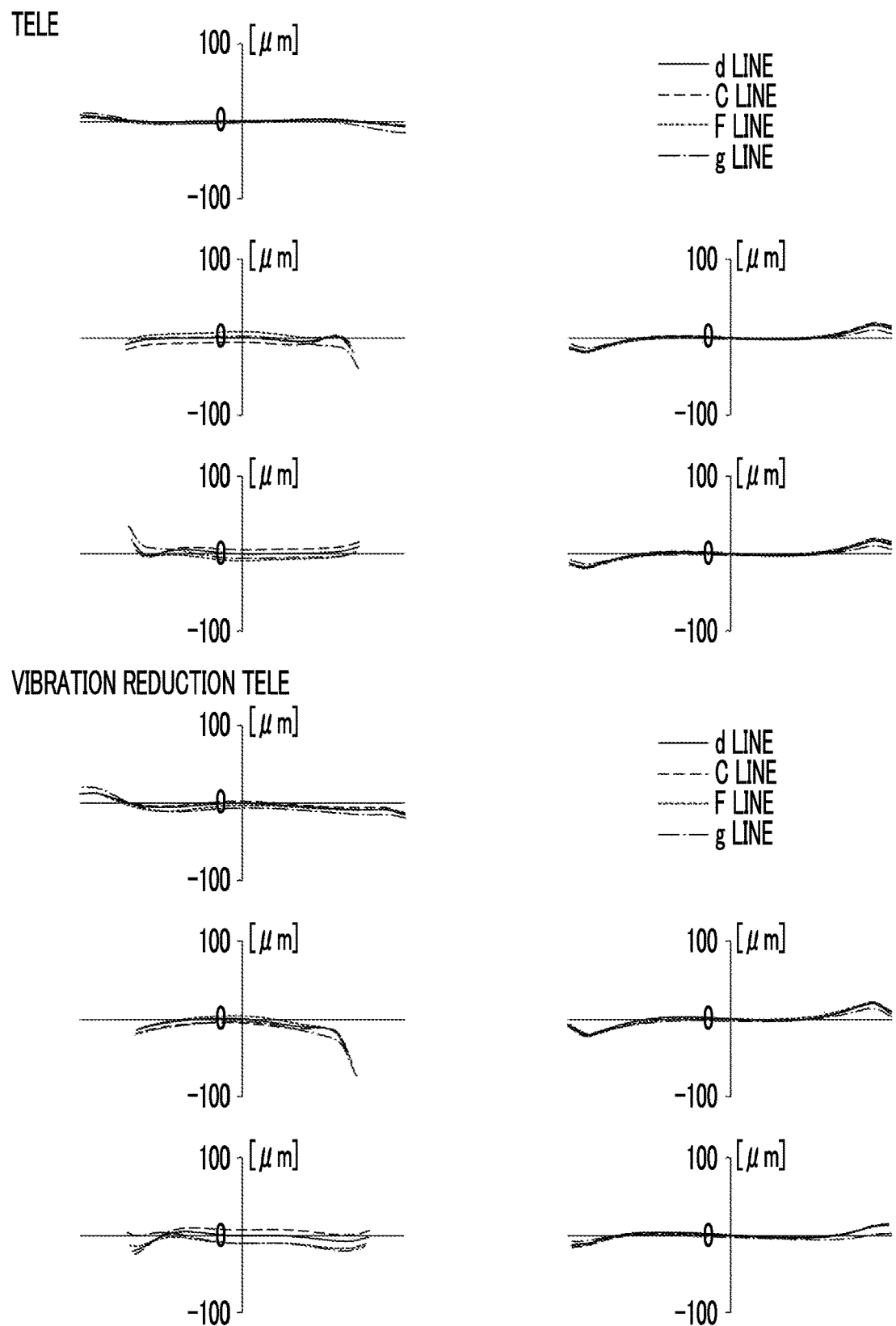
FIG. 24 is a lateral aberration diagram in a state where the image shake is not present and a lateral aberration diagram in a state where the image shake correction is performed at a telephoto end of the zoom lens of Example 2 of the present disclosure.

FIG. 4 illustrates a configuration and a movement trajectory of a zoom lens of Example 2. The zoom lens of Example 2 has the same configuration as the summary of the zoom lens of Example 1. For the zoom lens of Example 2, fundamental lens data is shown in Table 4, specifications and variable surface intervals are shown in Table 5, aspherical coefficients are shown in Table 6, and aberration diagrams are illustrated in FIG. 13, FIG. 23, and FIG. 24. FIG. 13 illustrates aberration diagrams in a state where the image shake is not present. FIG. 23 is a lateral aberration diagram at the wide angle end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part. FIG. 24 is a lateral aberration diagram at the telephoto end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part.

TABLE 4

Example 2

| Sn | R | D | Nd | vd | |
|---|---|---|---|---|---|
| 1 | 56.2333 | 2.33 | 1.91082 | 35.25 | |
| 2 | 38.7770 | 11.50 | 1.62041 | 60.29 | |
| 3 | 551.5670 | DD[3] | | | |
| 4 | 190.5509 | 1.40 | 2.00069 | 25.46 | |
| 5 | 29.6859 | 7.36 | | | |
| *6 | −108.1152 | 5.25 | 1.58313 | 59.38 | |
| *7 | −47.6815 | 0.40 | | | |
| 8 | −44.4368 | 1.49 | 1.48749 | 70.24 | |
| 9 | 31.5690 | 7.45 | 1.84666 | 23.78 | |
| 10 | −191.1160 | 9.72 | | | |
| 11 | −45.3315 | 1.05 | 1.65160 | 58.55 | |
| 12 | ∞ | DD[12] | | | |
| 13(St) | ∞ | 3.92 | | | |
| *14 | 36.5565 | 5.89 | 1.69350 | 53.20 | G3a |
| *15 | −82.2705 | 3.48 | | | |
| 16 | −183.3171 | 1.21 | 1.64769 | 33.79 | |
| 17 | 22.6770 | 8.17 | 1.43875 | 94.66 | |
| 18 | −54.3676 | 2.05 | | | |
| *19 | −93.4940 | 0.80 | 1.62426 | 23.43 | G3b |
| 20 | −68.2903 | 1.70 | 1.48749 | 70.24 | |
| 21 | 52.5620 | 3.50 | | | |
| 22 | 33.7648 | 9.09 | 1.49700 | 81.54 | G3c |
| 23 | −39.4538 | 1.25 | | | |
| 24 | −245.5976 | 1.31 | 1.67003 | 47.23 | |
| 25 | 86.0730 | 3.30 | 1.51680 | 64.20 | |
| 26 | −173.6561 | 16.50 | | | |
| 27 | −19.0122 | 1.20 | 1.90043 | 37.37 | |
| 28 | −38.3286 | DD[28] | | | |
| 29 | −78.7358 | 4.00 | 2.00272 | 19.32 | |
| 30 | −51.6974 | 23.59 | | | |
| 31 | ∞ | 3.20 | 1.51680 | 64.20 | |
| 32 | ∞ | 1.00 | | | |

TABLE 5

Example 2

| | WIDE | MIDDLE | TELE |
|---|---|---|---|
| Zr | 1.0 | 1.4 | 2.1 |
| f | 45.92 | 63.79 | 97.91 |
| FNo. | 4.10 | 4.10 | 4.11 |
| 2ω (°) | 64.4 | 47.0 | 31.2 |
| DD[3] | 1.76 | 10.69 | 25.07 |
| DD[12] | 20.06 | 12.92 | 5.26 |
| DD[28] | 4.00 | 13.52 | 24.81 |

TABLE 6

Example 2

| Sn | | |
|---|---|---|
| | 6 | 7 |
| KA | 1.0000000E+00 | 1.0000000E+00 |
| A4 | 2.7867011E−06 | 1.8275543E−06 |
| A6 | 2.3413872E−11 | −1.6888327E−09 |
| A8 | −6.8235188E−12 | −3.4461280E−12 |
| A10 | 5.5756064E−15 | −2.7487725E−15 |
| A12 | 2.7429603E−17 | 2.2812514E−17 |
| A14 | 1.6840955E−20 | 1.0757602E−19 |
| A16 | 1.6520905E−22 | 6.8722034E−23 |

| Sn | | |
|---|---|---|
| | 14 | 15 | 19 |
| KA | 1.0000000E+00 | 1.0000000E+00 | 1.0000000E+00 |
| A4 | −4.9366946E−06 | 2.7203192E−06 | 1.4389423E−06 |
| A6 | −6.1357290E−10 | 3.7348831E−09 | 7.7268564E−09 |

TABLE 6-continued

Example 2

| | | | |
|---|---|---|---|
| A8 | 7.7733317E−12 | 2.4615102E−12 | −2.3899075E−11 |
| A10 | 3.2644357E−15 | 1.4630513E−14 | 3.9616681E−14 |
| A12 | −3.3561337E−18 | 3.2679801E−17 | 1.5988470E−16 |
| A14 | 2.6472238E−19 | −1.5777862E−20 | −1.2134454E−18 |
| A16 | −1.0563227E−22 | 3.1772245E−22 | 1.6437571E−21 |

Example 3

Figure 5:
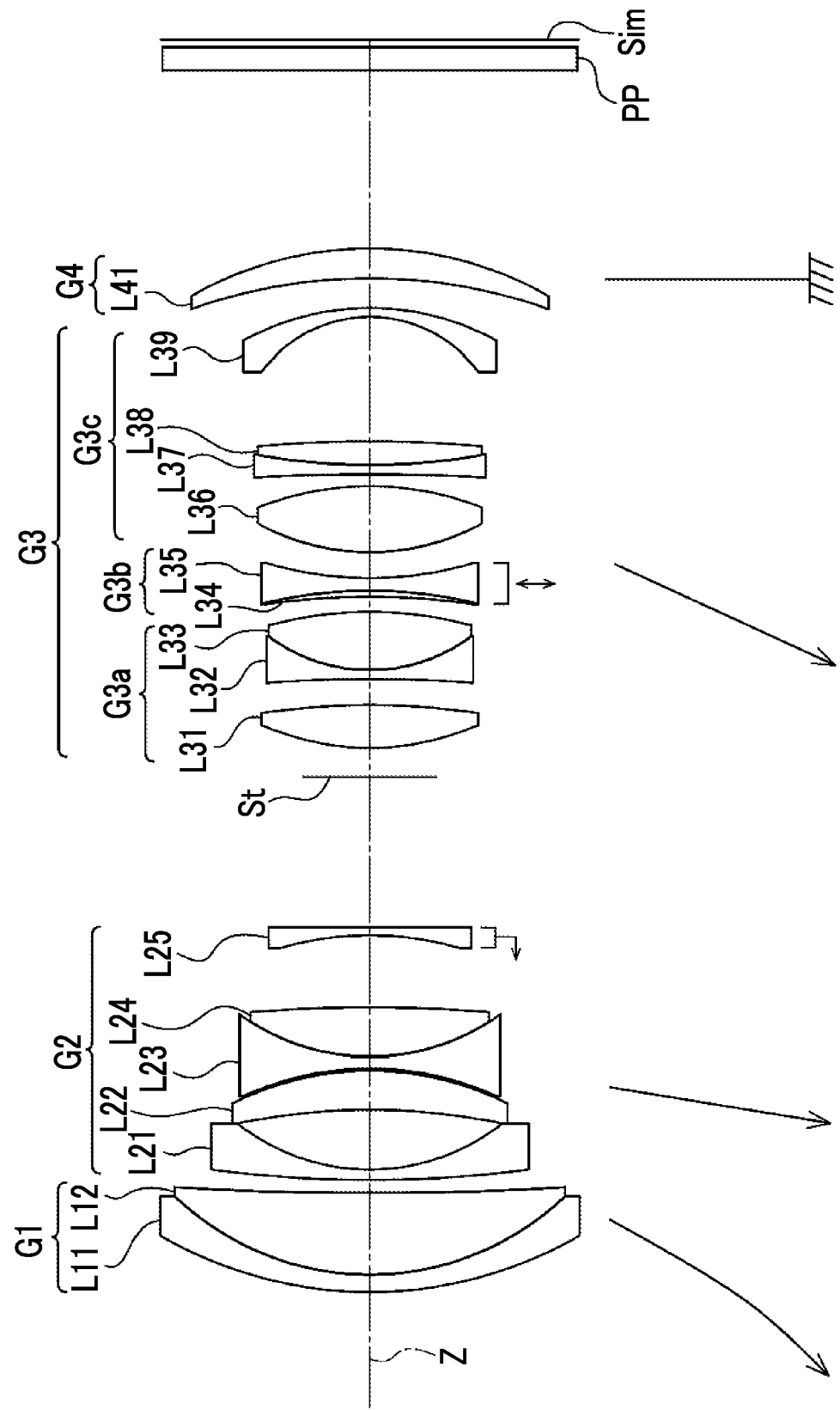
FIG. 5 is a diagram illustrating a configuration and a movement trajectory of a zoom lens of Example 3 of the present disclosure.
Figure 25:
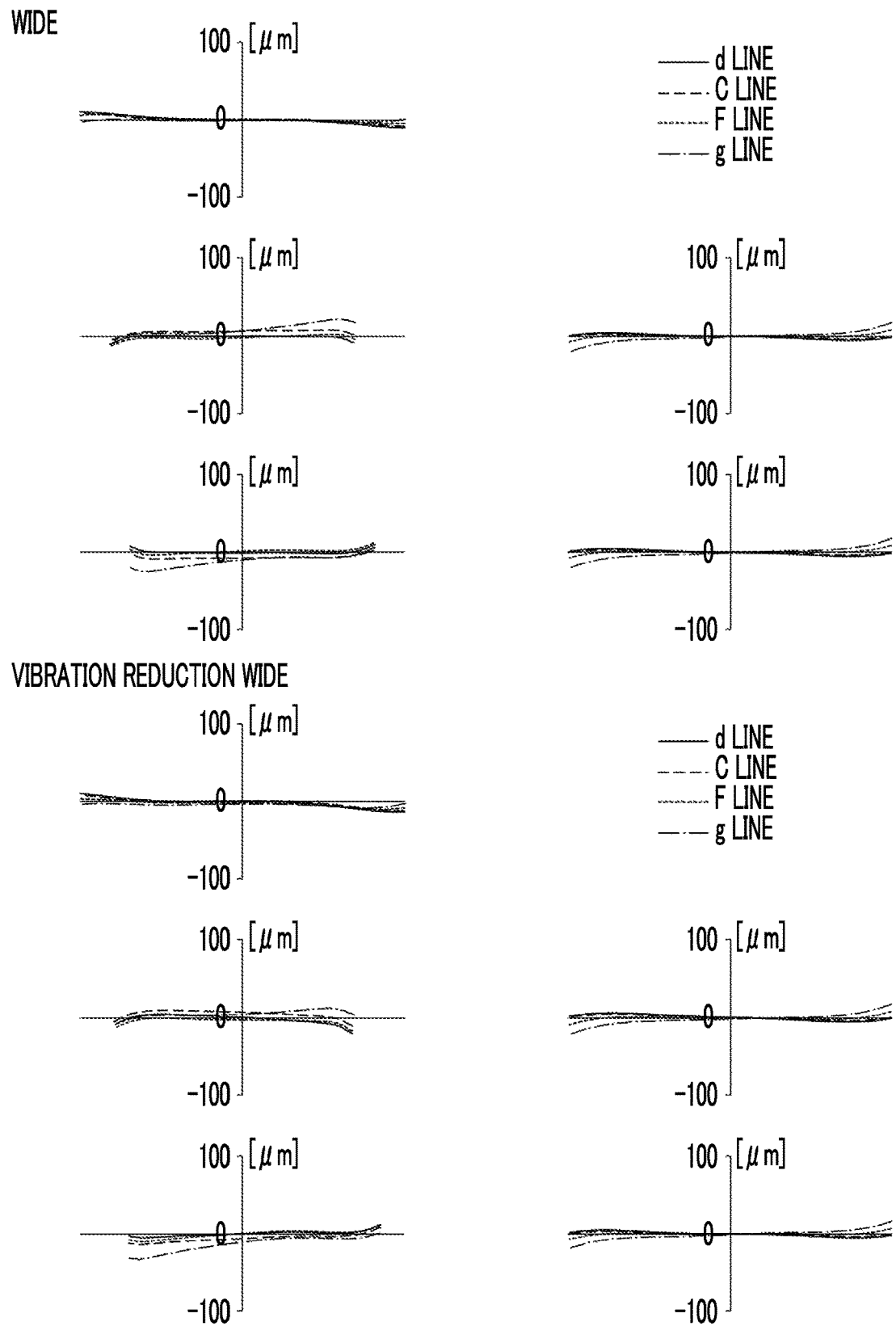
FIG. 25 is a lateral aberration diagram in a state where the image shake is not present and a lateral aberration diagram in a state where the image shake correction is performed at a wide angle end of the zoom lens of Example 3 of the present disclosure.
Figure 26:
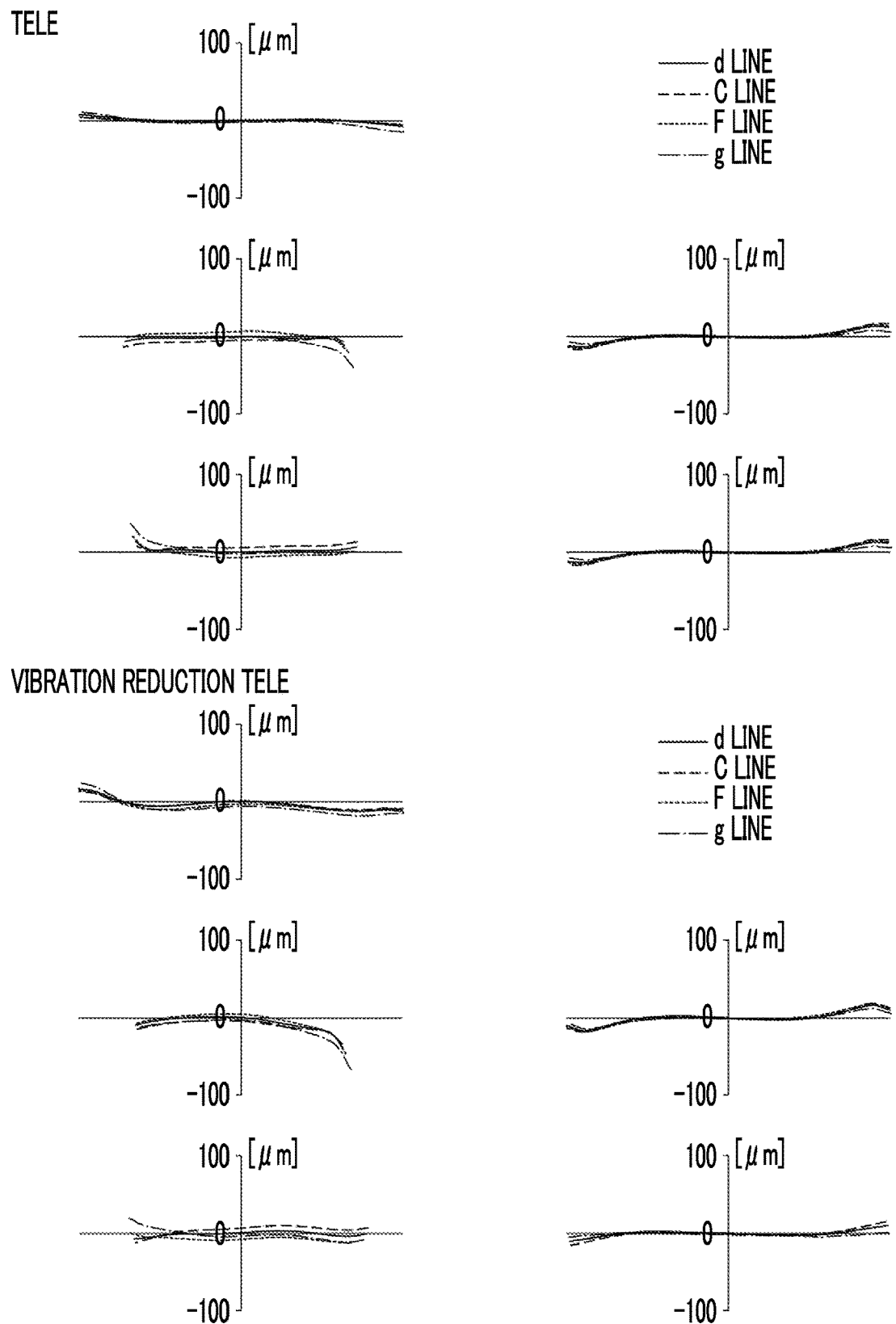
FIG. 26 is a lateral aberration diagram in a state where the image shake is not present and a lateral aberration diagram in a state where the image shake correction is performed at a telephoto end of the zoom lens of Example 3 of the present disclosure.

FIG. 5 illustrates a configuration and a movement trajectory of a zoom lens of Example 3. The zoom lens of Example 3 has the same configuration as the summary of the zoom lens of Example 1. For the zoom lens of Example 3, fundamental lens data is shown in Table 7, specifications and variable surface intervals are shown in Table 8, aspherical coefficients are shown in Table 9, and aberration diagrams are illustrated in FIG. 14, FIG. 25, and FIG. 26. FIG. 14 illustrates aberration diagrams in a state where the image shake is not present. FIG. 25 is a lateral aberration diagram at the wide angle end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part. FIG. 26 is a lateral aberration diagram at the telephoto end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part.

TABLE 7

Example 3

| Sn | R | D | Nd | vd | |
|---|---|---|---|---|---|
| 1 | 59.0536 | 2.33 | 1.91082 | 35.25 | |
| 2 | 39.7828 | 11.00 | 1.65160 | 58.55 | |
| 3 | 463.2602 | DD[3] | | | |
| 4 | 171.7200 | 1.40 | 2.00069 | 25.46 | |
| 5 | 30.1989 | 8.05 | | | |
| *6 | −86.0207 | 5.26 | 1.58313 | 59.38 | |
| *7 | −42.3231 | 0.30 | | | |
| 8 | −42.9184 | 1.49 | 1.48749 | 70.24 | |
| 9 | 31.5106 | 6.63 | 1.84666 | 23.78 | |
| 10 | −202.8157 | 9.68 | | | |
| 11 | −45.8497 | 1.05 | 1.67790 | 55.34 | |
| 12 | ∞ | DD[12] | | | |
| 13(St) | ∞ | 3.91 | | | |
| *14 | 35.4312 | 5.80 | 1.69350 | 53.20 | G3a |
| *15 | −90.6432 | 3.48 | | | |
| 16 | −208.2768 | 1.21 | 1.67270 | 32.10 | |
| 17 | 23.8723 | 7.83 | 1.43875 | 94.66 | |
| 18 | −55.5250 | 2.05 | | | |
| *19 | −95.8702 | 0.80 | 1.62426 | 23.43 | G3b |
| 20 | −65.1441 | 1.70 | 1.48749 | 70.24 | |
| 21 | 51.1806 | 3.50 | | | |
| 22 | 33.0677 | 8.89 | 1.49700 | 81.54 | G3c |
| 23 | −42.9759 | 1.59 | | | |
| 24 | −321.3782 | 1.28 | 1.65412 | 39.68 | |
| 25 | 90.9909 | 3.16 | 1.53172 | 48.84 | |
| 26 | −186.8253 | 16.64 | | | |
| 27 | −19.0148 | 1.20 | 1.90043 | 37.37 | |
| 28 | −37.1243 | DD[28] | | | |
| 29 | −75.8769 | 4.00 | 2.00272 | 19.32 | |
| 30 | −50.9735 | 23.94 | | | |

TABLE 7-continued

Example 3

| Sn | R | D | Nd | vd |
|---|---|---|---|---|
| 31 | ∞ | 3.20 | 1.51680 | 64.20 |
| 32 | ∞ | 1.00 | | |

TABLE 8

Example 3

| | WIDE | MIDDLE | TELE |
|---|---|---|---|
| Zr | 1.0 | 1.4 | 2.1 |
| f | 45.90 | 63.76 | 97.87 |
| FNo. | 4.10 | 4.10 | 4.11 |
| 2ω (°) | 64.6 | 47.0 | 31.2 |
| DD[3] | 1.76 | 10.60 | 25.23 |
| DD[12] | 20.27 | 12.98 | 5.26 |
| DD[28] | 4.00 | 13.71 | 25.08 |

TABLE 9

Example 3

| | Sn | |
|---|---|---|
| | 6 | 7 |
| KA | 1.0000000E+00 | 1.0000000E+00 |
| A4 | 1.9389227E−06 | 1.5018373E−06 |
| A6 | −1.0936623E−09 | −2.1549402E−09 |
| A8 | −4.9722754E−12 | −1.9791881E−12 |
| A10 | 2.0921291E−15 | −4.4620849E−15 |
| A12 | 1.9953353E−18 | −1.4705575E−18 |
| A14 | −1.5788769E−20 | 3.4222076E−20 |
| A16 | 1.8950403E−22 | 1.6863107E−22 |

| | Sn | | |
|---|---|---|---|
| | 14 | 15 | 19 |
| KA | 1.0000000E+00 | 1.0000000E+00 | 1.0000000E+00 |
| A4 | −4.5766087E−06 | 2.8909029E−06 | 1.3794130E−06 |
| A6 | −1.2530587E−09 | 2.5271875E−09 | 7.3315101E−09 |
| A8 | 2.4939046E−12 | 2.1817037E−13 | −2.6201367E−11 |
| A10 | 1.5248846E−15 | 1.1813508E−15 | 4.0628672E−14 |
| A12 | −8.5201115E−18 | 4.6607585E−18 | 7.7434988E−16 |
| A14 | −1.3837710E−19 | −5.2083849E−20 | −5.4157443E−18 |
| A16 | 9.5813326E−22 | 5.1597088E−22 | 9.8930485E−21 |

Example 4

Figure 6:
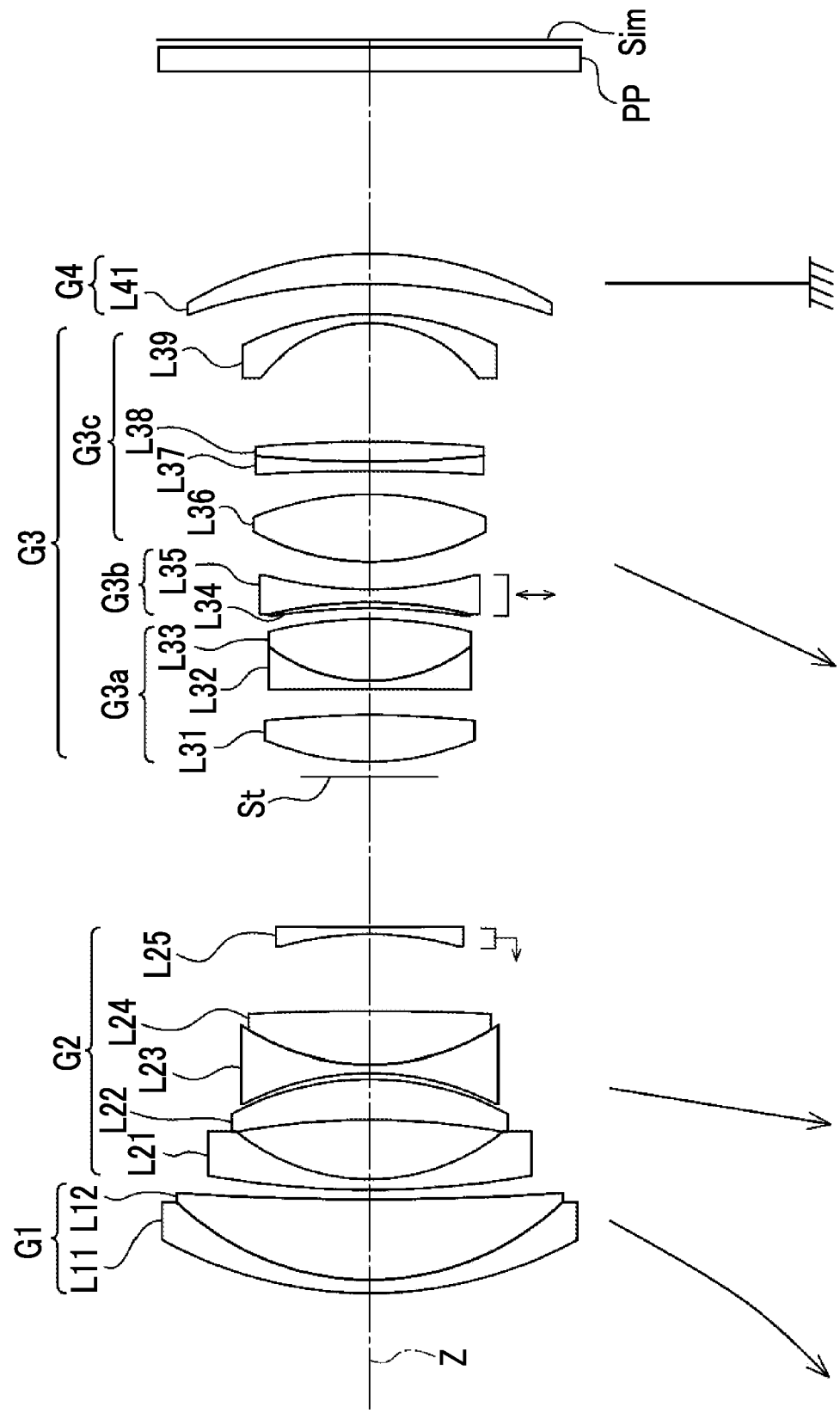
FIG. 6 is a diagram illustrating a configuration and a movement trajectory of a zoom lens of Example 4 of the present disclosure.
Figure 27:
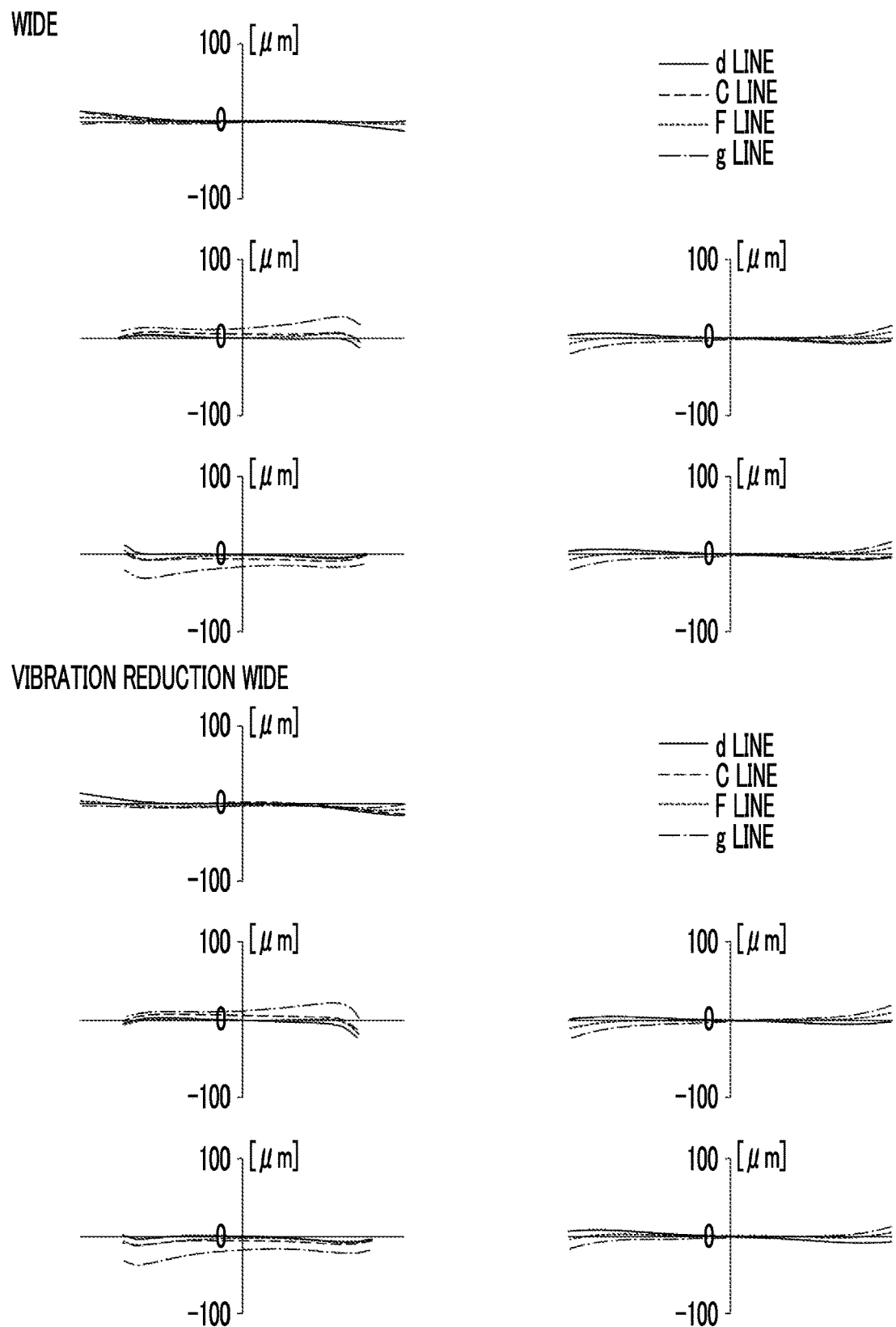
FIG. 27 is a lateral aberration diagram in a state where the image shake is not present and a lateral aberration diagram in a state where the image shake correction is performed at a wide angle end of the zoom lens of Example 4 of the present disclosure.
Figure 28:
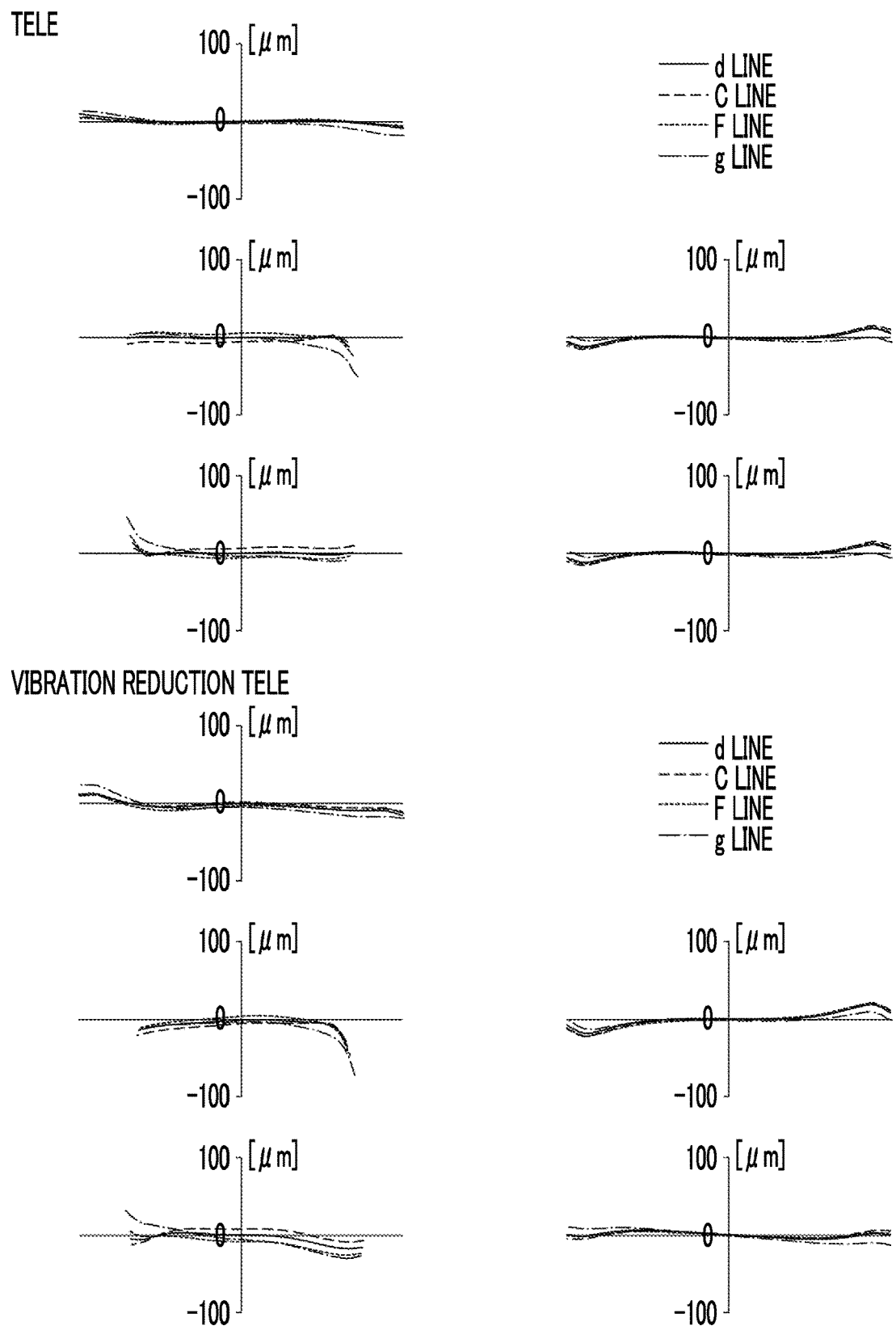
FIG. 28 is a lateral aberration diagram in a state where the image shake is not present and a lateral aberration diagram in a state where the image shake correction is performed at a telephoto end of the zoom lens of Example 4 of the present disclosure.

FIG. 6 illustrates a configuration and a movement trajectory of a zoom lens of Example 4. The zoom lens of Example 4 has the same configuration as the summary of the zoom lens of Example 1. For the zoom lens of Example 4, fundamental lens data is shown in Table 10, specifications and variable surface intervals are shown in Table 11, aspherical coefficients are shown in Table 12, and aberration diagrams are illustrated in FIG. 15, FIG. 27, and FIG. 28. FIG. 15 illustrates aberration diagrams in a state where the image shake is not present. FIG. 27 is a lateral aberration diagram at the wide angle end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part. FIG. 28 is a lateral aberration diagram at the telephoto end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part.

TABLE 10

Example 4

| Sn | R | D | Nd | νd | |
|---|---|---|---|---|---|
| 1 | 60.0795 | 1.75 | 1.91082 | 35.25 | |
| 2 | 38.5820 | 10.68 | 1.69680 | 55.53 | |
| 3 | 416.6928 | DD[3] | | | |
| 4 | 130.7211 | 1.40 | 2.00069 | 25.46 | |
| 5 | 29.3295 | 7.86 | | | |
| *6 | −98.1999 | 5.33 | 1.58313 | 59.38 | |
| *7 | −41.3675 | 0.83 | | | |
| 8 | −38.0990 | 1.11 | 1.48749 | 70.24 | |
| 9 | 32.3948 | 7.01 | 1.85896 | 22.73 | |
| 10 | −349.8190 | 10.17 | | | |
| 11 | −45.5542 | 0.95 | 1.60311 | 60.64 | |
| 12 | 3302.2488 | DD[12] | | | |
| 13(St) | ∞ | 2.00 | | | |
| *14 | 34.9566 | 6.20 | 1.69350 | 53.20 | G3a |
| *15 | −113.3501 | 3.44 | | | |
| 16 | −865.6262 | 1.07 | 1.68893 | 31.07 | |
| 17 | 22.9444 | 8.18 | 1.43875 | 94.66 | |
| 18 | −57.0952 | 1.43 | | | |
| *19 | −82.5912 | 0.80 | 1.62426 | 23.43 | G3b |
| 20 | −59.0596 | 1.70 | 1.48749 | 70.24 | |

TABLE 10-continued

Example 4

| Sn | R | D | Nd | νd | |
|---|---|---|---|---|---|
| 21 | 54.6885 | 3.65 | | | |
| 22 | 32.9464 | 8.94 | 1.49700 | 81.54 | G3c |
| 23 | −42.5921 | 3.10 | | | |
| 24 | −255.7067 | 1.23 | 1.60562 | 43.71 | |
| 25 | 151.1080 | 2.64 | 1.56384 | 60.67 | |
| 26 | −174.4290 | 15.57 | | | |
| 27 | −18.9094 | 1.20 | 1.90043 | 37.37 | |
| 28 | −38.0404 | DD[28] | | | |
| 29 | −76.7125 | 4.00 | 2.00272 | 19.32 | |
| 30 | −50.3441 | 24.14 | | | |
| 31 | ∞ | 3.20 | 1.51680 | 64.20 | |
| 32 | ∞ | 1.00 | | | |

TABLE 11

Example 4

| | WIDE | MIDDLE | TELE |
|---|---|---|---|
| Zr | 1.0 | 1.4 | 2.1 |
| f | 46.35 | 64.38 | 97.08 |
| FNo. | 4.10 | 4.10 | 4.11 |
| 2ω (°) | 63.4 | 46.4 | 31.4 |
| DD[3] | 1.27 | 10.25 | 22.97 |
| DD[12] | 19.87 | 12.79 | 5.25 |
| DD[28] | 4.00 | 13.27 | 24.49 |

TABLE 12

Example 4

| | Sn | | | |
|---|---|---|---|---|
| | 6 | 7 | 14 | 15 |
| KA | 1.0000000E+00 | 1.0000000E+00 | 1.0000000E+00 | 1.0000000E+00 |
| A4 | 1.7125285E−06 | 9.3678937E−07 | −4.4334085E−06 | 3.0884873E−06 |
| A6 | −1.3168943E−09 | −3.7632453E−09 | −1.2088084E−09 | 3.2367950E−09 |
| A8 | −8.0881844E−12 | −1.7723340E−12 | 3.9766671E−12 | −7.3780444E−13 |
| A10 | 1.0804870E−15 | −2.5289039E−15 | −3.8183155E−16 | −1.4999559E−15 |
| A12 | 1.9331938E−17 | 2.6006644E−18 | −2.6656364E−17 | 6.4846461E−18 |
| A14 | 2.0069295E−20 | 1.9971973E−20 | −4.3099700E−20 | −4.9099932E−21 |
| A16 | −1.5048799E−22 | −3.5697344E−23 | 7.7056746E−22 | 3.1577879E−22 |

| | Sn |
|---|---|
| | 19 |
| KA | 1.0000000E+00 |
| A3 | 0.0000000E+00 |
| A4 | 1.3433639E−06 |
| A5 | 8.0128255E−08 |
| A6 | −1.4312453E−10 |
| A7 | −2.2051395E−11 |
| A8 | 2.0466507E−13 |
| A9 | 6.0903977E−14 |
| A10 | 7.0910351E−15 |
| A11 | 3.1487220E−16 |
| A12 | −1.2920936E−17 |
| A13 | 7.5383024E−19 |
| A14 | −7.3310627E−19 |
| A15 | 2.7485269E−20 |
| A16 | −7.6507724E−22 |

Example 5

Figure 7:
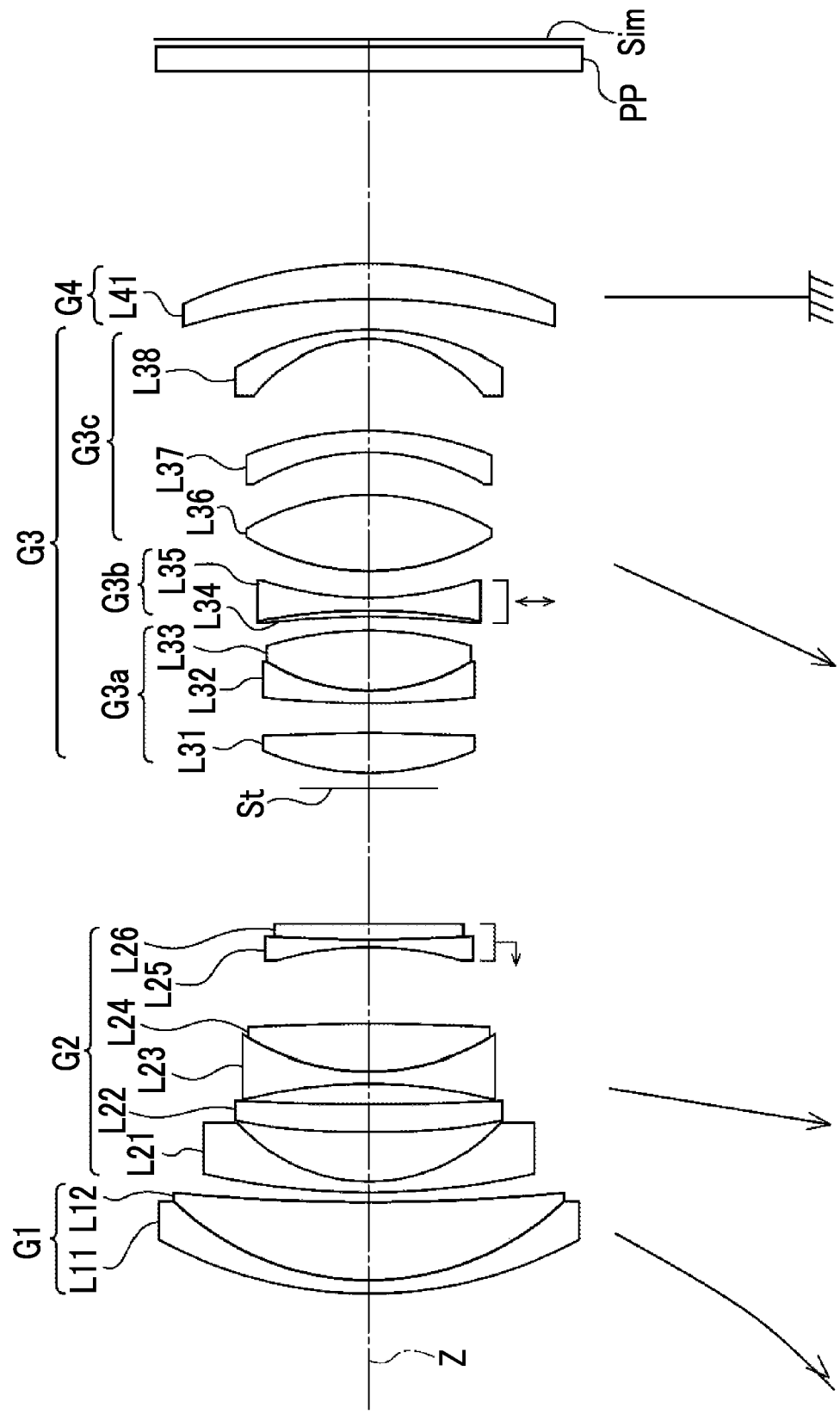
FIG. 7 is a diagram illustrating a configuration and a movement trajectory of a zoom lens of Example 5 of the present disclosure.
Figure 16:
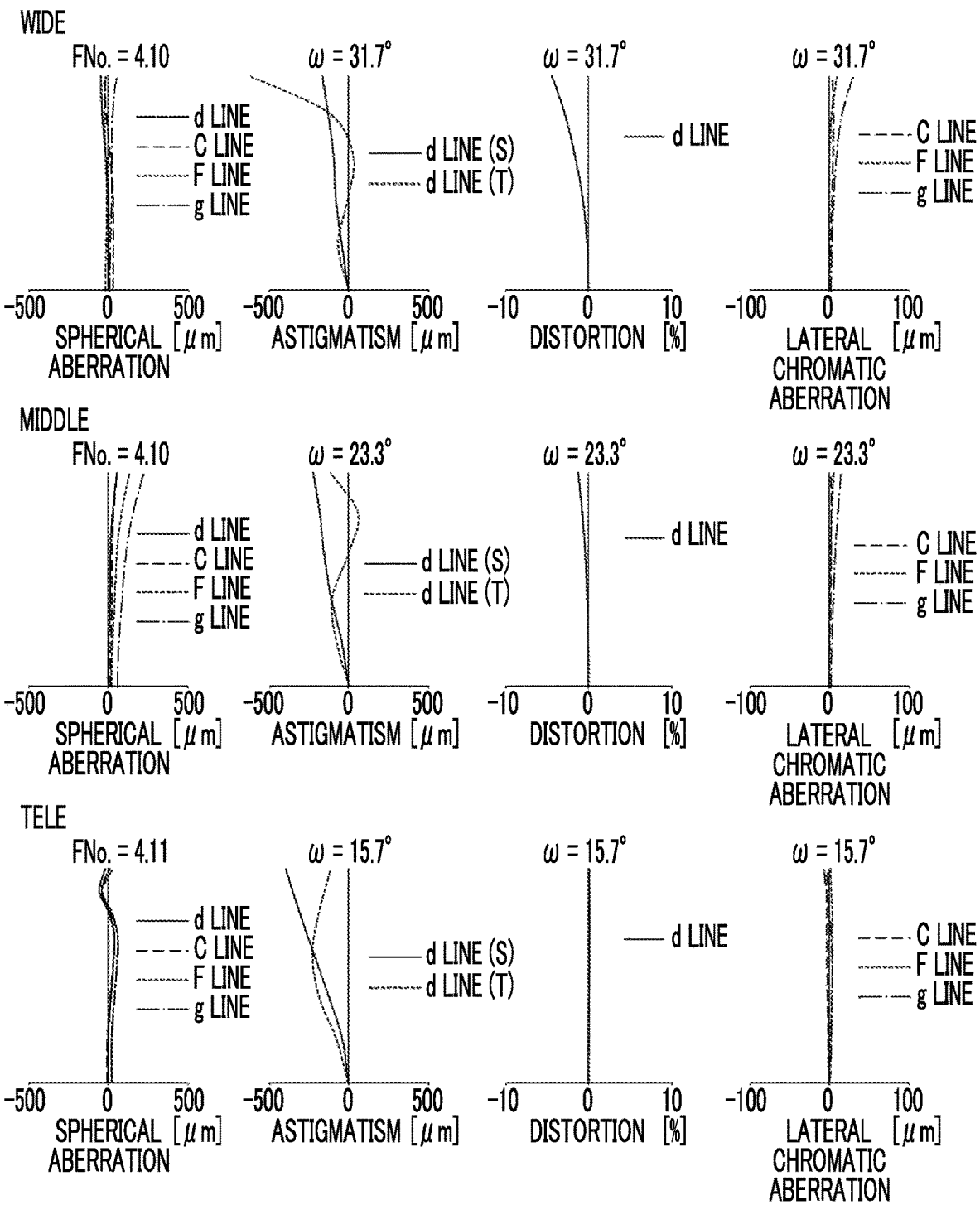
FIG. 16 is a spherical aberration diagram, an astigmatism diagram, a distortion diagram, and a lateral chromatic aberration diagram of the zoom lens of Example 5 of the present disclosure.
Figure 29:
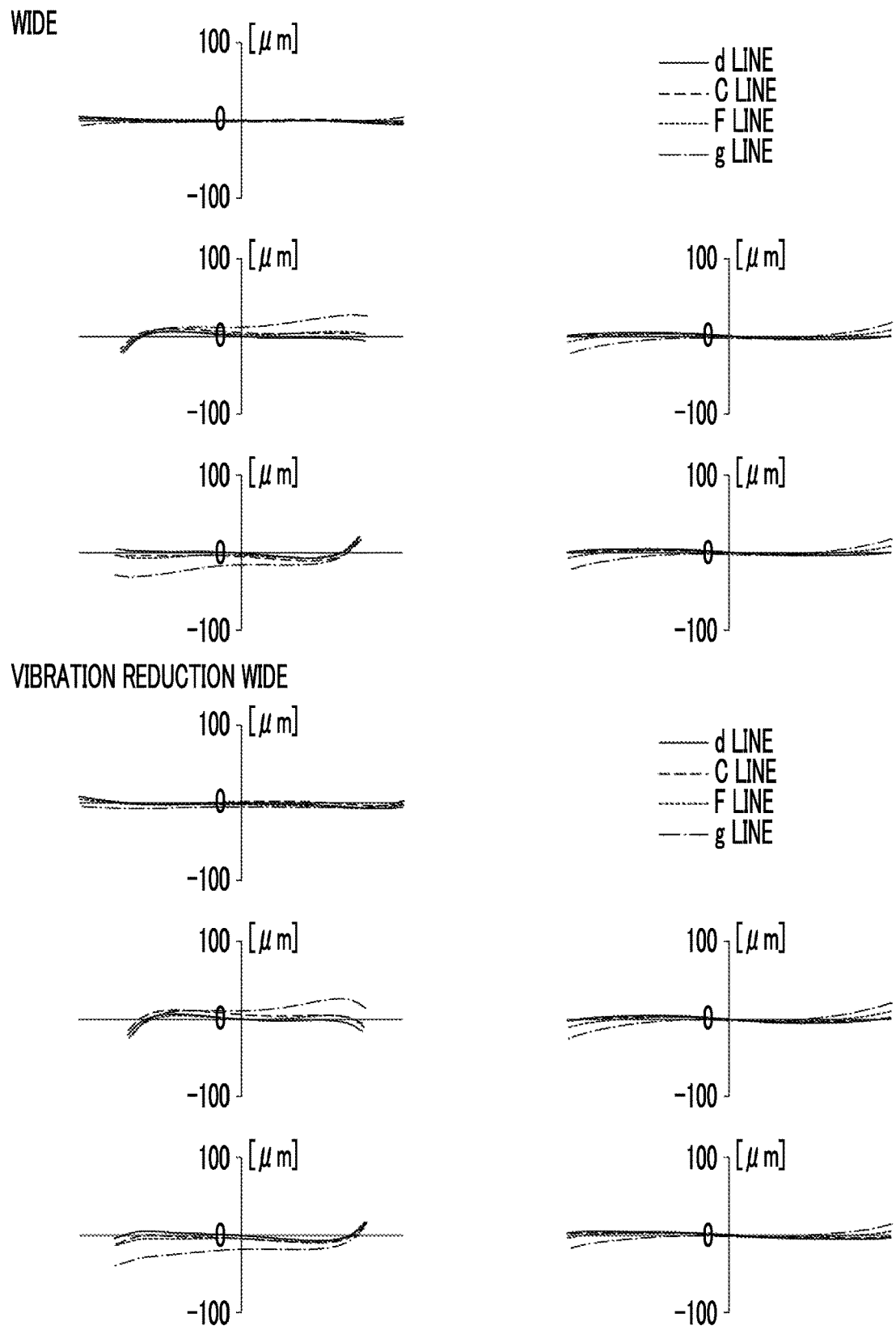
FIG. 29 is a lateral aberration diagram in a state where the image shake is not present and a lateral aberration diagram in a state where the image shake correction is performed at a wide angle end of the zoom lens of Example 5 of the present disclosure.
Figure 30:
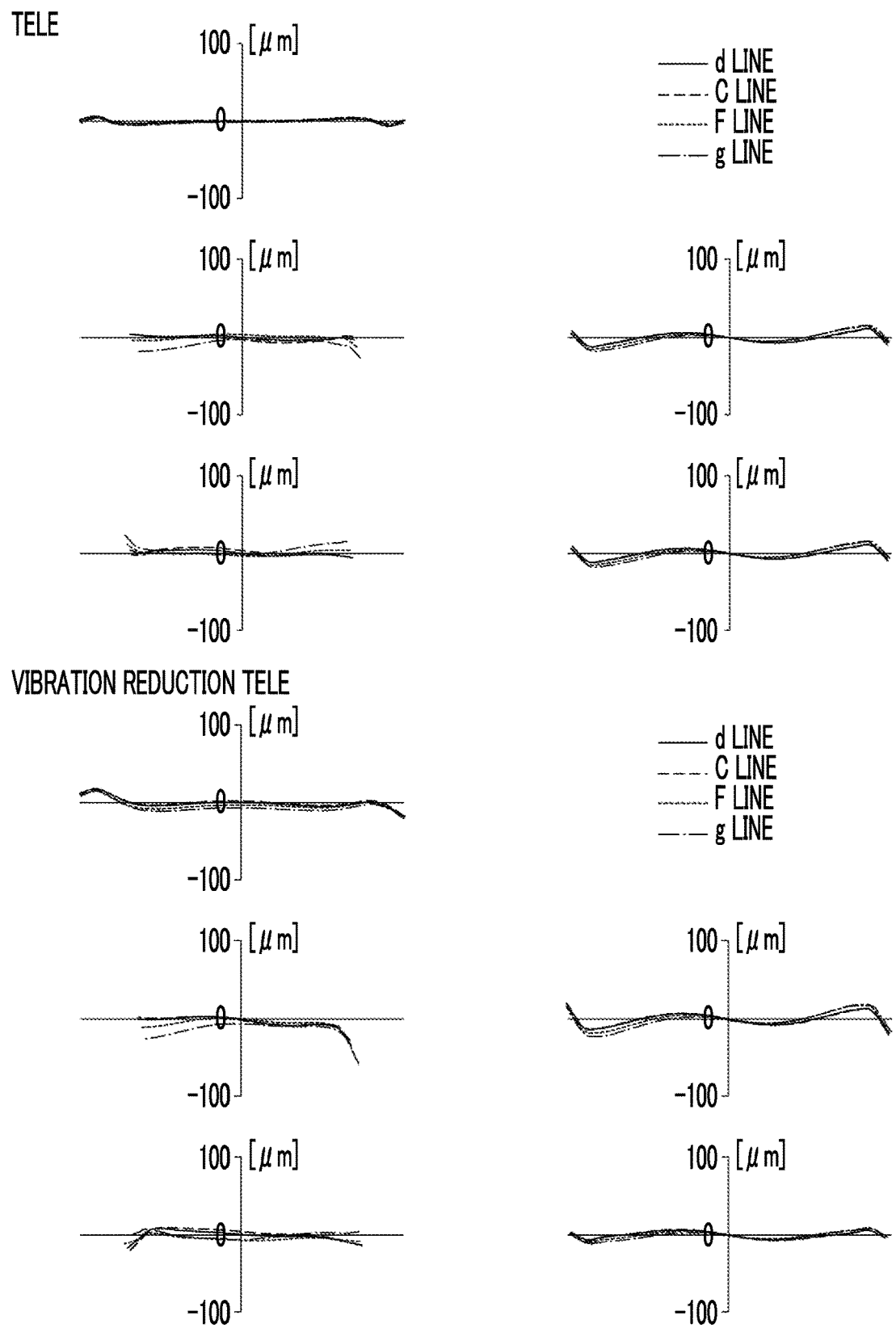
FIG. 30 is a lateral aberration diagram in a state where the image shake is not present and a lateral aberration diagram in a state where the image shake correction is performed at a telephoto end of the zoom lens of Example 5 of the present disclosure.

FIG. 7 illustrates a configuration and a movement trajectory of a zoom lens of Example 5. The zoom lens of Example 5 has the same configuration as the summary of the zoom lens of Example 1 except that the second lens group G2 consists of six lenses of lenses L21 to L26 in order from the object side to the image side, the third c lens group G3c consists of three lenses of the lenses L36 to L38 in order from the object side to the image side, and the focus lens group consists of a cemented lens of the lens L25 and the lens L26. Above is the summary of the zoom lens of Example 5. For the zoom lens of Example 5, fundamental lens data is shown in Table 13, specifications and variable surface intervals are shown in Table 14, aspherical coefficients are shown in Table 15, and aberration diagrams are illustrated in FIG. 16, FIG. 29, and FIG. 30. FIG. 16 illustrates aberration diagrams in a state where the image shake is not present. FIG. 29 is a lateral aberration diagram at the wide angle end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part. FIG. 30 is a lateral aberration diagram at the telephoto end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part.

TABLE 13

Example 5

| Sn | R | D | Nd | vd | |
|---|---|---|---|---|---|
| 1 | 59.9145 | 1.75 | 1.74950 | 35.33 | |
| 2 | 38.5179 | 10.25 | 1.61800 | 63.33 | |
| 3 | 280.8010 | DD[3] | | | |
| 4 | 103.5550 | 1.40 | 1.87070 | 40.73 | |
| 5 | 24.2264 | 6.50 | | | |
| *6 | 195.8777 | 3.68 | 1.51633 | 64.06 | |
| *7 | 1158.5121 | 2.61 | | | |
| 8 | −69.9775 | 1.58 | 1.48749 | 70.24 | |
| 9 | 32.1371 | 6.19 | 1.95375 | 32.32 | |
| 10 | −304.5184 | 10.04 | | | |
| 11 | −45.1265 | 1.01 | 1.75500 | 52.32 | |
| 12 | 236.1595 | 2.01 | 1.89286 | 20.36 | |
| 13 | −51236.3820 | DD[13] | | | |
| 14(St) | ∞ | 2.00 | | | |
| *15 | 34.9073 | 5.22 | 1.69350 | 53.20 | G3a |
| *16 | −179.5844 | 3.92 | | | |
| 17 | 138.4806 | 1.62 | 1.79504 | 28.69 | |
| 18 | 26.6863 | 7.89 | 1.43875 | 94.66 | |
| 19 | −48.0567 | 1.80 | | | |
| *20 | −111.5200 | 0.80 | 1.62426 | 23.43 | G3b |
| 21 | −82.6057 | 1.70 | 1.48749 | 70.24 | |
| 22 | 46.3097 | 3.50 | | | |
| 23 | 32.9179 | 9.96 | 1.49700 | 81.54 | G3c |
| 24 | −33.1260 | 5.60 | | | |
| 25 | 30.8317 | 2.83 | 1.79952 | 42.22 | |
| 26 | −44.0307 | 11.90 | | | |
| 27 | −20.0394 | 1.25 | 1.77250 | 49.60 | |
| 28 | −35.5640 | DD[28] | | | |
| 29 | −88.3734 | 4.64 | 1.95906 | 17.47 | |
| 30 | −61.6679 | 25.22 | | | |
| 31 | ∞ | 3.20 | 1.51680 | 64.20 | |
| 32 | ∞ | 1.00 | | | |

TABLE 14

Example 5

| | WIDE | MIDDLE | TELE |
|---|---|---|---|
| Zr | 1.0 | 1.4 | 2.1 |
| f | 46.36 | 64.39 | 97.10 |
| FNo. | 4.10 | 4.10 | 4.11 |
| 2ω (°) | 63.4 | 46.6 | 31.4 |
| DD[3] | 1.29 | 10.25 | 25.72 |
| DD[13] | 17.83 | 10.76 | 3.99 |
| DD[28] | 4.00 | 14.61 | 26.61 |

TABLE 15

Example 5

| Sn | 6 | 7 |
|---|---|---|
| KA | 1.0000000E+00 | 1.0000000E+00 |
| A3 | 0.0000000E+00 | 0.0000000E+00 |
| A4 | 1.0439877E−05 | 5.8504956E−06 |
| A5 | −8.4854274E−08 | 1.9917078E−07 |
| A6 | 2.2947946E−09 | −1.3129676E−08 |
| A7 | −2.0455972E−10 | −5.1392625E−10 |
| A8 | −1.6180910E−11 | −1.1165551E−11 |
| A9 | −4.7573394E−13 | −1.3522857E−13 |
| A10 | 2.3556162E−15 | 6.3503674E−15 |
| A11 | 1.1011818E−15 | 9.6495096E−16 |
| A12 | 7.0367686E−17 | 8.2023830E−17 |
| A13 | 2.3891267E−18 | 5.1497105E−18 |
| A14 | −2.1981242E−20 | 2.0372860E−19 |
| A15 | −1.1104986E−20 | −3.0113082E−21 |
| A16 | −1.0851973E−21 | −1.5930472E−21 |
| A17 | −7.1997714E−23 | −1.8789946E−22 |
| A18 | −3.1106296E−24 | −1.3186427E−23 |
| A19 | 3.1974895E−26 | −1.6460901E−25 |
| A20 | 2.9075821E−26 | 8.9817269E−26 |

| Sn | 15 | 16 | 20 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | −4.6632202E−06 | 3.7525867E−06 | 1.7590148E−06 |
| A5 | −2.6006427E−08 | −5.3631258E−08 | −7.6564106E−09 |
| A6 | 1.6619734E−09 | 4.0718534E−09 | 8.3796731E−09 |
| A7 | 9.2553285E−11 | 2.7684874E−10 | −1.1212953E−10 |
| A8 | 3.5079862E−12 | 1.0279437E−11 | −2.5444392E−11 |
| A9 | 4.6821825E−14 | 3.1699117E−13 | −9.2084973E−13 |
| A10 | −4.4516980E−15 | 1.3220615E−14 | 1.4869721E−13 |
| A11 | 1.4311047E−16 | 1.2530547E−15 | 2.6772518E−14 |
| A12 | 1.7121758E−16 | 1.1399773E−16 | 1.2372157E−15 |
| A13 | 3.7419049E−17 | 1.0649208E−17 | −1.7078599E−16 |
| A14 | 4.5042063E−18 | 2.0479213E−18 | −2.5410942E−17 |
| A15 | 8.6228488E−20 | 4.8045452E−19 | 1.0460049E−18 |
| A16 | −3.2958554E−20 | −4.3792920E−20 | 3.8041098E−20 |

Example 6

Figure 8:
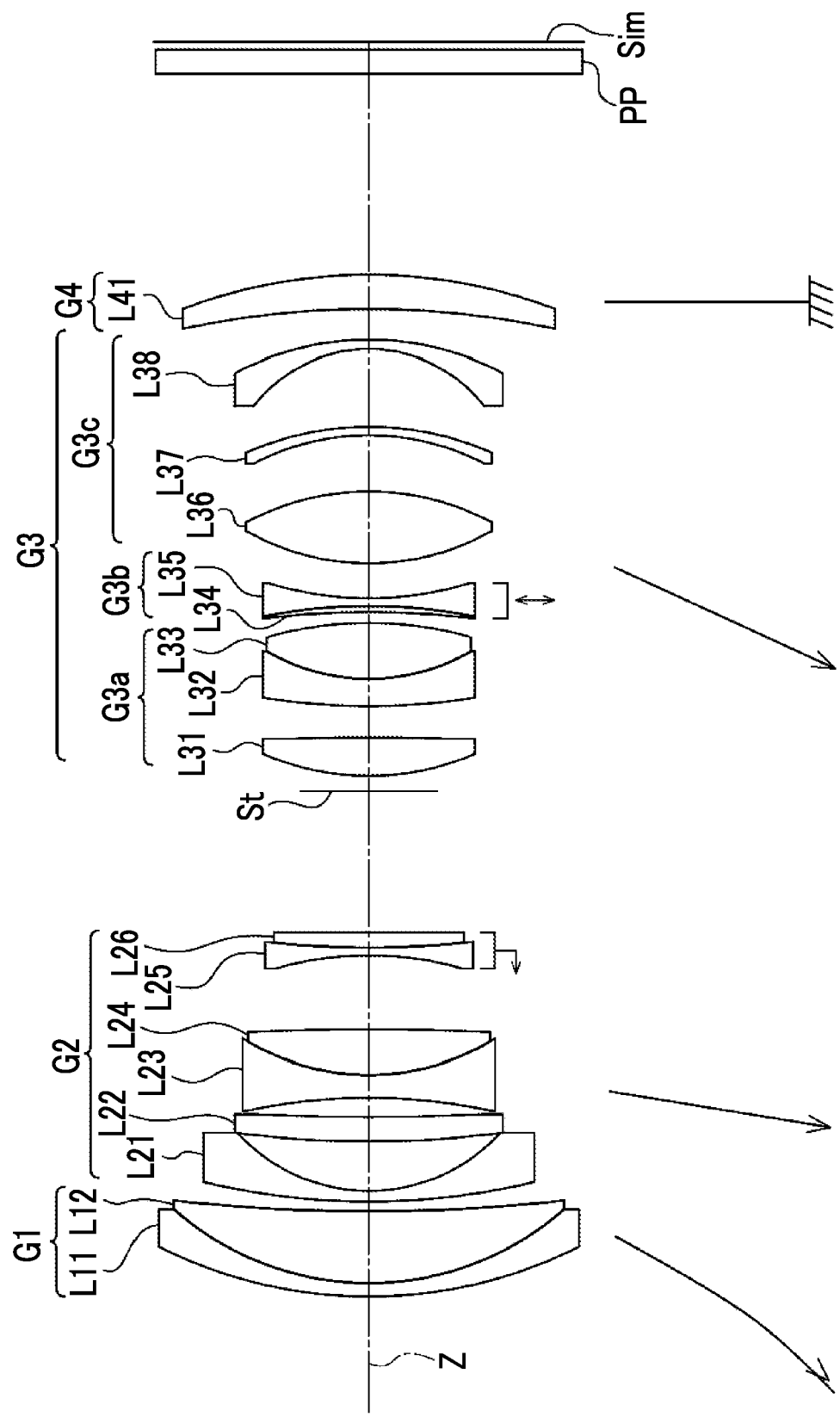
FIG. 8 is a diagram illustrating a configuration and a movement trajectory of a zoom lens of Example 6 of the present disclosure.
Figure 17:
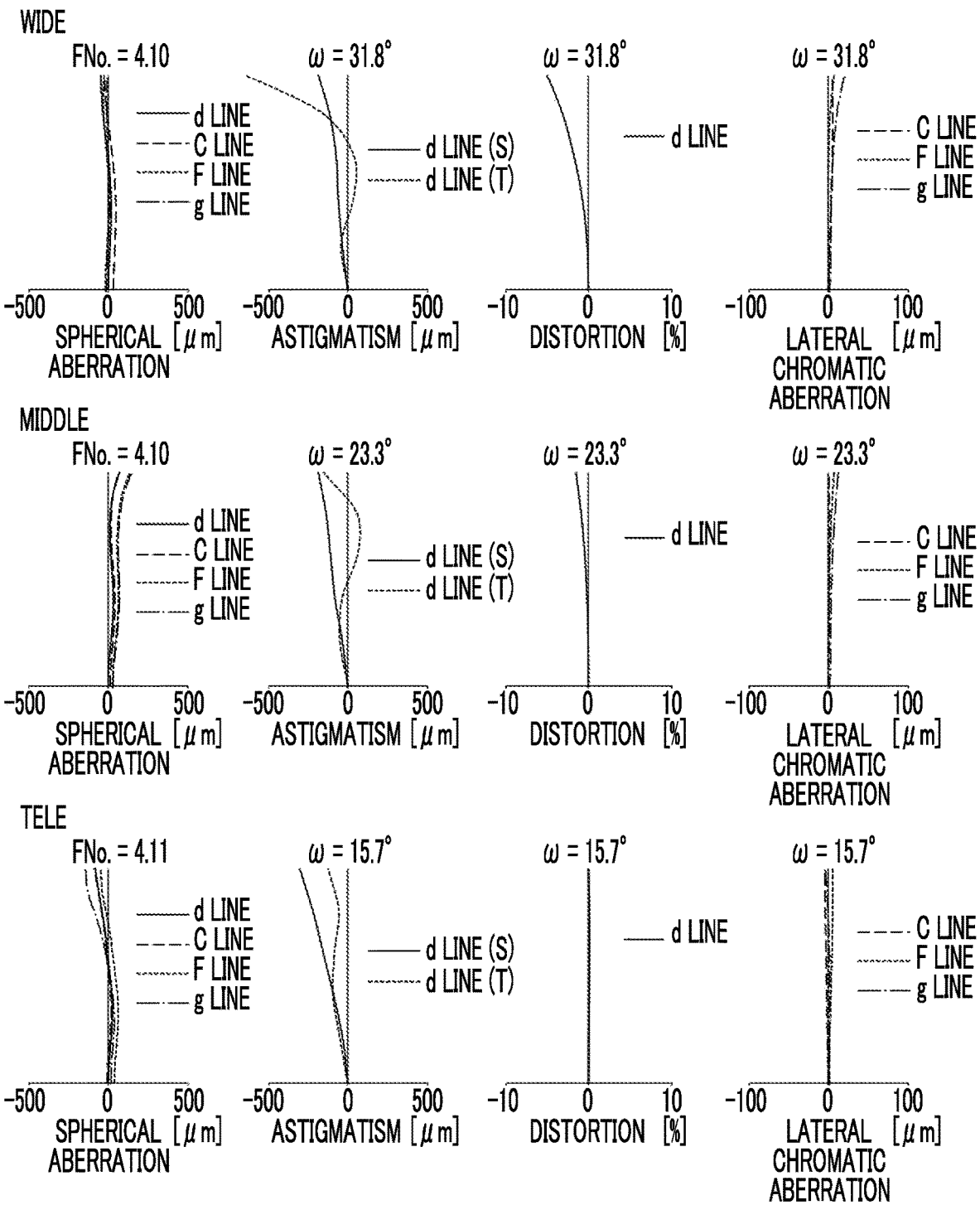
FIG. 17 is a spherical aberration diagram, an astigmatism diagram, a distortion diagram, and a lateral chromatic aberration diagram of the zoom lens of Example 6 of the present disclosure.
Figure 31:
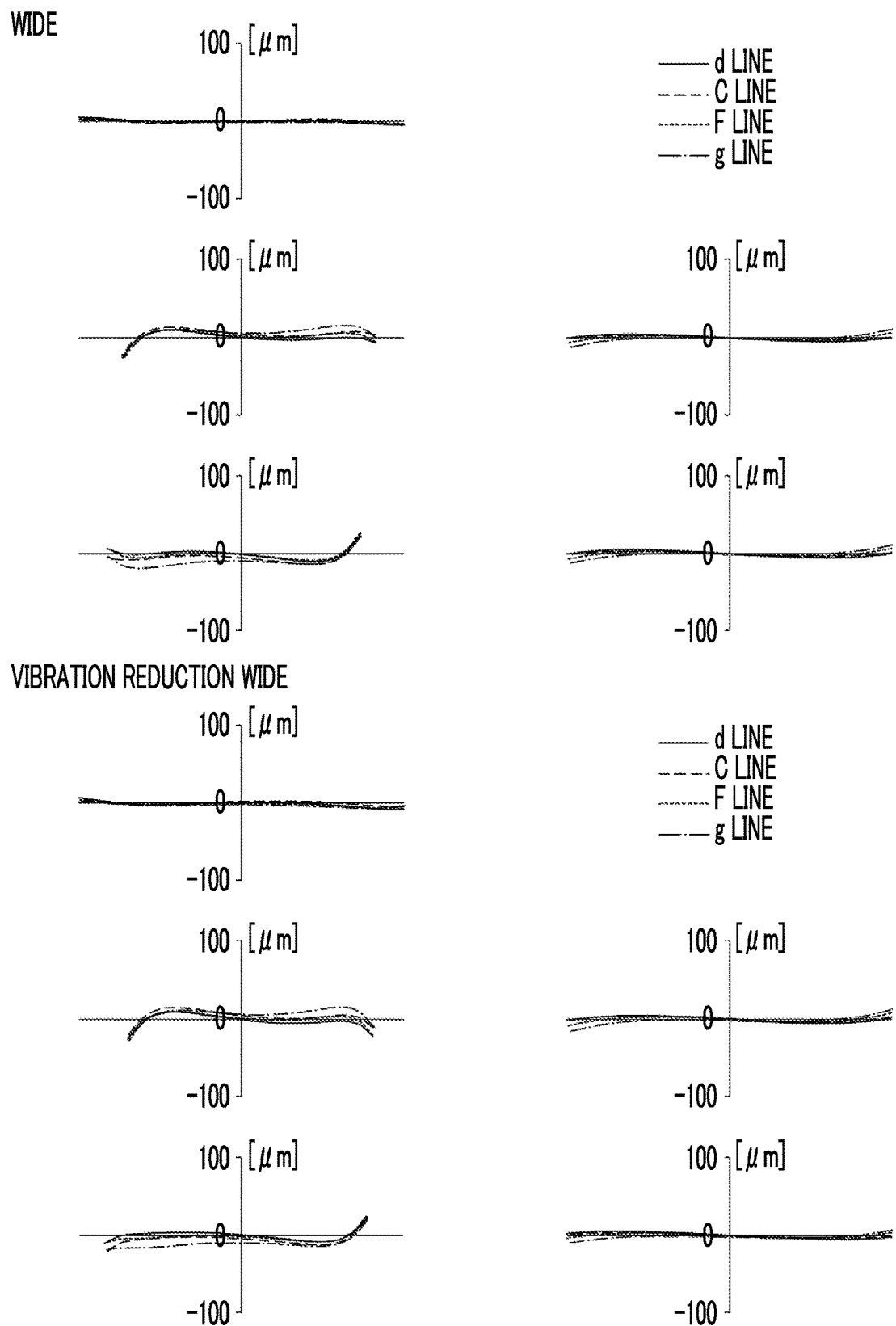
FIG. 31 is a lateral aberration diagram in a state where the image shake is not present and a lateral aberration diagram in a state where the image shake correction is performed at a wide angle end of the zoom lens of Example 6 of the present disclosure.
Figure 32:
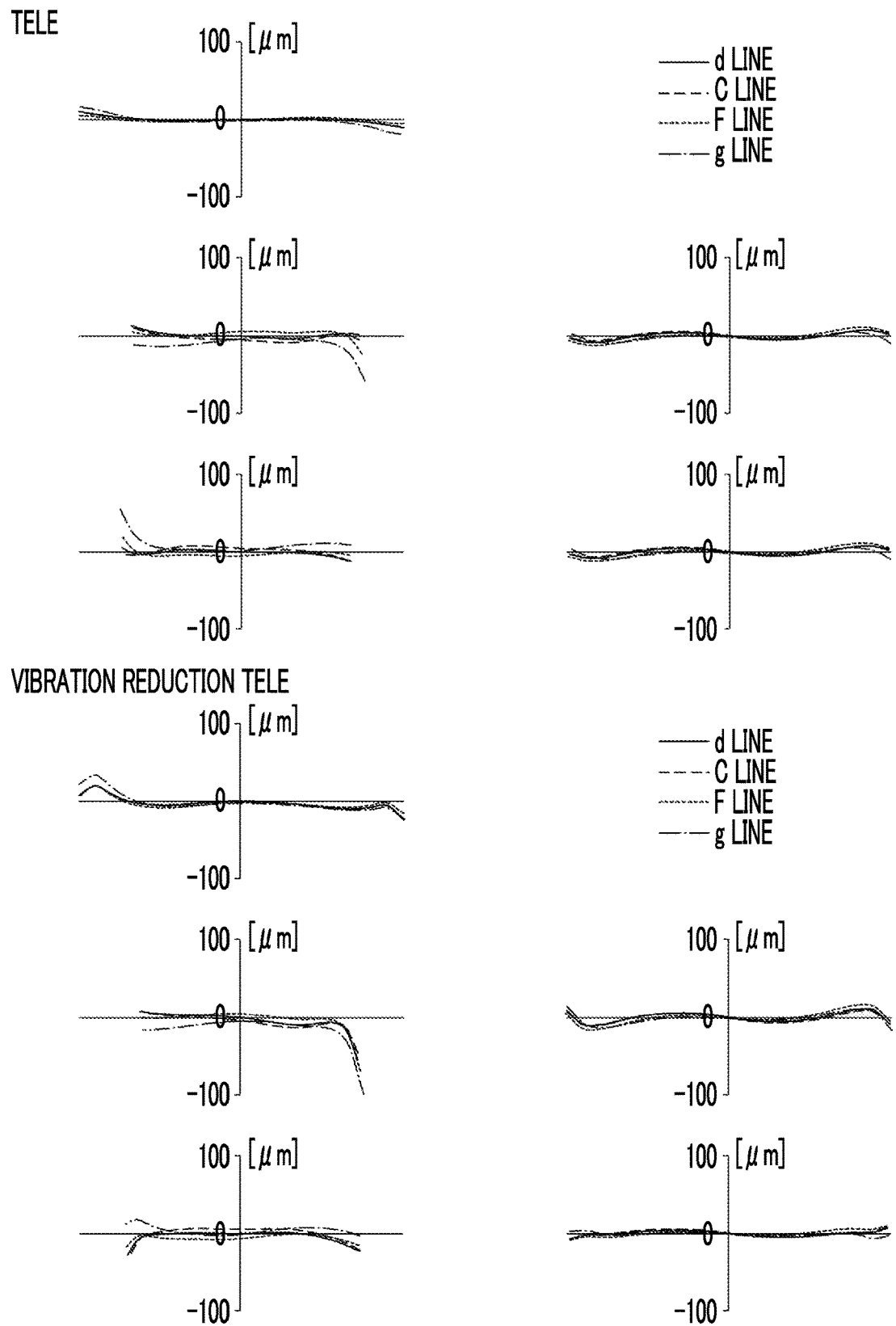
FIG. 32 is a lateral aberration diagram in a state where the image shake is not present and a lateral aberration diagram in a state where the image shake correction is performed at a telephoto end of the zoom lens of Example 6 of the present disclosure.

FIG. 8 illustrates a configuration and a movement trajectory of a zoom lens of Example 6. The zoom lens of Example 6 has the same configuration as the summary of the zoom lens of Example 5. For the zoom lens of Example 6, fundamental lens data is shown in Table 16, specifications and variable surface intervals are shown in Table 17, aspherical coefficients are shown in Table 18, and aberration diagrams are illustrated in FIG. 17, FIG. 31, and FIG. 32. FIG. 17 illustrates aberration diagrams in a state where the image shake is not present. FIG. 31 is a lateral aberration diagram at the wide angle end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part. FIG. 32 is a lateral aberration diagram at the telephoto end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part.

TABLE 16

Example 6

| Sn | R | D | Nd | vd | |
|---|---|---|---|---|---|
| 1 | 64.3957 | 1.75 | 1.73800 | 32.33 | |
| 2 | 40.3939 | 9.41 | 1.65160 | 58.55 | |
| 3 | 242.5788 | DD[3] | | | |
| 4 | 97.3572 | 1.40 | 1.83400 | 37.21 | |
| 5 | 24.4516 | 6.50 | | | |
| *6 | 229.4787 | 3.18 | 1.51633 | 64.06 | |
| *7 | 484.2128 | 2.50 | | | |
| 8 | −79.6714 | 2.98 | 1.48749 | 70.24 | |
| 9 | 33.2118 | 5.86 | 1.95375 | 32.32 | |
| 10 | −393.1682 | 9.68 | | | |
| 11 | −46.4765 | 1.01 | 1.77250 | 49.60 | |
| 12 | 124.6538 | 2.01 | 1.84666 | 23.78 | |
| 13 | −2428.0343 | DD[13] | | | |
| 14(St) | ∞ | 2.00 | | | |
| *15 | 35.5200 | 5.03 | 1.69350 | 53.20 | G3a |
| *16 | −246.0835 | 4.11 | | | |
| 17 | 93.4299 | 3.58 | 1.90200 | 25.26 | |
| 18 | 28.1189 | 7.30 | 1.43875 | 94.66 | |
| 19 | −51.2512 | 1.43 | | | |
| *20 | −108.9821 | 0.80 | 1.59735 | 22.30 | G3b |
| 21 | −72.2880 | 1.00 | 1.49700 | 81.54 | |
| 22 | 46.4423 | 4.57 | | | |
| 23 | 34.2468 | 9.40 | 1.49700 | 81.54 | G3c |
| 24 | −35.9616 | 7.37 | | | |
| 25 | −34.3304 | 1.10 | 1.80000 | 29.84 | |
| 26 | −42.2409 | 10.10 | | | |
| 27 | −20.0001 | 1.20 | 1.69680 | 55.53 | |
| 28 | −40.0246 | DD[28] | | | |
| 29 | −121.8273 | 4.50 | 1.85478 | 24.80 | |
| 30 | −71.9803 | 26.26 | | | |
| 31 | ∞ | 3.20 | 1.51680 | 64.20 | |
| 32 | ∞ | 1.00 | | | |

TABLE 17

Example 6

| | WIDE | MIDDLE | TELE |
|---|---|---|---|
| Zr | 1.0 | 1.4 | 2.1 |
| f | 46.36 | 64.40 | 97.11 |
| FNo. | 4.10 | 4.10 | 4.11 |
| 2ω (°) | 63.6 | 46.6 | 31.4 |
| DD[3] | 1.28 | 10.02 | 26.56 |
| DD[13] | 18.47 | 10.98 | 3.99 |
| DD[28] | 4.00 | 15.16 | 27.25 |

TABLE 18

Example 6

| Sn | 6 | 7 |
|---|---|---|
| KA | 1.0000000E+00 | 1.0000000E+00 |
| A3 | 0.0000000E+00 | 0.0000000E+00 |
| A4 | 9.8575934E−06 | 5.4708584E−06 |
| A5 | −1.6351864E−07 | 1.0519323E−07 |
| A6 | 1.6545222E−10 | −1.4142729E−08 |
| A7 | −1.3456418E−10 | −5.1742615E−10 |

TABLE 18-continued

Example 6

| A8 | −1.2244709E−11 | −8.6372417E−12 |
|---|---|---|
| A9 | −5.6822535E−13 | 1.0193772E−13 |
| A10 | −1.7713868E−14 | 1.3138541E−14 |
| A11 | −2.6941992E−16 | 2.6982431E−16 |
| A12 | 1.1285879E−17 | −3.3188428E−17 |
| A13 | 1.0928073E−18 | −4.7003352E−18 |
| A14 | 3.2128498E−20 | −3.6565436E−19 |
| A15 | −2.2910758E−21 | −1.9080333E−20 |
| A16 | −4.2217269E−22 | −3.6642205E−22 |
| A17 | −3.6025079E−23 | 5.3189875E−23 |
| A18 | −1.7205607E−24 | 6.1296221E−24 |
| A19 | 3.8876250E−26 | 2.7238543E−25 |
| A20 | 1.8208998E−26 | −5.2278394E−27 |

| Sn | 15 | 16 | 20 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | −4.3691405E−06 | 3.4133120E−06 | 1.2476677E−06 |
| A5 | −1.0179640E−09 | −1.9647087E−08 | 9.6969697E−08 |
| A6 | 1.9320458E−09 | 4.6205679E−09 | 3.6379357E−09 |
| A7 | 6.9362598E−11 | 2.7888041E−10 | −5.7359742E−11 |
| A8 | 2.3943070E−12 | 9.5082478E−12 | −1.6765241E−11 |
| A9 | 2.0367834E−13 | 1.4125585E−13 | −1.5099589E−12 |
| A10 | 2.4999125E−14 | −3.5231064E−15 | −1.0074600E−14 |
| A11 | 2.6141090E−15 | 9.3775452E−16 | 1.4731996E−14 |
| A12 | 2.6995812E−16 | 2.4606472E−16 | 1.7894239E−15 |
| A13 | 3.2606084E−17 | 3.3976416E−17 | 6.7264622E−17 |
| A14 | 3.4081542E−18 | 4.0586757E−18 | −2.6661588E−17 |
| A15 | 6.4615357E−20 | 4.6605910E−19 | 5.0739740E−19 |
| A16 | −3.1896828E−20 | −5.9708198E−20 | 2.1607785E−20 |

Example 7

Figure 9:
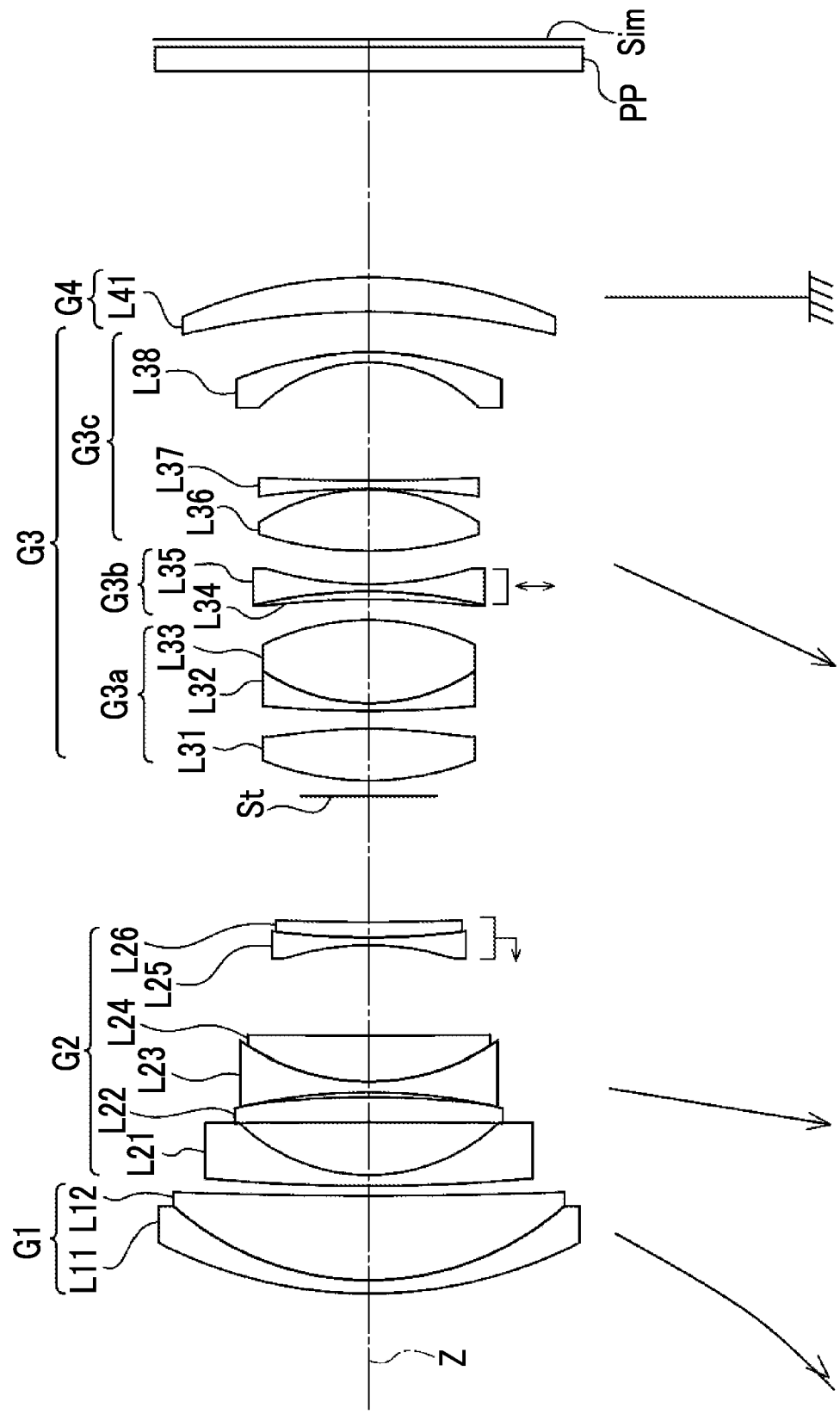
FIG. 9 is a diagram illustrating a configuration and a movement trajectory of a zoom lens of Example 7 of the present disclosure.
Figure 33:
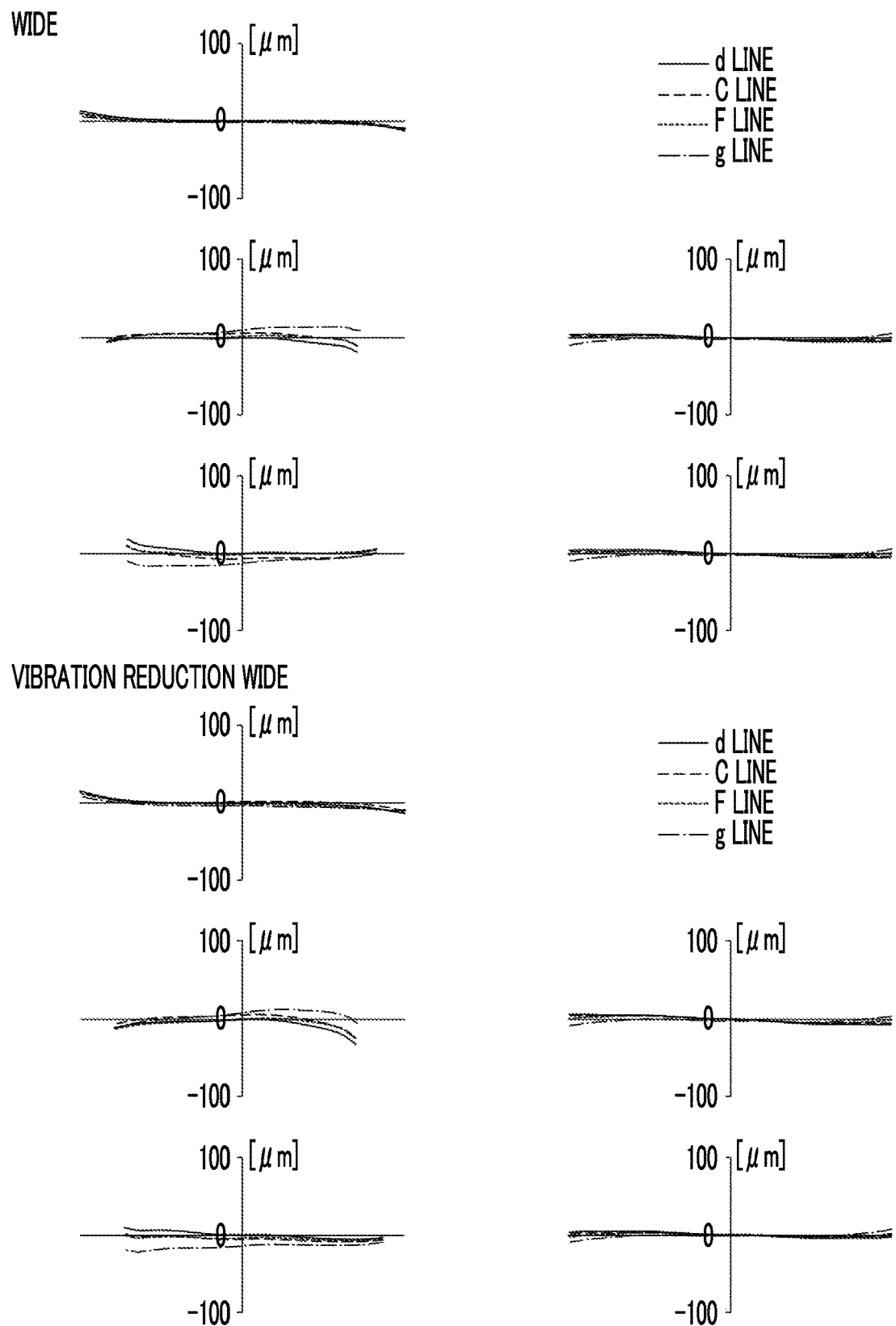
FIG. 33 is a lateral aberration diagram in a state where the image shake is not present and a lateral aberration diagram in a state where the image shake correction is performed at a wide angle end of the zoom lens of Example 7 of the present disclosure.

FIG. 9 illustrates a configuration and a movement trajectory of a zoom lens of Example 7. The zoom lens of Example 7 has the same configuration as the summary of the zoom lens of Example 5. For the zoom lens of Example 7, fundamental lens data is shown in Table 19, specifications and variable surface intervals are shown in Table 20, aspherical coefficients are shown in Table 21, and aberration diagrams are illustrated in FIG. 18, FIG. 33, and FIG. 34. FIG. 18 illustrates aberration diagrams in a state where the image shake is not present. FIG. 33 is a lateral aberration diagram at the wide angle end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part. FIG. 34 is a lateral aberration diagram at the telephoto end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part.

TABLE 19

Example 7

| Sn | R | D | Nd | vd |
|---|---|---|---|---|
| 1 | 63.2996 | 1.75 | 1.73800 | 32.33 |
| 2 | 40.4330 | 11.04 | 1.61800 | 63.33 |
| 3 | 700.3446 | DD[3] | | |
| 4 | 251.5213 | 1.40 | 1.80610 | 40.93 |

TABLE 19-continued

Example 7

| Sn | R | D | Nd | vd | |
|---|---|---|---|---|---|
| 5 | 25.6700 | 6.90 | | | |
| *6 | −477.6426 | 3.27 | 1.51633 | 64.06 | |
| *7 | −129.5386 | 0.64 | | | |
| 8 | −79.2100 | 1.41 | 1.48749 | 70.24 | |
| 9 | 31.1271 | 5.89 | 1.95375 | 32.32 | |
| 10 | 1775.9668 | 11.81 | | | |
| 11 | −37.3947 | 1.01 | 1.60311 | 60.64 | |
| 12 | 104.4395 | 2.01 | 1.85896 | 22.73 | |
| 13 | 373.5024 | DD[13] | | | |
| 14(St) | ∞ | 2.00 | | | |
| *15 | 37.1999 | 6.81 | 1.69350 | 53.20 | G3a |
| *16 | −66.0168 | 2.32 | | | |
| 17 | 171.2896 | 1.00 | 1.90366 | 31.31 | |
| 18 | 26.1474 | 10.87 | 1.43875 | 94.66 | |
| 19 | −32.7490 | 2.70 | | | |
| *20 | −105.4675 | 1.00 | 1.62426 | 23.43 | G3b |
| 21 | −69.9170 | 1.00 | 1.48749 | 70.24 | |
| 22 | 48.1965 | 4.31 | | | |
| 23 | 51.1715 | 8.01 | 1.49700 | 81.54 | G3c |
| 24 | −27.6809 | 0.10 | | | |
| 25 | −111.6873 | 1.10 | 1.57501 | 41.50 | |
| 26 | 326.9761 | 15.43 | | | |
| 27 | −21.4497 | 1.20 | 1.72916 | 54.68 | |
| 28 | −48.2517 | DD[28] | | | |
| 29 | −104.9210 | 4.50 | 1.84666 | 23.78 | |
| 30 | −62.7423 | 26.90 | | | |
| 31 | ∞ | 3.20 | 1.51680 | 64.20 | |
| 32 | ∞ | 1.00 | | | |

TABLE 20

Example 7

| | WIDE | MIDDLE | TELE |
|---|---|---|---|
| Zr | 1.0 | 1.4 | 2.1 |
| f | 46.35 | 64.38 | 97.08 |
| FNo. | 4.10 | 4.10 | 4.11 |
| 2ω (°) | 64.8 | 47.0 | 31.2 |
| DD[3] | 1.30 | 6.58 | 23.27 |
| DD[13] | 16.46 | 9.88 | 4.25 |
| DD[28] | 5.30 | 18.87 | 29.40 |

TABLE 21

Example 7

| Sn | 6 | 7 |
|---|---|---|
| KA | 1.0000000E+00 | 1.0000000E+00 |
| A3 | 0.0000000E+00 | 0.0000000E+00 |
| A4 | 5.5056273E−06 | 2.6113957E−06 |
| A5 | −4.8283898E−10 | 5.6799081E−08 |
| A6 | −2.4055394E−09 | −5.9668432E−09 |
| A7 | −1.7287141E−10 | −3.0255570E−10 |
| A8 | −7.1414182E−12 | −9.5891941E−12 |
| A9 | −2.3717632E−13 | −2.5513346E−13 |
| A10 | −7.7201163E−15 | −5.5489646E−15 |
| A11 | −2.9140075E−16 | −4.6895759E−17 |
| A12 | −1.3139224E−17 | 4.9623446E−18 |
| A13 | −6.1964722E−19 | 4.3549379E−19 |
| A14 | −2.5436495E−20 | 1.9569224E−20 |
| A15 | −6.0670435E−22 | 1.0922069E−22 |
| A16 | 2.8293122E−23 | −8.1881382E−23 |
| A17 | 5.3788447E−24 | −1.0132742E−23 |
| A18 | 4.1899822E−25 | −7.4274750E−25 |
| A19 | 8.2102401E−27 | −2.5191974E−26 |
| A20 | −3.9178355E−27 | 2.0253403E−27 |

TABLE 21-continued

Example 7

| Sn | 15 | 16 | 20 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | −6.1530809E−06 | 7.3355420E−06 | 4.5613561E−07 |
| A5 | −3.2568551E−07 | −2.0318674E−07 | 3.6645882E−07 |
| A6 | 2.6222322E−08 | 1.9179683E−08 | −2.7212116E−08 |
| A7 | −4.9627119E−11 | 1.6286662E−11 | −1.6970586E−10 |
| A8 | −2.4423546E−12 | 5.6745051E−12 | 6.3203233E−11 |
| A9 | 4.2402657E−13 | 8.1238194E−13 | 5.3141899E−12 |
| A10 | 4.1010609E−14 | 3.5459947E−14 | 1.1585211E−13 |
| A11 | 2.4167757E−15 | 5.9529859E−16 | −1.8967019E−14 |
| A12 | 6.1023054E−17 | −9.4777146E−18 | −2.9470620E−15 |
| A13 | −3.0865946E−18 | 8.8400193E−18 | −1.7619394E−16 |
| A14 | −7.0392452E−19 | 1.6007520E−18 | 1.2332570E−17 |
| A15 | −9.8728274E−20 | 1.5591551E−19 | 2.7072118E−18 |
| A16 | −3.0134086E−21 | 1.1436068E−20 | −1.4155107E−19 |
| A17 | 1.4282519E−21 | 7.1956929E−22 | 0.0000000E+00 |
| A18 | 2.7090886E−22 | −1.1386030E−22 | 0.0000000E+00 |
| A19 | 7.8540216E−24 | 1.1624681E−23 | 0.0000000E+00 |
| A20 | −1.7197620E−24 | −7.2080935E−25 | 0.0000000E+00 |

Example 8

Figure 10:
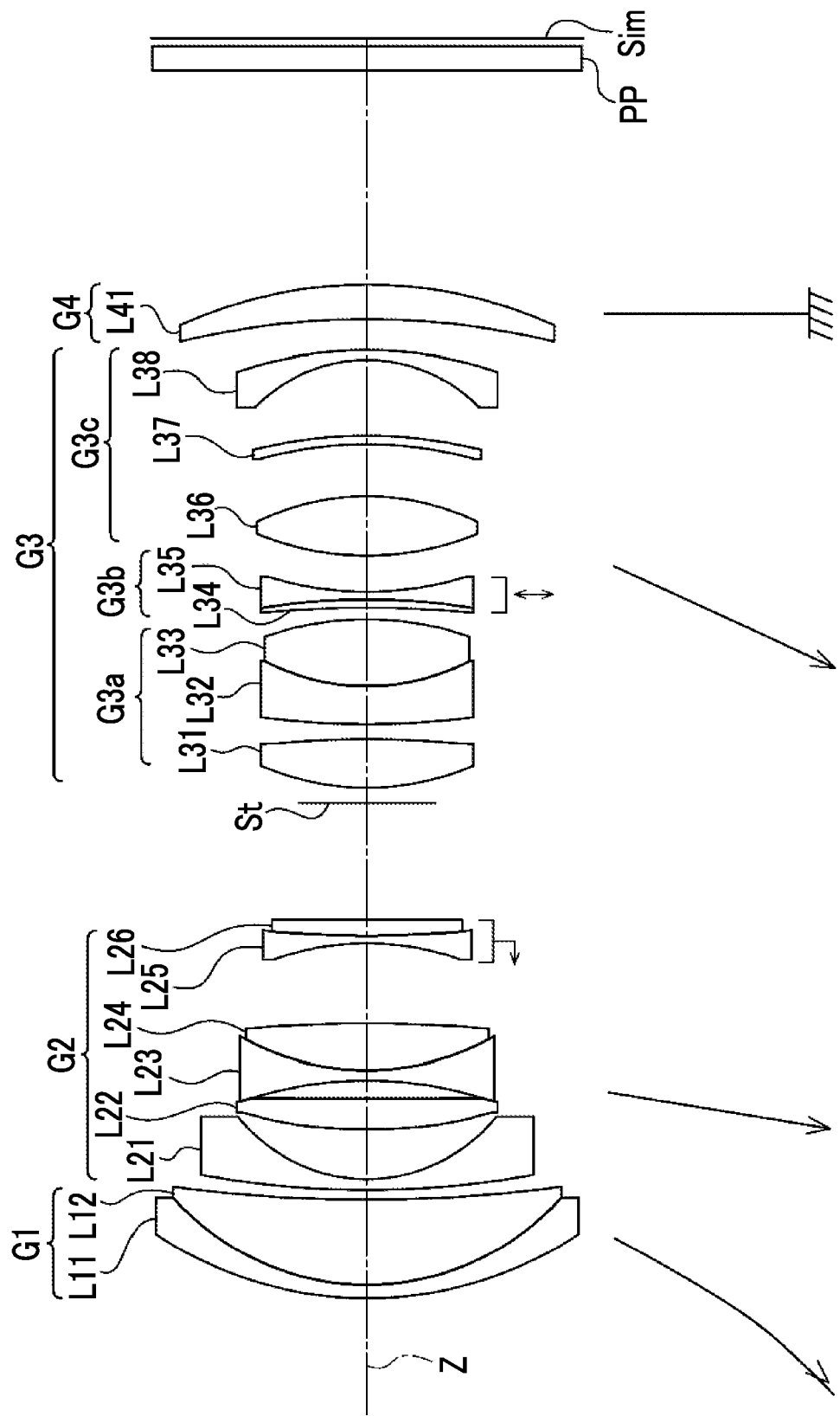
FIG. 10 is a diagram illustrating a configuration and a movement trajectory of a zoom lens of Example 8 of the present disclosure.
Figure 19:
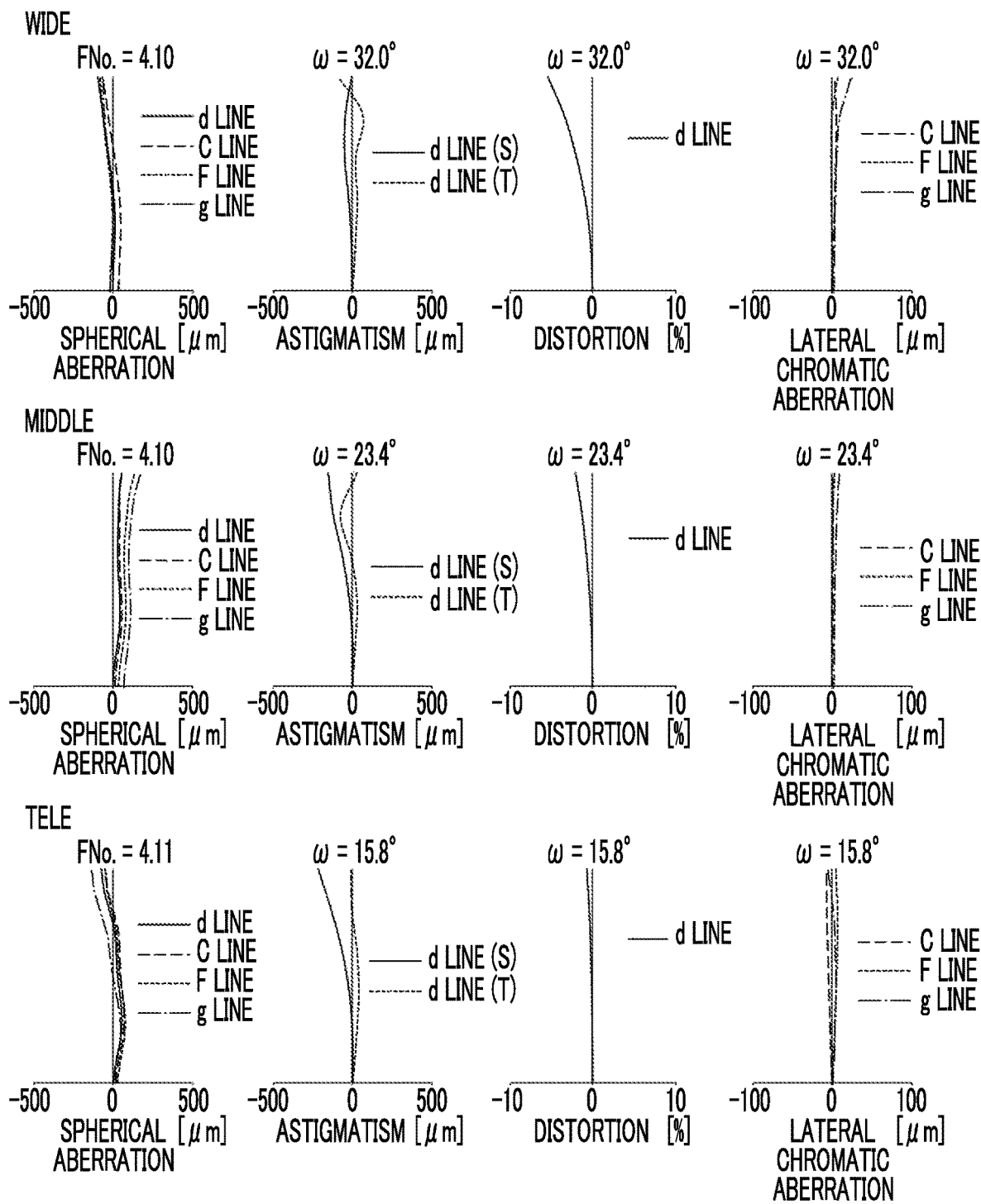
FIG. 19 is a spherical aberration diagram, an astigmatism diagram, a distortion diagram, and a lateral chromatic aberration diagram of the zoom lens of Example 8 of the present disclosure.
Figure 35:
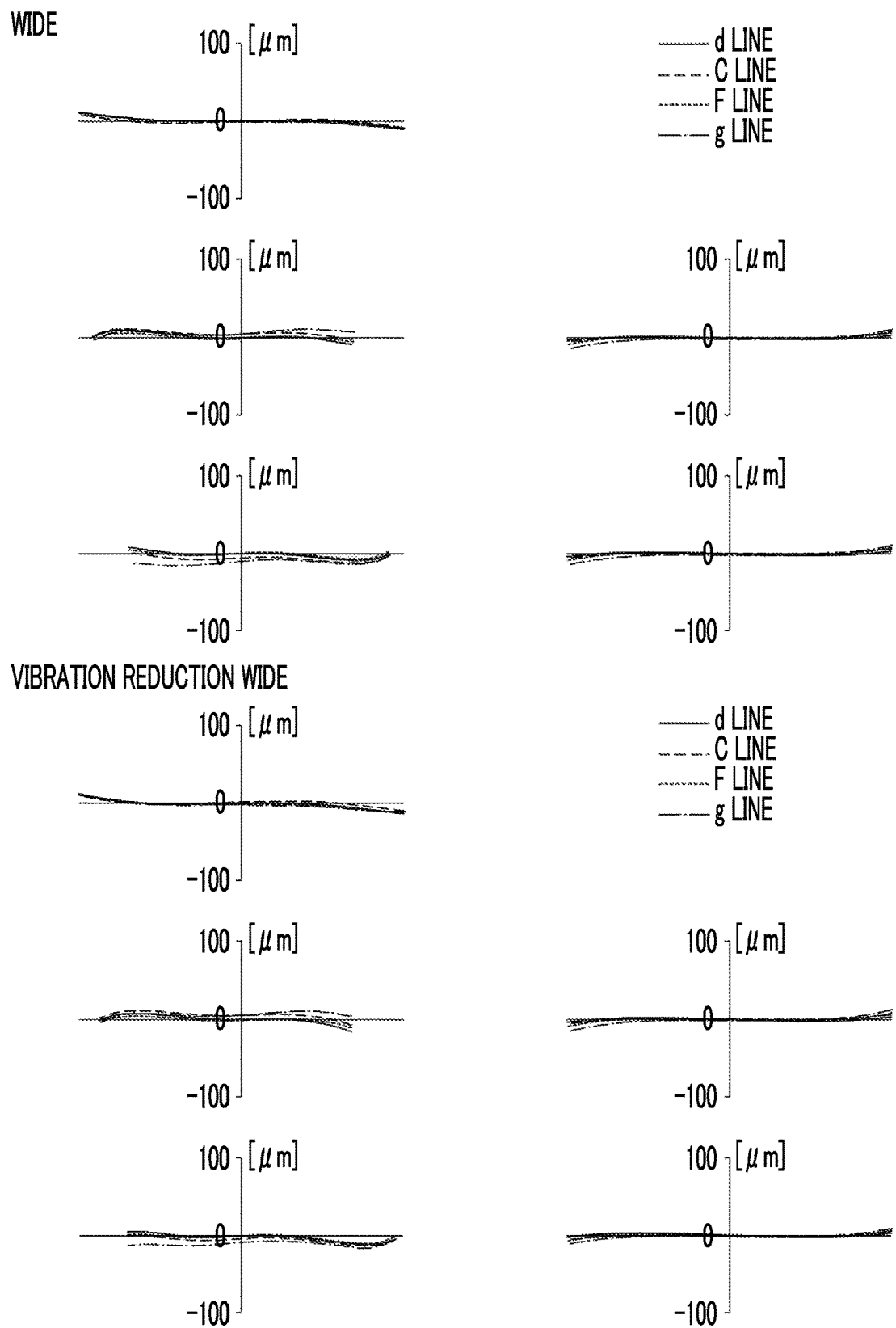
FIG. 35 is a lateral aberration diagram in a state where the image shake is not present and a lateral aberration diagram in a state where the image shake correction is performed at a wide angle end of the zoom lens of Example 8 of the present disclosure.

FIG. 10 illustrates a configuration and a movement trajectory of a zoom lens of Example 8. The zoom lens of Example 8 has the same configuration as the summary of the zoom lens of Example 5. For the zoom lens of Example 8, fundamental lens data is shown in Table 22, specifications and variable surface intervals are shown in Table 23, aspherical coefficients are shown in Table 24, and aberration diagrams are illustrated in FIG. 19, FIG. 35, and FIG. 36. FIG. 19 illustrates aberration diagrams in a state where the image shake is not present. FIG. 35 is a lateral aberration diagram at the wide angle end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part. FIG. 36 is a lateral aberration diagram at the telephoto end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part.

TABLE 22

Example 8

| Sn | R | D | Nd | vd | |
|---|---|---|---|---|---|
| 1 | 51.9580 | 1.75 | 1.90366 | 31.31 | |
| 2 | 35.3295 | 11.12 | 1.69680 | 55.53 | |
| 3 | 199.2411 | DD[3] | | | |
| 4 | 127.5812 | 1.40 | 1.88100 | 40.14 | |
| 5 | 22.5277 | 6.50 | | | |
| *6 | 91.6674 | 3.96 | 1.51633 | 64.06 | |
| *7 | 6780.1374 | 2.32 | | | |
| 8 | −53.7583 | 1.33 | 1.48749 | 70.24 | |
| 9 | 35.4438 | 6.01 | 1.95375 | 32.32 | |
| 10 | −193.8685 | 10.40 | | | |
| 11 | −38.4520 | 1.01 | 1.72916 | 54.68 | |
| 12 | 144.0630 | 2.01 | 1.92286 | 18.90 | |
| 13 | 1715.6865 | DD[13] | | | |
| 14(St) | ∞ | 2.00 | | | |
| *15 | 34.9052 | 6.41 | 1.69350 | 53.20 | G3a |
| *16 | −109.6137 | 1.93 | | | |

TABLE 22-continued

Example 8

| Sn | R | D | Nd | vd | |
|---|---|---|---|---|---|
| 17 | 112.2260 | 4.94 | 2.00069 | 25.46 | |
| 18 | 30.2319 | 8.70 | 1.43875 | 94.66 | |
| 19 | −42.6574 | 1.50 | | | |
| *20 | −136.3914 | 1.08 | 1.59735 | 22.30 | G3b |
| 21 | −89.7987 | 1.00 | 1.49700 | 81.54 | |
| 22 | 46.4858 | 4.69 | | | |
| 23 | 39.7338 | 7.72 | 1.49700 | 81.54 | G3c |
| 24 | −34.5543 | 6.75 | | | |
| 25 | −55.1801 | 1.11 | 2.00272 | 19.32 | |
| 26 | −64.9389 | 9.84 | | | |
| 27 | −21.4496 | 1.20 | 1.69680 | 55.53 | |
| 28 | −56.4160 | DD[28] | | | |
| 29 | −108.7530 | 4.50 | 1.84666 | 23.78 | |
| 30 | −61.7915 | 27.88 | | | |
| 31 | ∞ | 3.20 | 1.51680 | 64.20 | |
| 32 | ∞ | 1.00 | | | |

TABLE 23

Example 8

| | WIDE | MIDDLE | TELE |
|---|---|---|---|
| Zr | 1.0 | 1.4 | 2.1 |
| f | 46.36 | 64.40 | 97.11 |
| FNo. | 4.10 | 4.10 | 4.11 |
| 2ω (°) | 64.0 | 46.8 | 31.6 |
| DD[3] | 1.29 | 8.13 | 21.88 |
| DD[13] | 15.21 | 9.61 | 4.25 |
| DD[28] | 4.00 | 16.24 | 28.06 |

TABLE 24

Example 8

| Sn | 6 | 7 |
|---|---|---|
| KA | 1.0000000E+00 | 1.0000000E+00 |
| A3 | 0.0000000E+00 | 0.0000000E+00 |
| A4 | 1.0804616E−05 | 4.2628980E−06 |
| A5 | −1.0861695E−07 | −2.5008592E−07 |
| A6 | −4.9211873E−10 | 1.9947795E−08 |
| A7 | 1.5486671E−09 | −3.2063472E−10 |
| A8 | −1.1895788E−11 | −3.5307127E−11 |
| A9 | −3.3605486E−12 | 7.7545494E−13 |
| A10 | −1.4635778E−13 | −1.2130766E−14 |
| A11 | 1.9777406E−15 | −7.8407052E−15 |
| A12 | −7.0644995E−16 | −2.0618279E−15 |
| A13 | 2.4114310E−18 | −3.9581929E−17 |
| A14 | 1.6780244E−18 | 5.8808786E−18 |
| A15 | 1.4470750E−19 | 6.7568975E−19 |
| A16 | 1.6708042E−20 | 2.4143162E−20 |
| A17 | −1.2033172E−21 | −2.4774184E−21 |
| A18 | 3.8594207E−24 | −6.1439722E−23 |
| A19 | −2.1146143E−24 | −6.7388324E−24 |
| A20 | 6.0161154E−26 | 4.4629509E−25 |

| Sn | 15 | 16 | 20 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | −4.9503415E−06 | 5.7278612E−06 | 1.1996954E−06 |
| A5 | −1.3282099E−07 | −1.2932117E−07 | 2.0697851E−07 |
| A6 | 1.4894618E−08 | 1.4986295E−08 | −9.9794838E−09 |
| A7 | −7.3884888E−11 | −7.7523513E−11 | −5.3310338E−10 |
| A8 | −1.3426671E−11 | 5.1063614E−12 | 2.8222218E−11 |
| A9 | −5.5312779E−13 | 5.3033169E−13 | 4.3327061E−12 |
| A10 | 1.1897140E−14 | −5.8787093E−15 | 2.0581582E−13 |
| A11 | 4.4394197E−15 | −3.1009376E−15 | −5.2559117E−15 |
| A12 | 3.9230121E−16 | −2.3044408E−16 | −2.0462683E−15 |
| A13 | 2.1287093E−17 | 2.2426958E−18 | −1.9635010E−16 |

TABLE 24-continued

Example 8

| | | | |
|---|---|---|---|
| A14 | 1.4456390E−19 | 1.5634878E−18 | 7.8327944E−19 |
| A15 | −1.5487043E−19 | 1.3145036E−19 | 2.4121751E−18 |
| A16 | −2.5574357E−20 | 1.8951062E−20 | −9.3420875E−20 |
| A17 | −7.8511411E−22 | 1.3752989E−22 | 0.0000000E+00 |
| A18 | 2.2414516E−22 | −1.7593632E−22 | 0.0000000E+00 |
| A19 | 7.2690610E−24 | −1.5235957E−24 | 0.0000000E+00 |
| A20 | −7.2110226E−25 | 4.3001125E−25 | 0.0000000E+00 |

Example 9

Figure 11:
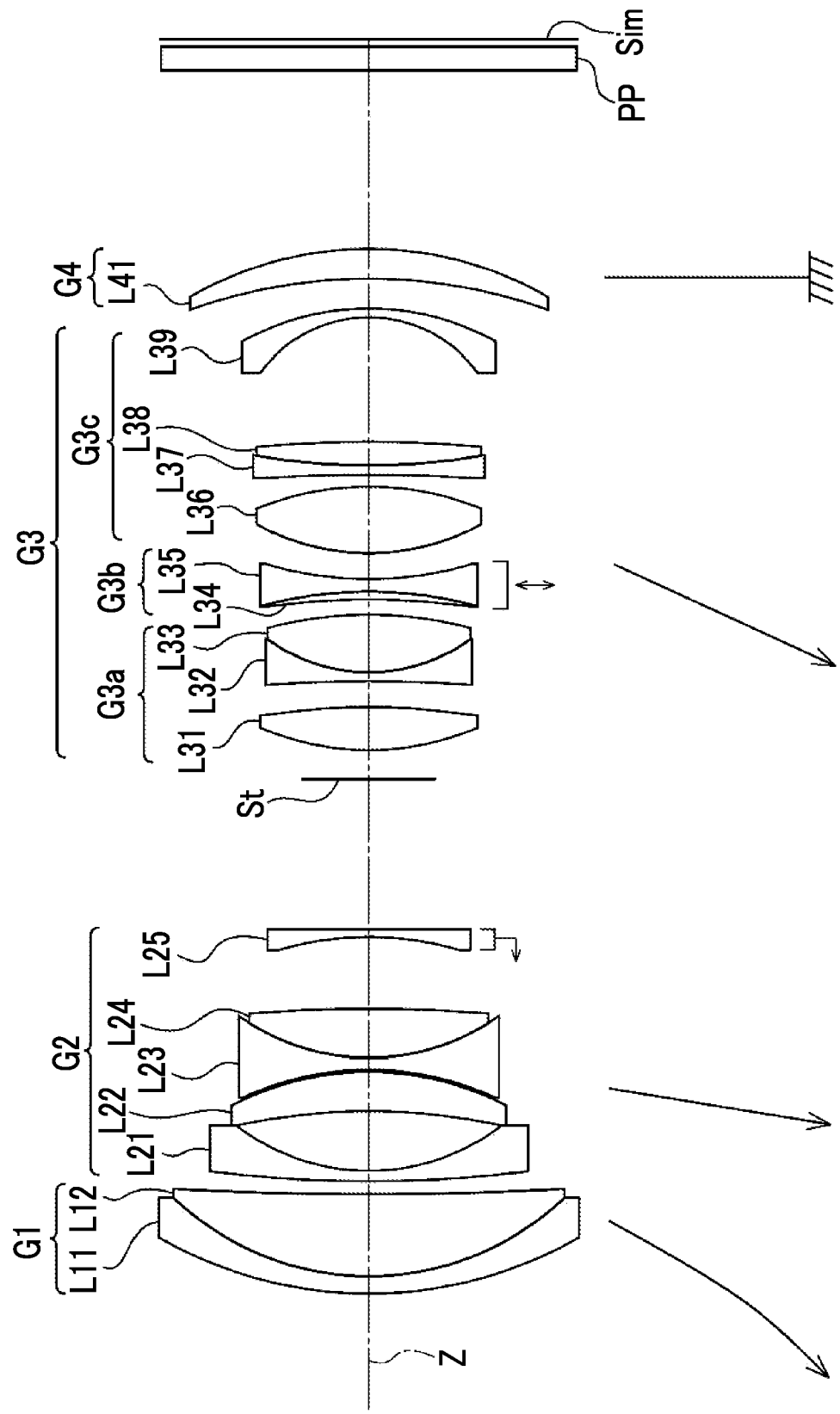
FIG. 11 is a diagram illustrating a configuration and a movement trajectory of a zoom lens of Example 9 of the present disclosure.
Figure 20:
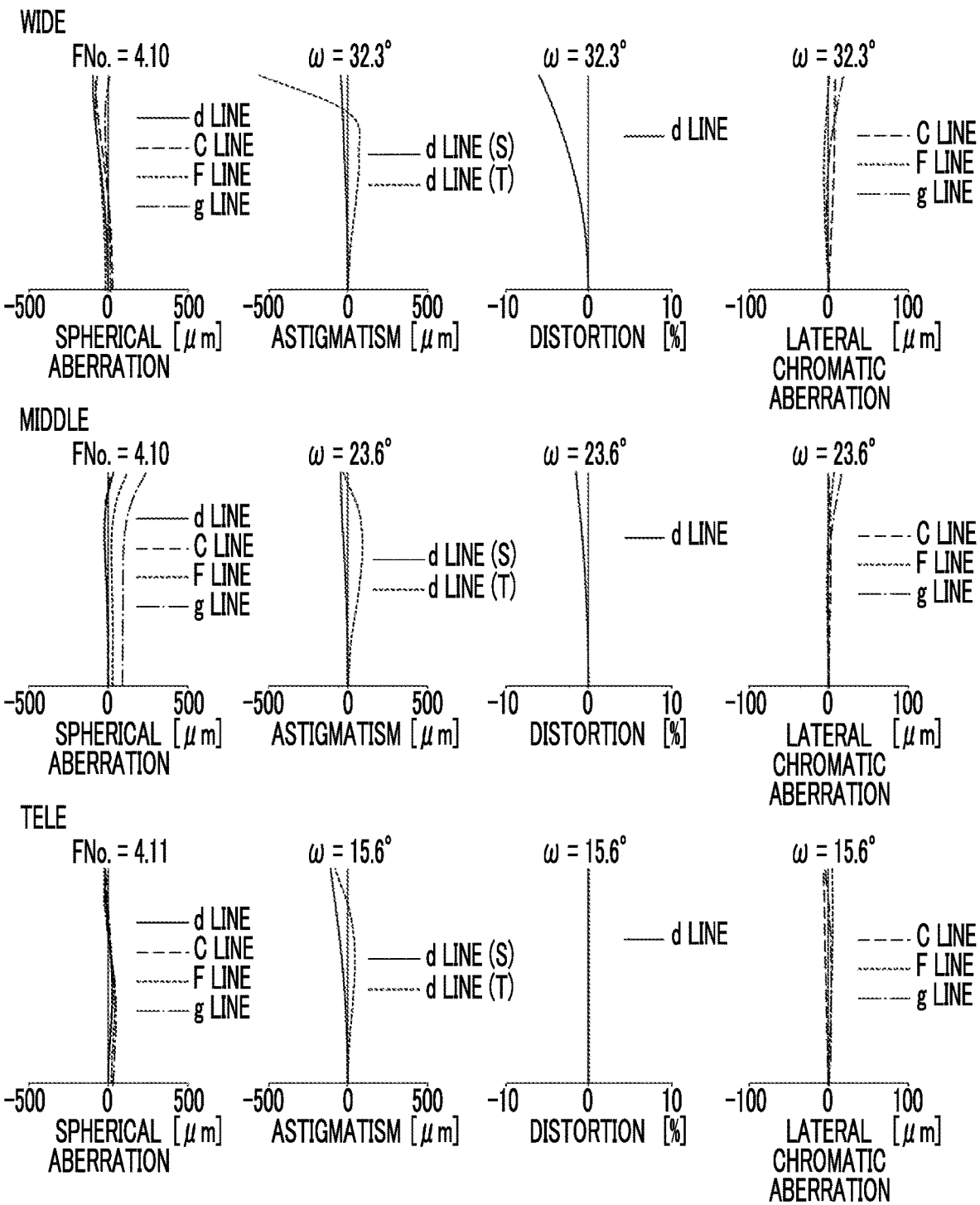
FIG. 20 is a spherical aberration diagram, an astigmatism diagram, a distortion diagram, and a lateral chromatic aberration diagram of the zoom lens of Example 9 of the present disclosure.
Figure 37:
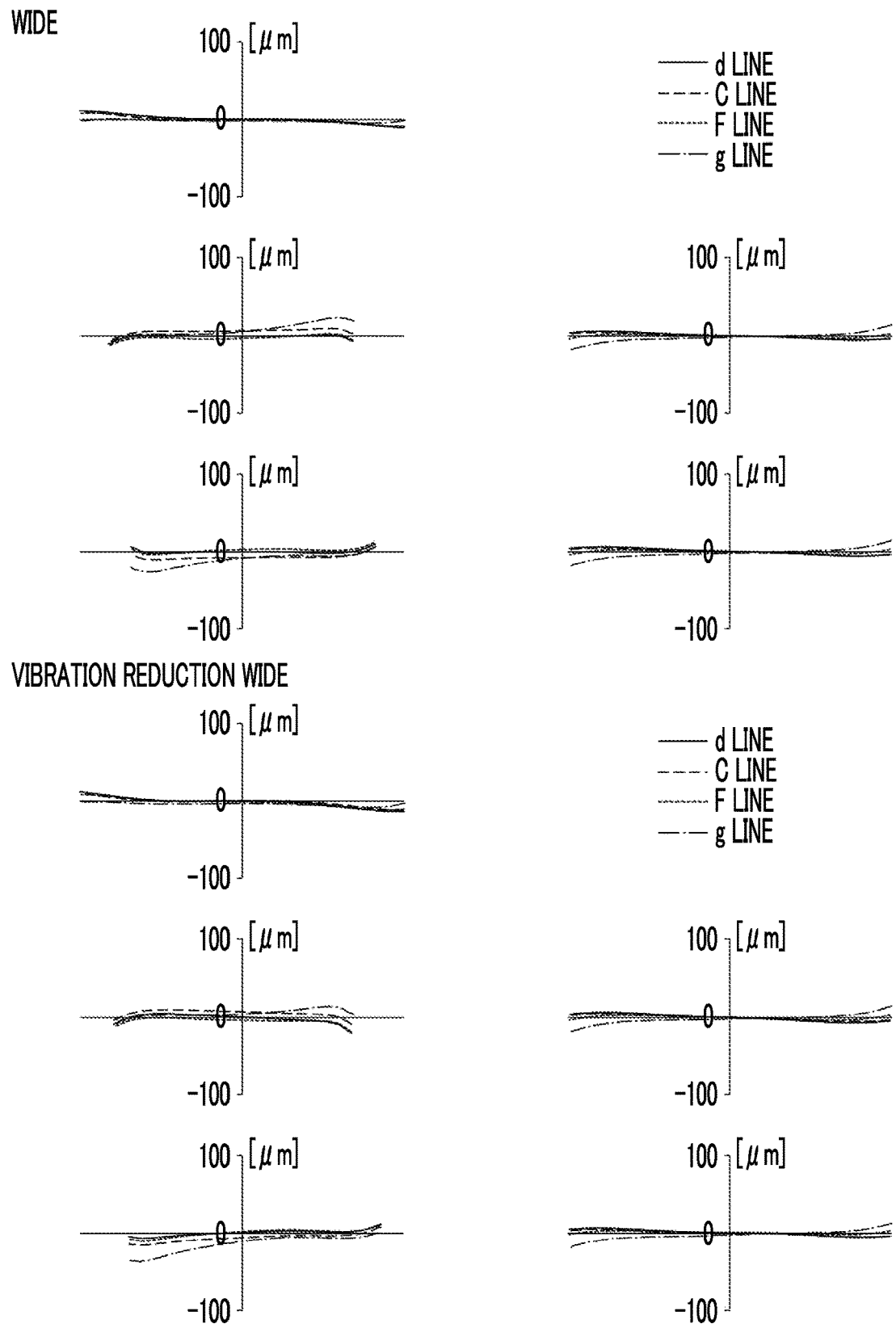
FIG. 37 is a lateral aberration diagram in a state where the image shake is not present and a lateral aberration diagram in a state where the image shake correction is performed at a wide angle end of the zoom lens of Example 9 of the present disclosure.
Figure 38:
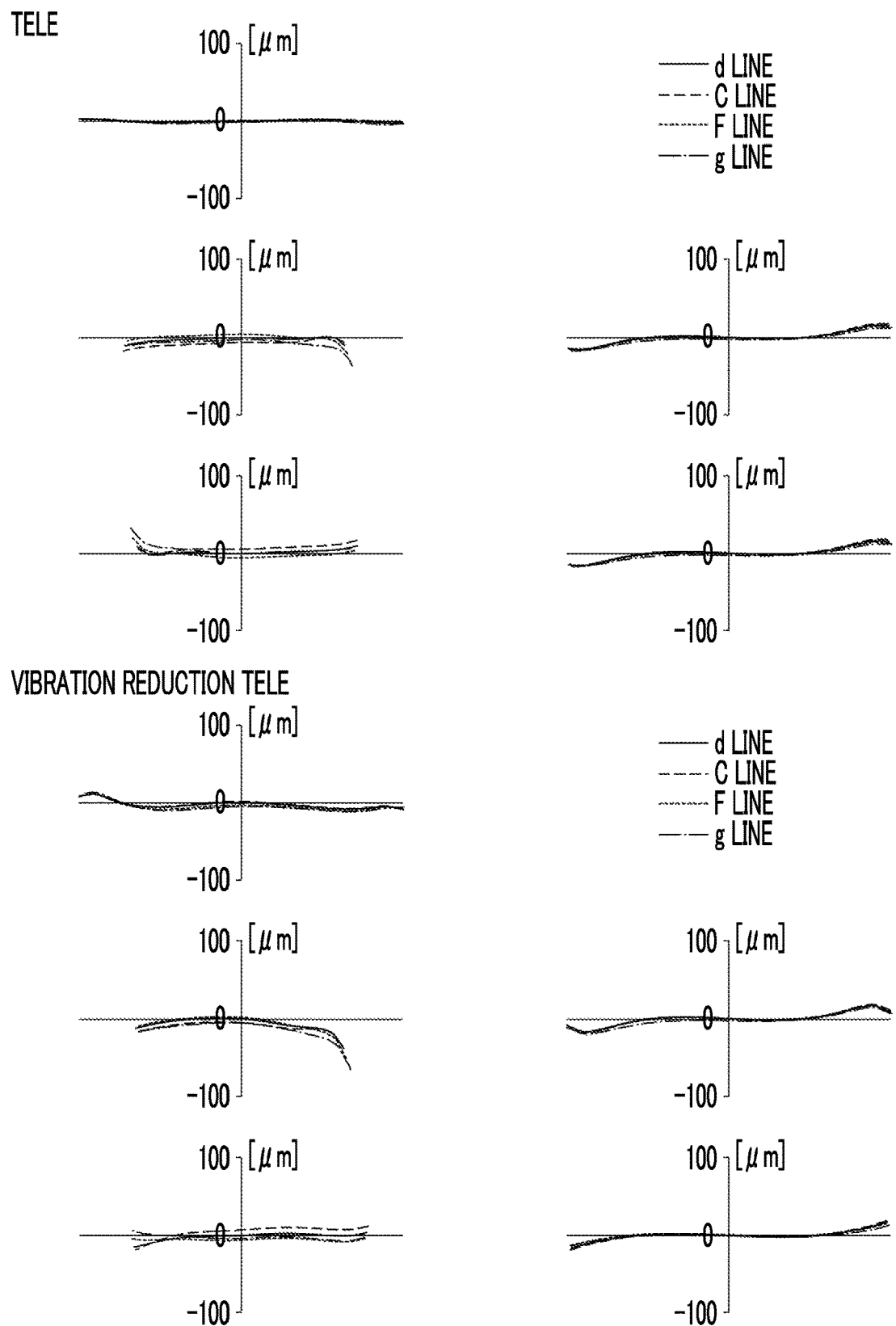
FIG. 38 is a lateral aberration diagram in a state where the image shake is not present and a lateral aberration diagram in a state where the image shake correction is performed at a telephoto end of the zoom lens of Example 9 of the present disclosure.

FIG. 11 illustrates a configuration and a movement trajectory of a zoom lens of Example 9. The zoom lens of Example 9 has the same configuration as the summary of the zoom lens of Example 1. For the zoom lens of Example 9, fundamental lens data is shown in Table 25, specifications and variable surface intervals are shown in Table 26, aspherical coefficients are shown in Table 27, and aberration diagrams are illustrated in FIG. 20, FIG. 37, and FIG. 38. FIG. 20 illustrates aberration diagrams in a state where the image shake is not present. FIG. 37 is a lateral aberration diagram at the wide angle end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part. FIG. 38 is a lateral aberration diagram at the telephoto end. Aberration in a state where the image shake is not present is illustrated in an upper part, and aberration in a state where the image shake caused by inclination of the optical system at 0.4° is present and the image shake correction is performed by moving the vibration proof lens group in a direction perpendicular to the optical axis Z is illustrated in a lower part.

TABLE 25

Example 9

| Sn | R | D | Nd | vd | |
|---|---|---|---|---|---|
| 1 | 59.3386 | 2.33 | 1.91082 | 35.25 | |
| 2 | 39.8105 | 11.04 | 1.65160 | 58.55 | |
| 3 | 493.4276 | DD[3] | | | |
| 4 | 183.2720 | 1.40 | 2.00069 | 25.46 | |
| 5 | 30.7164 | 8.03 | | | |
| *6 | −81.1471 | 5.27 | 1.58313 | 59.38 | |
| *7 | −41.0714 | 0.30 | | | |
| 8 | −42.3776 | 1.49 | 1.48749 | 70.24 | |
| 9 | 31.6673 | 6.59 | 1.84666 | 23.78 | |
| 10 | −200.7921 | 9.63 | | | |
| 11 | −45.4339 | 1.05 | 1.67790 | 55.34 | |
| 12 | ∞ | DD[12] | | | |
| 13 | ∞ | 3.91 | | | |
| 14(St) | 36.1436 | 5.80 | 1.69350 | 53.20 | |
| *15 | −85.5157 | 3.48 | | | |
| *16 | −204.3726 | 1.21 | 1.67270 | 32.10 | G3a |
| 17 | 24.2651 | 7.75 | 1.43875 | 94.66 | |
| 18 | −55.2294 | 2.05 | | | |
| 19 | −94.6119 | 1.04 | 1.60398 | 27.19 | |
| *20 | −58.3711 | 1.70 | 1.48749 | 70.24 | G3b |
| 21 | 51.0729 | 3.50 | | | |
| 22 | 33.1200 | 8.94 | 1.49700 | 81.54 | |
| 23 | −42.2144 | 1.57 | | | |
| 24 | −253.8596 | 1.28 | 1.65412 | 39.68 | |
| 25 | 91.1460 | 3.18 | 1.53172 | 48.84 | G3c |
| 26 | −180.3990 | 16.63 | | | |
| 27 | −18.9969 | 1.20 | 1.90043 | 37.37 | |
| 28 | −36.5971 | DD[28] | | | |

TABLE 25-continued

Example 9

| Sn | R | D | Nd | vd |
|---|---|---|---|---|
| 29 | −74.7399 | 4.00 | 2.00272 | 19.32 |
| 30 | −50.6203 | 24.00 | | |
| 31 | ∞ | 3.20 | 1.51680 | 64.20 |
| 32 | ∞ | 1.00 | | |

TABLE 26

Example 9

| | WIDE | MIDDLE | TELE |
|---|---|---|---|
| Zr | 1.0 | 1.4 | 2.1 |
| f | 45.92 | 63.78 | 97.91 |
| FNo. | 4.10 | 4.10 | 4.11 |
| 2ω (°) | 64.6 | 47.2 | 31.2 |
| DD[3] | 1.76 | 10.74 | 25.22 |
| DD[13] | 20.18 | 12.96 | 5.26 |
| DD[28] | 4.00 | 13.64 | 25.17 |

TABLE 27

Example 9

| Sn | 6 | 7 | |
|---|---|---|---|
| KA | 1.0000000E+00 | 1.0000000E+00 | |
| A4 | 2.0205871E−06 | 1.7340436E−06 | |
| A6 | −1.0933980E−09 | −2.1425410E−09 | |
| A8 | −5.3520776E−12 | −1.8589398E−12 | |
| A10 | 3.8951386E−15 | −3.9119305E−15 | |
| A12 | 6.9245691E−18 | 3.6626198E−18 | |
| A14 | −1.4266257E−20 | 4.8548913E−20 | |
| A16 | 1.7988872E−22 | 1.2728042E−22 | |
| Sn | 14 | 15 | 19 |
| KA | 1.0000000E+00 | 1.0000000E+00 | 1.0000000E+00 |
| A4 | −4.8032513E−06 | 2.7581855E−06 | 1.4891990E−06 |
| A6 | −1.0698617E−09 | 2.5979966E−09 | 7.3272708E−09 |
| A8 | 3.2267143E−12 | 9.1506067E−13 | −2.7181936E−11 |
| A10 | 7.4525122E−16 | 3.6280613E−15 | 4.0443399E−14 |
| A12 | −1.1852056E−17 | 1.0311739E−16 | 8.3307050E−16 |
| A14 | −1.2447918E−19 | −9.5427019E−20 | −5.5388578E−18 |
| A16 | 1.1771014E−21 | 7.0953036E−22 | 9.1019100E−21 |

Table 28 and Table 29 show the corresponding values of Conditional Expressions (1) to (15) of the zoom lenses of Examples 1 to 9. In addition, in Table 28 and Table 29, the d line-based Abbe numbers of the positive lenses of the third a lens group G3a and the third c lens group G3c of which the d line-based Abbe numbers are greater than 70 are shown in the fields of ν3ap70 and ν3cp70, respectively. In Examples 1 to 9, d line is used as a reference wavelength. Table 28 and Table 29 show d line-based values.

TABLE 28

| Expression Number | | Example 1 | Example 2 | Example 3 | Example 4 | Example 5 |
|---|---|---|---|---|---|---|
| (1) | D3bp/D3bn | 0.382 | 0.471 | 0.471 | 0.471 | 0.471 |
| (2) | ν3bp | 23.06 | 23.43 | 23.43 | 23.43 | 23.43 |
| | ν3bn | 70.24 | 70.24 | 70.24 | 70.24 | 70.24 |
| (3) | |f3bp/f3bn| | 6.470 | 6.610 | 5.509 | 5.655 | 8.332 |
| (4) | D3bp/Dac | 0.082 | 0.099 | 0.099 | 0.106 | 0.103 |
| (5) | |(1 − β3bw) × βrw| | 0.953 | 0.957 | 0.959 | 0.970 | 0.982 |
| (6) | |(1 − β3bt) × βrt| | 1.306 | 1.308 | 1.310 | 1.313 | 1.355 |
| (7) | ν3bn − ν3bp | 47.18 | 46.81 | 46.81 | 46.81 | 46.81 |
| (8) | νLast | 19.32 | 19.32 | 19.32 | 19.32 | 17.47 |
| (9) | fFoc/f2 | 2.314 | 2.338 | 2.254 | 2.505 | 2.109 |
| (10) | fw/f1 | 0.358 | 0.359 | 0.355 | 0.377 | 0.329 |
| (11) | fw/|f2| | 1.539 | 1.543 | 1.530 | 1.559 | 1.576 |
| (12) | fw/f3 | 1.305 | 1.308 | 1.294 | 1.317 | 1.316 |
| (13) | fw/f4 | 0.328 | 0.329 | 0.320 | 0.341 | 0.236 |
| (14) | f3/f4 | 0.252 | 0.251 | 0.247 | 0.259 | 0.180 |
| (15) | W3bp | 1.228 | 1.228 | 1.228 | 1.228 | 1.228 |
| | ν3ap70 | 94.66 | 94.66 | 94.66 | 94.66 | 94.66 |
| | ν3cp70 | 81.54 | 81.54 | 81.54 | 81.54 | 81.54 |

TABLE 29

| Expression Number | | Example 6 | Example 7 | Example 8 | Example 9 |
|---|---|---|---|---|---|
| (1) | D3bp/D3bn | 0.800 | 1.000 | 1.080 | 0.612 |
| (2) | ν3bp | 22.30 | 23.43 | 22.30 | 27.19 |
|  | ν3bn | 81.54 | 70.24 | 81.54 | 70.24 |
| (3) | \|f3bp/f3bn\| | 6.284 | 5.632 | 7.096 | 4.490 |
| (4) | D3bp/Dac | 0.103 | 0.111 | 0.131 | 0.125 |
| (5) | \|(1 −β3bw) × βrw\| | 0.994 | 0.944 | 0.939 | 0.959 |
| (6) | \|(1 −β3bt) × βrt\| | 1.373 | 1.313 | 1.300 | 1.311 |
| (7) | ν3bn − ν3bp | 59.24 | 46.81 | 59.24 | 43.05 |
| (8) | νLast | 24.80 | 23.78 | 23.78 | 19.32 |
| (9) | fFoc/f2 | 2.086 | 2.341 | 2.237 | 2.243 |
| (10) | fw/f1 | 0.317 | 0.366 | 0.392 | 0.356 |
| (11) | fw/\|f2\| | 1.514 | 1.737 | 1.883 | 1.537 |
| (12) | fw/f3 | 1.276 | 1.351 | 1.409 | 1.295 |
| (13) | fw/f4 | 0.235 | 0.264 | 0.286 | 0.318 |
| (14) | f3/f4 | 0.184 | 0.195 | 0.203 | 0.245 |
| (15) | W3bp | 1.228 | 1.228 | 1.228 | 1.220 |
|  | ν3ap70 | 94.66 | 94.66 | 94.66 | 94.66 |
|  | ν3cp70 | 81.54 | 81.54 | 81.54 | 81.54 |

As is perceived from the above data, the zoom lenses of Examples 1 to 9 reduce a change in chromatic aberration in the case of the image shake correction while reducing the weight of the vibration proof lens group. In addition, even in a case where the zoom lenses of Examples 1 to 9 are configured in a small size, various types of aberration are favorably corrected, and high optical performance is implemented.

Figure 39:
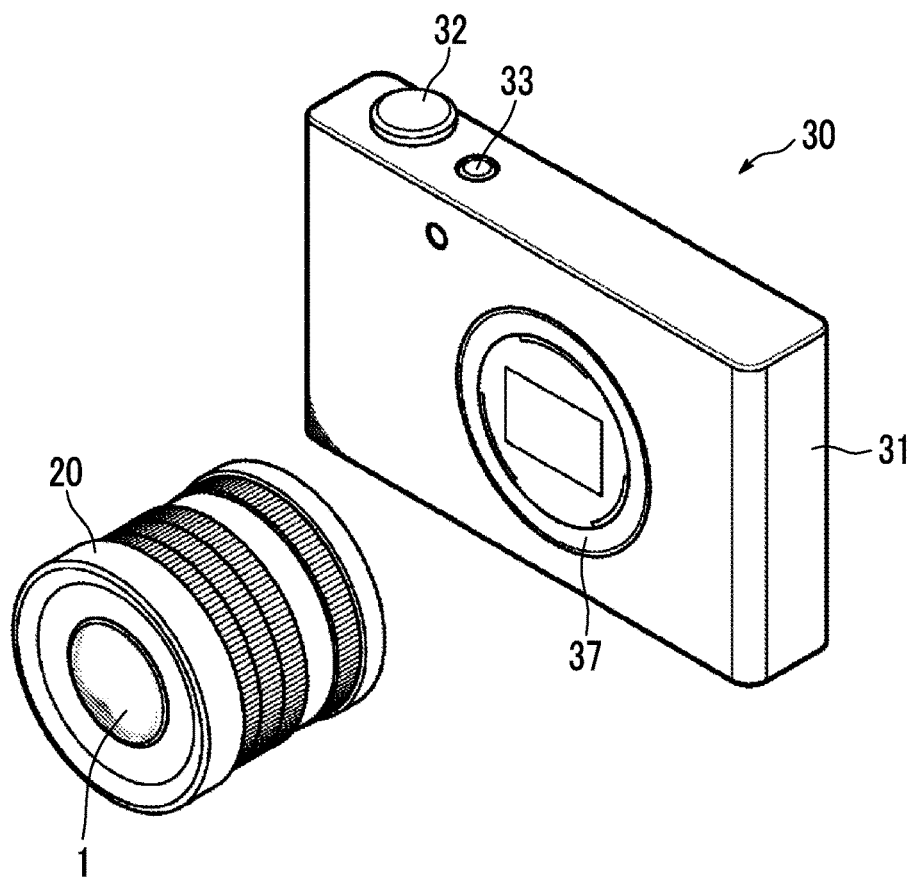
FIG. 39 is a perspective view of a front surface side of an imaging apparatus according to one embodiment of the present disclosure.
Figure 40:
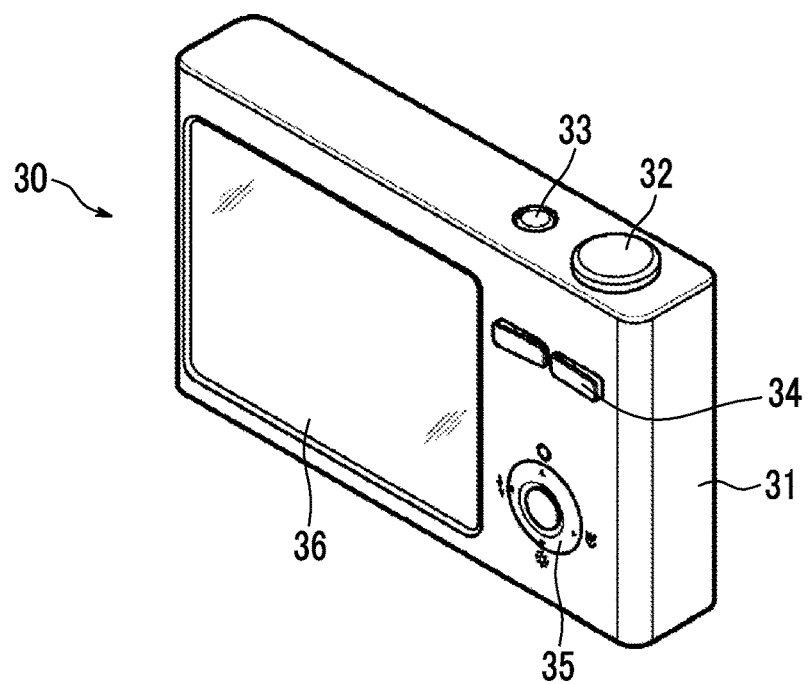
FIG. 40 is a perspective view of a rear surface side of the imaging apparatus according to one embodiment of the present disclosure.

Next, an imaging apparatus according to the embodiment of the present disclosure will be described. FIG. 39 and FIG. 40 illustrate exterior views of a camera 30 that is the imaging apparatus according to one embodiment of the present disclosure. FIG. 39 illustrates a perspective view of the camera 30 seen from a front surface side, and FIG. 40 illustrates a perspective view of the camera 30 seen from a rear surface side. The camera 30 is a so-called mirrorless type digital camera, and an interchangeable lens 20 can be attachably and detachably mounted on the camera 30. The interchangeable lens 20 is configured to include a zoom lens 1 according to one embodiment of the present disclosure. The zoom lens 1 is accommodated in a lens barrel.

The camera 30 comprises a camera body 31. A shutter button 32 and a power button 33 are disposed on the upper surface of the camera body 31. In addition, an operation unit 34, an operation unit 35, and a display unit 36 are disposed on the rear surface of the camera body 31. The display unit 36 displays a captured image and an image in an angle of view before imaging.

An imaging aperture on which light from an imaging target is incident is disposed in the front surface center portion of the camera body 31. A mount 37 is disposed at a position corresponding to the imaging aperture. The interchangeable lens 20 is mounted on the camera body 31 through the mount 37.

In the camera body 31, an imaging element such as a charge coupled device (CCD) or a complementary metal oxide semiconductor (CMOS) that outputs an imaging signal corresponding to a subject image formed by the interchangeable lens 20, a signal processing circuit that generates an image by processing the imaging signal output from the imaging element, a recording medium for recording the generated image, and the like are disposed. In the camera 30, a still picture or a motion picture can be imaged by pushing the shutter button 32, and image data obtained by imaging is recorded on the recording medium.

While the technology of the present disclosure has been illustratively described with the embodiment and the examples, the technology of the present disclosure is not limited to the embodiment and the examples and can be subjected to various modifications. For example, the radius of curvature, the surface interval, the refractive index, the Abbe number, the aspherical coefficient, and the like of each lens are not limited to the values shown in each example and may have other values.

The imaging apparatus according to the embodiment of the present disclosure is not limited to the above example and, for example, can have various embodiments of a camera other than a mirrorless type, a film camera, and a video camera.

What is claimed is:

1. A zoom lens comprising:
   only four lens groups consisting of a first lens group having a positive refractive power, a second lens group having a negative refractive power, a third lens group having a positive refractive power, and a fourth lens group having a positive refractive power in order from an object side to an image side as lens groups,
   wherein in a case of magnification, at least the first lens group, the second lens group, and the third lens group move along an optical axis by changing all intervals between adjacent lens groups in an optical axis direction,
   the third lens group consists of a third a lens group that is fixed with respect to an image plane in a case of image shake correction, a third b lens group that moves in a direction intersecting with the optical axis in the case of the image shake correction, and a third c lens group that is fixed with respect to the image plane in the case of the image shake correction in order from the object side to the image side,
   a stop is arranged between a lens surface of the second lens group closest to the image side and a lens surface of the third c lens group closest to the image side,
   the third b lens group consists of one positive lens and one negative lens,
   in a case where a thickness of the positive lens of the third b lens group on the optical axis is denoted by D3bp, and a thickness of the negative lens of the third b lens group on the optical axis is denoted by D3bn, Conditional Expression (1) represented by $$0.2 < D3bp/D3bn < 2 \qquad (1)$$

is satisfied,
   a lens of the third c lens group closest to the image side is a meniscus lens that has a convex surface toward the image side and has a negative refractive power, and
   the fourth lens group consists of one positive lens.

2. The zoom lens according to claim 1,
   wherein in a case where a d line-based Abbe number of the positive lens of the third b lens group is denoted by ν3bp, and a d line-based Abbe number of the negative lens of the third b lens group is denoted by ν3bn, Conditional Expression (2) represented by $$\nu 3bp < \nu 3bn \qquad (2)$$

is satisfied.

3. The zoom lens according to claim 2,
   wherein each of the third a lens group and the third c lens group includes a positive lens of which a d line-based Abbe number is greater than 70.

4. The zoom lens according to claim 1,
wherein in a case where a focal length of the positive lens of the third b lens group is denoted by f3 bp, and a focal length of the negative lens of the third b lens group is denoted by f3bn, Conditional Expression (3) represented by $$2<|f3bp/f3bn|<10 \qquad (3)$$

is satisfied.

5. The zoom lens according to claim 1,
wherein a lens surface of the third a lens group closest to the image side is a convex surface, and a lens surface of the third c lens group closest to the object side is a convex surface.

6. The zoom lens according to claim 1,
wherein in a case where a distance on the optical axis from a lens surface of the third a lens group closest to the image side to a lens surface of the third c lens group closest to the object side is denoted by Dac, Conditional Expression (4) represented by $$0.01<D3bp/Dac<0.45 \qquad (4)$$

is satisfied.

7. The zoom lens according to claim 1,
wherein in a case where a lateral magnification ratio of the third b lens group at a wide angle end in a state where an object at infinity is focused is denoted by βbw, and a combined lateral magnification ratio of the third c lens group and the fourth lens group at the wide angle end in a state where the object at infinity is focused is denoted by βrw, Conditional Expression (5) represented by $$0.75<|(1-(\beta 3bw)\times\beta rw|<1.5 \qquad (5)$$

is satisfied.

8. The zoom lens according to claim 1,
wherein in a case where a lateral magnification ratio of the third b lens group at a telephoto end in a state where an object at infinity is focused is denoted by β3bt, and a combined lateral magnification ratio of the third c lens group and the fourth lens group at the telephoto end in a state where the object at infinity is focused is denoted by βrt, Conditional Expression (6) represented by $$1<|(1-(\beta 3bt)\times\beta rt|<2 \qquad (6)$$

is satisfied.

9. The zoom lens according to claim 1,
wherein in a case where a d line-based Abbe number of the positive lens of the third b lens group is denoted by v3 bp, and a d line-based Abbe number of the negative lens of the third b lens group is denoted by v3bn, Conditional Expression (7) represented by $$35<v3bn-v3bp<70 \qquad (7)$$

is satisfied.

10. The zoom lens according to claim 1,
wherein a lens of the fourth lens group closest to the image side is a positive lens, and in a case where a d line-based Abbe number of the positive lens of the fourth lens group closest to the image side is denoted by vLast, Conditional Expression (8) represented by $$vLast<30 \qquad (8)$$

is satisfied.

11. The zoom lens according to claim 1,
wherein in a case of focusing, only one lens in the second lens group or only one cemented lens in the second lens group moves along the optical axis.

12. The zoom lens according to claim 11,
wherein in a case where a focal length of the lens or the cemented lens in the second lens group moving in the case of focusing is denoted by fFoc, and a focal length of the second lens group is denoted by f2, Conditional Expression (9) represented by $$1.5<fFoc/f2<3 \qquad (9)$$

is satisfied.

13. The zoom lens according to claim 1,
wherein in a case where a focal length of the zoom lens at a wide angle end in a state where an object at infinity is focused is denoted by fw, and a focal length of the first lens group is denoted by f1, Conditional Expression (10) represented by $$0.2<fw/f1<0.45 \qquad (10)$$

is satisfied.

14. The zoom lens according to claim 1,
wherein in a case where a focal length of the zoom lens at a wide angle end in a state where an object at infinity is focused is denoted by fw, and a focal length of the second lens group is denoted by f2, Conditional Expression (11) represented by $$1<fw/|f2|<2.5 \qquad (11)$$

is satisfied.

15. The zoom lens according to claim 1,
wherein in a case where a focal length of the zoom lens at a wide angle end in a state where an object at infinity is focused is denoted by fw, and a focal length of the third lens group is denoted by f3, Conditional Expression (12) represented by $$0.8<fw/f3<2 \qquad (12)$$

is satisfied.

16. The zoom lens according to claim 1,
wherein in a case where a focal length of the zoom lens at a wide angle end in a state where an object at infinity is focused is denoted by fw, and a focal length of the fourth lens group is denoted by f4, Conditional Expression (13) represented by $$0.1<fw/f4<0.4 \qquad (13)$$

is satisfied.

17. The zoom lens according to claim 1,
wherein in a case where a specific gravity of the positive lens of the third b lens group is denoted by W3 bp, Conditional Expression (15) represented by $$0.8<W3bp<2.5 \qquad (15)$$

is satisfied.

18. An imaging apparatus comprising:
the zoom lens according to claim 1.

19. A zoom lens comprising:
only four lens groups consisting of a first lens group having a positive refractive power, a second lens group having a negative refractive power, a third lens group having a positive refractive power, and a fourth lens group having a positive refractive power in order from an object side to an image side as lens groups,
wherein in a case of magnification, at least the first lens group, the second lens group, and the third lens group move along an optical axis by changing all intervals between adjacent lens groups in an optical axis direction,
the third lens group consists of a third a lens group that is fixed with respect to an image plane in a case of image shake correction, a third b lens group that moves in a direction intersecting with the optical axis in the case of the image shake correction, and a third c lens group that is fixed with respect to the image plane in the case of the image shake correction in order from the object side to the image side, a stop is arranged between a lens surface of the second lens group closest to the image side and a lens surface of the third c lens group closest to the image side, the third b lens group consists of one positive lens and one negative lens, in a case where a thickness of the positive lens of the third b lens group on the optical axis is denoted by D3bp, and a thickness of the negative lens of the third b lens group on the optical axis is denoted by D3bn, Conditional Expression (1) represented by $$0.2 < D3bp/D3bn < 2 \quad (1)$$

is satisfied, and in a case where a focal length of the third lens group is denoted by f3, and a focal length of the fourth lens group is denoted by f4, Conditional Expression (14) represented by $$0.1 < f3/f4 < 0.35 \quad (14)$$

is satisfied.

* * * * *